Figure 1:
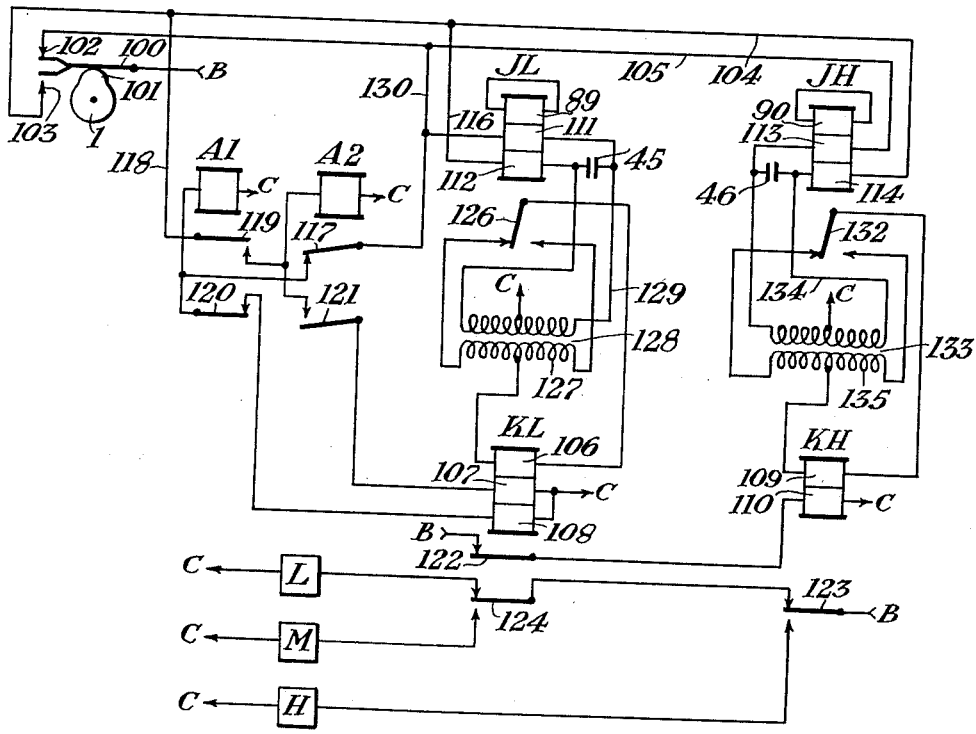

March 12, 1940.    A. J. SORENSEN    2,193,045
SPEED RESPONSIVE APPARATUS
Filed July 21, 1938    5 Sheets-Sheet 1

INVENTOR
Andrew J. Sorensen.
BY
HIS ATTORNEY

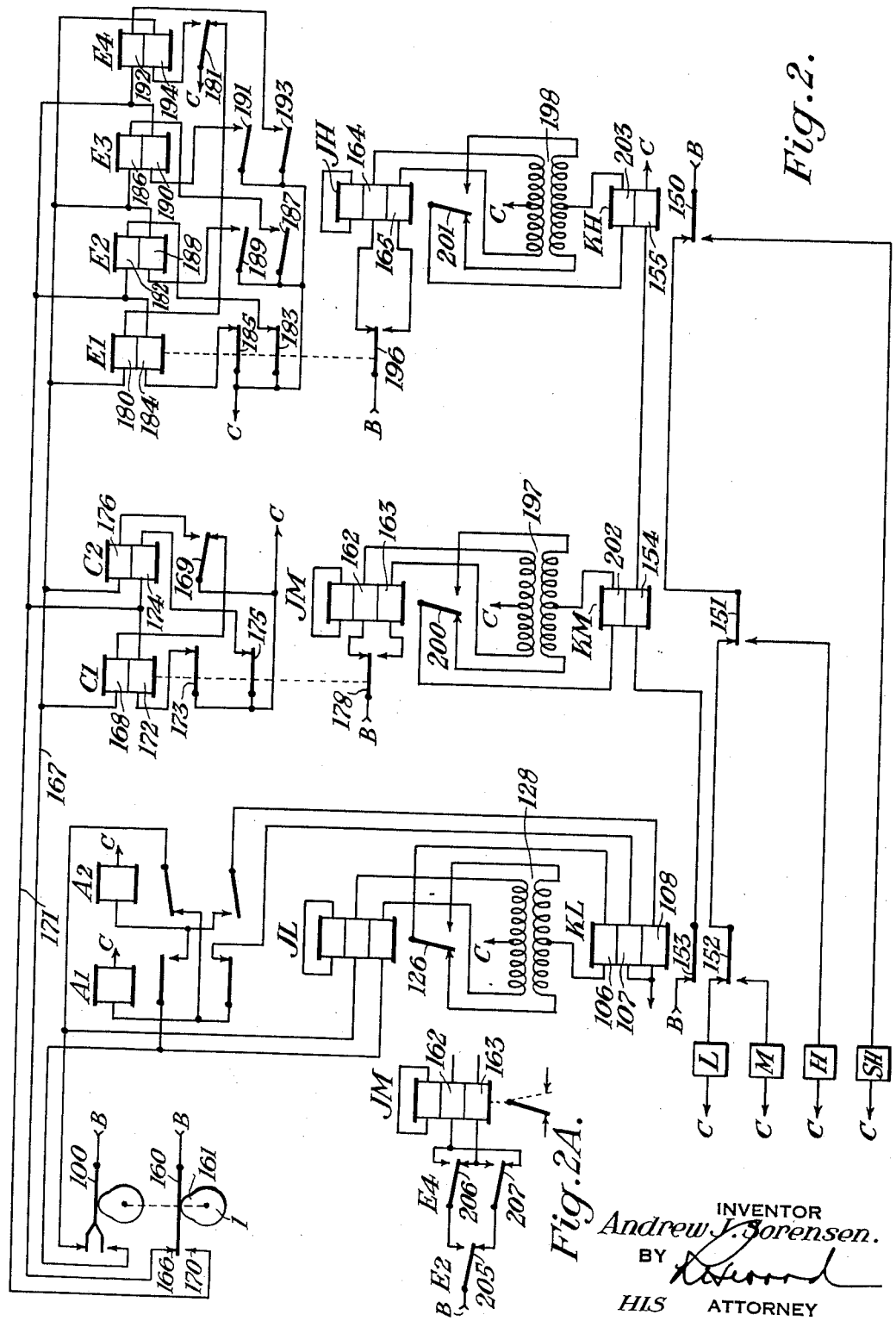

March 12, 1940.  A. J. SORENSEN  2,193,045
SPEED RESPONSIVE APPARATUS
Filed July 21, 1938  5 Sheets-Sheet 3

INVENTOR
Andrew J. Sorensen.
BY
HIS ATTORNEY

March 12, 1940.  A. J. SORENSEN  2,193,045
SPEED RESPONSIVE APPARATUS
Filed July 21, 1938   5 Sheets-Sheet 5

INVENTOR
Andrew J. Sorensen.
BY
HIS ATTORNEY

Patented Mar. 12, 1940

2,193,045

UNITED STATES PATENT OFFICE 2,193,045

SPEED RESPONSIVE APPARATUS

Andrew J. Sorensen, Edgewood, Pa., assignor to The Union Switch & Signal Company, Swissvale, Pa., a corporation of Pennsylvania Application July 21, 1938, Serial No. 220,519

46 Claims. (Cl. 175—355)

My invention relates to speed responsive apparatus which is particularly adapted for use on railway vehicles for governing the braking system or motive power, or both, of the vehicle in accordance with its speed.

This application is a continuation in part of my application Serial No. 166,378, filed September 29, 1937, for Speed responsive apparatus.

While the apparatus provided by this invention is especially designed for use on railway vehicles it is not necessarily limited to use in this field, and it is contemplated that the equipment may be employed wherever similar conditions are encountered.

The coefficient of friction between a brake shoe and a car wheel varies inversely with the speed at which the wheel is rotating, being large at low speeds and being relatively small at high speeds. In order to obtain the braking force necessary to properly retard a train when it is traveling at extremely high speeds, the brake equipment is designed so that the brake shoes are pressed against the wheels with great force to compensate for the low coefficient of friction existing at that time between the brake shoes and the wheels. The degree of force employed to press the shoes against the wheels is referred to as the braking ratio, and is measured by comparing the force available to press the shoes against the wheels of a vehicle with the weight of the vehicle.

As the speed of the train is reduced the coefficient of friction between the brake shoes and the wheels increases, and if at low speeds the same great force is employed to press the shoes against the wheels as at high speeds, so much retarding force will be developed between the shoes and the wheels that the wheels will cease to rotate and will slide on the track. This is objectionable as flat spots are worn on the wheels, while the adhesion between a sliding wheel and a rail is much less than that between a rotating wheel and a rail with the result that when the wheels are caused to slide, the rate of retardation of the train is reduced and the distance required for a stop is correspondingly increased.

It has been heretofore proposed, therefore, to provide means responsive to the speed of a train or vehicle and automatically operative on a reduction in the speed of the train or vehicle to reduce the braking ratio, that is, the degree of force which may be employed to press the brake shoes against the wheels, to a value such that wheel sliding will not occur.

The train or vehicle speed responsive means heretofore employed have incorporated centrifugal devices mounted on and driven by an axle of a vehicle. A device mounted on a vehicle axle is not protected or cushioned by the vehicle springs and is, therefore, subjected to the full force of impacts on the vehicle wheels occasioned by irregularities in the track, such as joints between the rails, switches, crossovers and the like. A device mounted on a vehicle axle, therefore, is subjected to constant vibration when the vehicle is in motion. Obviously this is objectionable in apparatus which must be sensitive to small changes in vehicle speeds.

It is an object of my invention to provide speed responsive apparatus the major portion of which may be located at some point remote from the wheels and axles of the vehicle so that the apparatus will be comparatively free from damage due to vibration.

Any apparatus for restricting the degree of application of the brakes which it is possible to secure is subject to the possibility of becoming inoperative. It is desired in such cases that if for any reason the apparatus does not function in the intended manner, it will automatically operate to permit the maximum degree of brake application, or some predetermined degree of brake application greater than the minimum.

It is desirable, therefore, that any electrical speed responsive mechanism operate on the closed circuit principle, that is, that it be conditioned when deenergized to permit the maximum degree of brake application or the predetermined degree in excess of the minimum. The mechanism, therefore, is operative when energized to reduce the degree of brake application which it is possible to effect, or, in some instances to increase the permissible degree of brake application.

As the equipment must operate on the closed circuit principle, that is, as it is energized when the permissible degree of brake application is reduced to the minimum, it is essential to provide means to insure that the equipment will be energized when the train is standing still or is moving at very slow speeds.

It is an object of my invention to provide an electrical speed responsive apparatus operating on the closed circuit principle, that is, apparatus which is energized when it is desired to change the permissible brake application from some predetermined value.

A further object of my invention is to provide apparatus of the type described which is reliable and accurate in operation, and which will respond uniformly to changes in vehicle speeds whether the vehicle is accelerating or decelerating.

Another object of my invention is to provide improved electrical speed responsive mechanism capable of giving a different response to each of a plurality of different changes in the vehicle speed.

Certain types of railway vehicles, such as locomotives, are equipped with vehicle carried signal apparatus which is selectively responsive to different current impulses transmitted through the track rails or otherwise to inform the engineman of traffic conditions in advance. It has heretofore been proposed to also equip such vehicles with speed responsive mechanism, together with means for controlling the vehicle brake equipment or the motive power, or both, and to have this means controlled by the speed responsive mechanism and the vehicle carried signal apparatus in such a manner that the brakes will be automatically applied or the motive power cut-off, or both, in the event that the vehicle is operated at a speed in excess of that permitted for existing traffic conditions as indicated by the vehicle carried signal mechanism.

It is an object of my invention to provide improved speed responsive mechanism adapted for use in an installation of the type described above.

A further object of my invention is to provide an improved speed responsive mechanism adapted for use in connection with vehicle carried signal apparatus and arranged to provide a plurality of different cut-off or control speeds with a minimum of apparatus.

Another object of my invention is to provide improved speed responsive mechanism incorporating means for detecting wheel sliding as a result of brake applications.

A further object of my invention is to provide improved speed responsive mechanism of the type described which is normally responsive to rotation of a primary axle, but which is automatically placed under the control of a different axle in the event that rotation of the primary axle ceases because of too heavy brake applications and resultant wheel sliding.

Another object of my invention is to provide improved vehicle carried speed responsive mechanism which cooperates with vehicle carried signal mechanism to provide a warning indication if the permissible speed limit, as determined by the signal mechanism, is approached, and which, if this speed limit is exceeded, will give a warning alarm, and will thereafter effect an application of the brakes if the vehicle speed is not reduced below the permissible speed limit within a predetermined time.

Figure 1A:
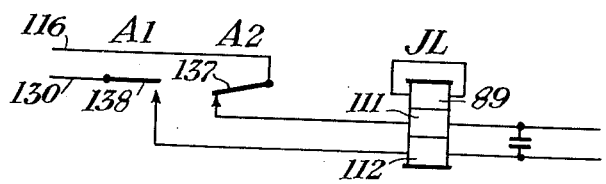
Figure 1B:
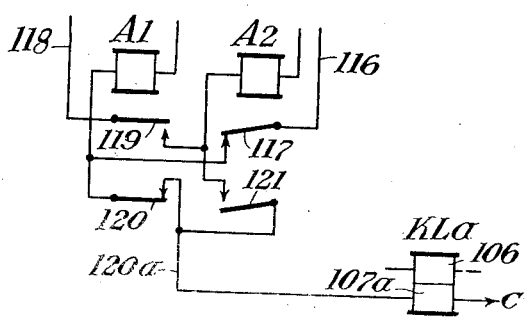
Figure 3:
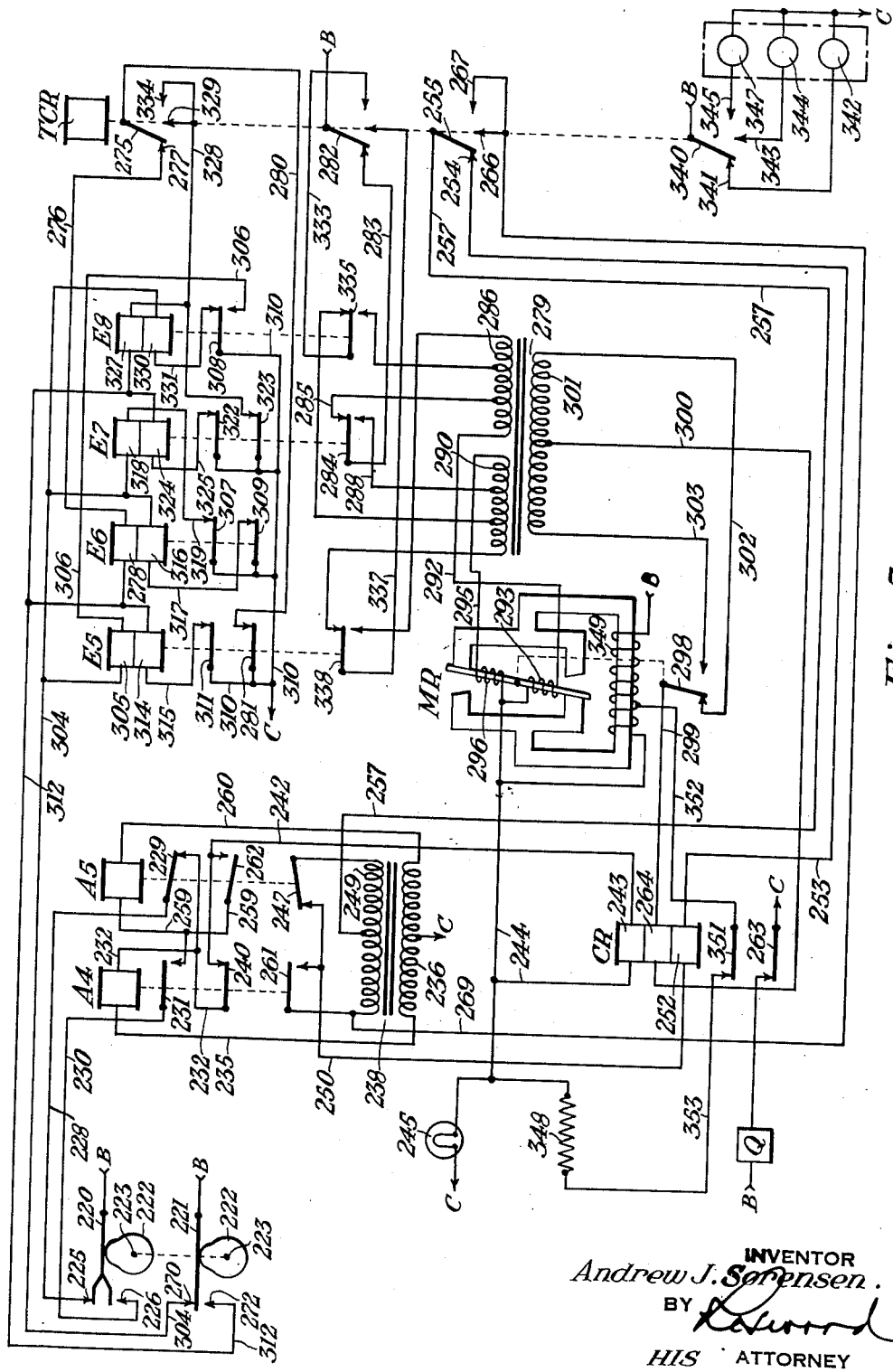
Figure 4:
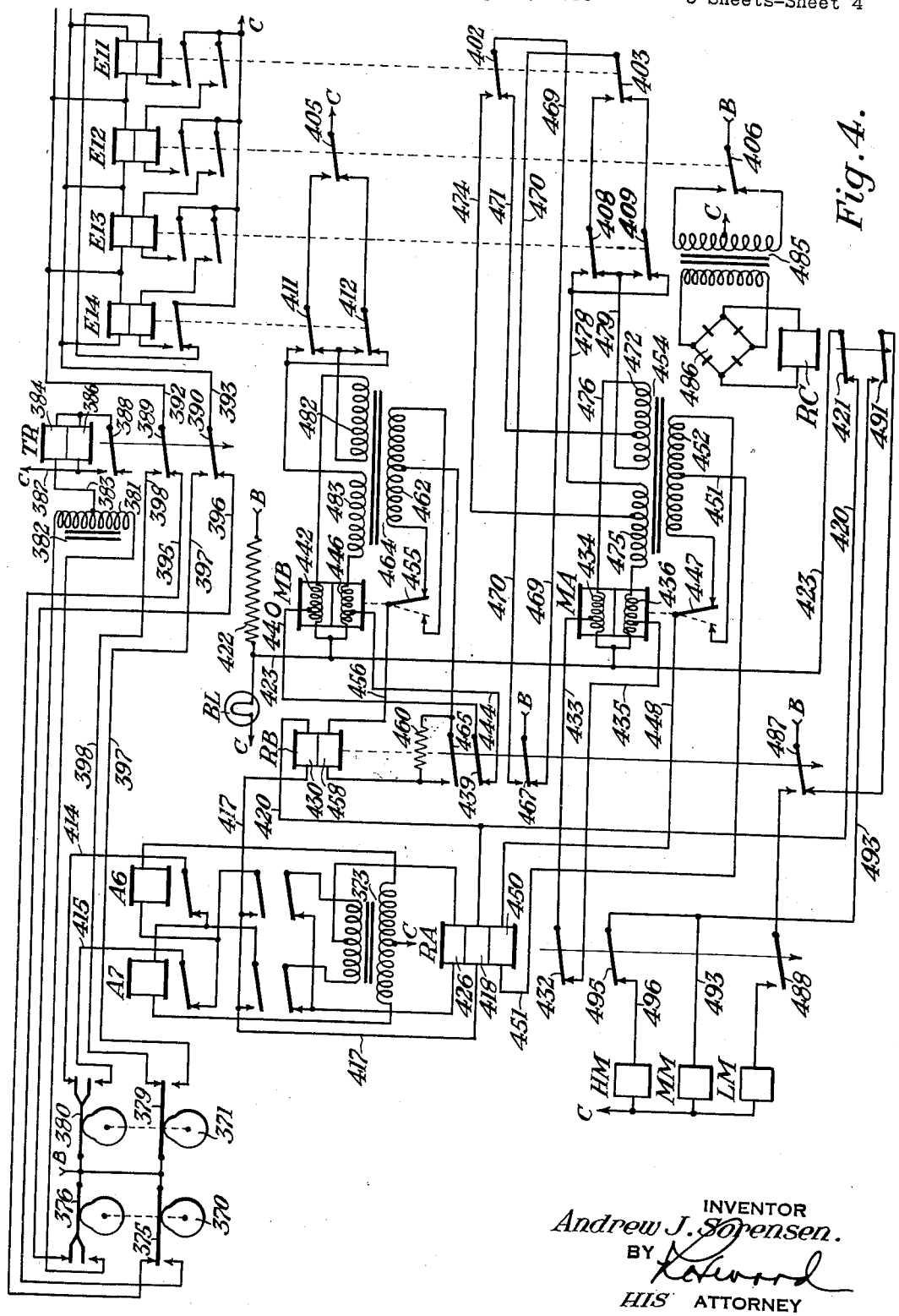
Figure 5:
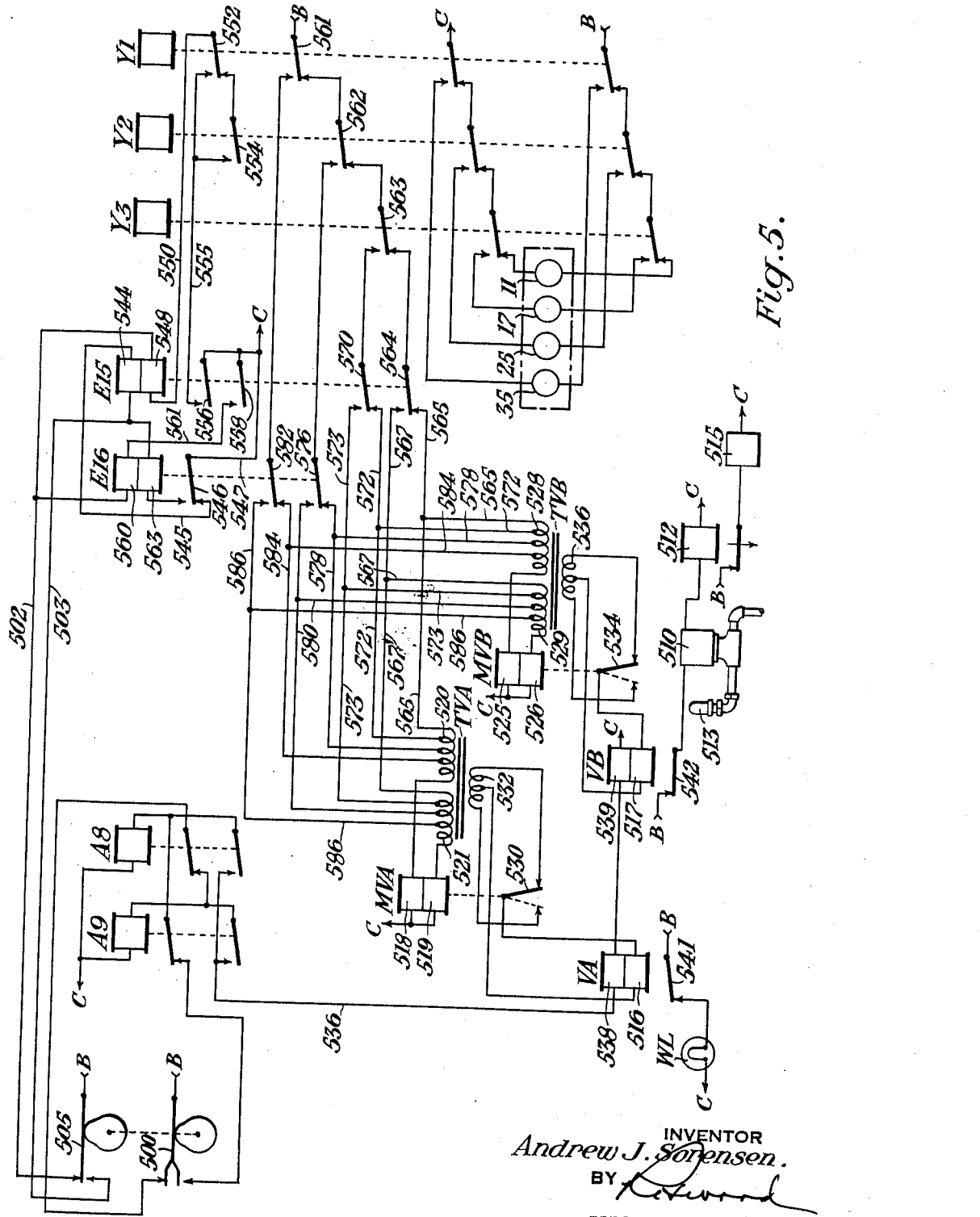

Other objects of my invention and features of novelty will be apparent from the following description taken in connection with the accompanying drawings in which Fig. 1 is a diagram showing one form of speed responsive apparatus embodying my invention as applied to a vehicle for varying the braking power of the brake equipment of such vehicle in accordance with the vehicle speed, Figs. 1A and 1B are fragmentary diagrammatic views illustrating modifications of the apparatus shown in Fig. 1 which I may employ, Fig. 2 is a diagram showing a modified form of apparatus, Fig. 2A is a fragmentary diagram showing a modification of the system shown in Fig. 2 which I may employ, Fig. 3 is a diagram showing speed responsive mechanism embodying my invention and cooperating with vehicle carried signal apparatus to provide a plurality of permissive speed limits in accordance with traffic conditions in advance, and Figs. 4 and 5 are diagrams showing modified forms of systems embodying the invention.

The speed responsive mechanism shown in Fig. 1 of the drawings has associated therewith magnet valve devices L, M and H which are incorporated in the vehicle brake system, not shown. This brake system may be of any suitable well-known type, and one form of system which I may employ is shown in United States Patent No. 2,095,505 to George W. Baughman.

The brake equipment with which the speed responsive mechanism shown in Fig. 1 of the drawings is employed is capable of developing sufficient force to press the brake shoes against the wheels firmly enough to produce a predetermined rate of retardation of the train when the train is traveling at a relatively high speed. When the low speed magnet L is energized, and the magnets M and H are both deenergized, the braking equipment is conditioned to be able only to develop substantially less than the full braking power, the braking force being limited to a value suitable for use when the train is traveling at a relatively slow speed, such as below 30 miles per hour.

The brake equipment is also arranged so that when the medium speed magnet M is energized, at which time both the low speed magnet L and the high speed magnet H are both deenergized, the brake equipment is conditioned to permit a higher degree of braking force to be developed than is obtainable when the low speed magnet L is energized. The braking force permitted when the magnet M is energized is suitable for use when the train is traveling at a medium speed, such as in excess of 30 miles per hour, but below 60 miles per hour.

Similarly, the brake equipment is arranged so that when the high speed magnet H is energized, at which time the magnets M and L are both deenergized, the brake equipment is conditioned to permit the maximum braking force to be developed to thereby produce braking power suitable for use when the train is traveling at relatively high speeds, such as in excess of 60 miles per hour.

The details of construction of the brake equipment are not a part of this invention, and the brake equipment, therefore, is not shown in detail in this application. Similarly, the invention is not limited to the particular arrangement of speed control magnets shown, and it is contemplated that one or more of these magnets may be operative when deenergized to condition the brake equipment for service in a particular range of train speeds, and to be inoperative when energized to condition the equipment for this class of service.

Referring next to Fig. 1 of the drawings, the reference character 100 designates a movable contact of the make-before break type which is actuated by cam 101 secured to an axle 1 of a vehicle to the speed of which the system is intended to respond. When the vehicle is moving the contact 100 alternately engages fixed contacts 102 and 103 to control the supply of current to wires 104 and 105.

While the contact 100 has been shown as a movable contact actuated by a cam mounted on the vehicle axle, the invention is not limited to the use of this construction, and other suitable forms of contact structure may be employed. Thus the axle may have mounted thereon a commutator having two segments, one of which is connected to one terminal of the source of electric energy. This commutator may have associated therewith a pair of brushes which are so arranged and proportioned that one or the other of these brushes will be in engagement with the energized one of the commutator segments at all times.

For controlling the brake magnets L, M and H, I provide a low speed relay KL having three windings 106, 107 and 108, and a high speed relay KH having two windings 109 and 110. For controlling the relays KL and KH, I provide a low speed polarized relay JL having two operating windings 111 and 112, and a high speed polarized relay JH having two operating windings 113 and 114.

The windings 111 and 112 are wound so that when winding 111 is energized, contact 126 of relay JL is caused to assume its left-hand position as shown, and when winding 112 is energized, contact 126 is caused to assume its right-hand position. In a similar manner windings 113 and 114 of relay JH are wound so that its contact 132 is caused to assume a left-hand or a right-hand position according as winding 113 or 114, respectively, is energized.

The relays JL and JH are provided with short circuited windings 89 and 90, respectively, which operate in the well-known manner to retard response of the relays to changes in the energization of the windings thereof, and thereby improve the cut-off action of the relays at the critical vehicle speeds.

The system shown in Fig. 1 of the drawings includes zero-speed relays A1 and A2 which provide means to maintain the supply of current to the windings 107 and 108 of the low speed relay KL, and thereby maintain the contacts of relay KL picked up at times when the axle 1 is not rotating or is turning at relatively slow speeds.

When the vehicle is in motion, the first operation of contact 100 (assuming this to be the closing of contact 100—102), causes the winding of relay A1 to be energized by a circuit which may be traced over a path which passes from terminal B through contact 100—102, wire 105, wire 130, back contact 117 of relay A2, and winding of relay A1 to terminal C. Upon the second operation of contact 100, that is the closing of contact 100—103 and the opening of contact 100—102, relay A1 becomes released, and the winding of relay A2 becomes energized by a circuit which may be traced over a path which passes from terminal B through contact 100—103, wire 104, wire 118, back contact 119 of relay A1, and winding of relay A2 to terminal C. Thus the contacts of relays A1 and A2 become alternately picked up and released at a speed corresponding to the speed of rotation of axle 1. Furthermore, since contact 100 is of the make-before-break type, one or the other of relays A1 or A2 will be energized when the vehicle is at rest.

As here shown, the winding of relay A1 is energized and that of relay A2 is deenergized with the result that winding 108 of low speed relay KL is energized by a circuit which may be traced from terminal B through contact 100—102, wire 105, wire 130, back contact 117 of relay A2, front contact 120 of relay A1, and winding 108 to terminal C. If the vehicle should stop with contact 100—103 closed, then the winding of relay A2 would be energized and that of relay A1 would be deenergized with the result that winding 107 of relay KL would be energized by a circuit which may be traced from terminal B through contact 100—103, wire 104, wire 118, back contact 119 of relay A1, front contact 121 of relay A2, and winding 107 to terminal C. It will be plain that with the vehicle at rest as shown in the drawings, a winding of relay KL will be energized to close front contact 122 of relay KL to supply energy to winding 110 of relay KH to maintain the contact 123 of that relay picked up. When relays KH and KL are both energized, the low speed braking magnet L is energized by a circuit which may be traced from terminal B through front point of one contact 123 of relay KH, front point of contact 124 of relay KL, and low speed braking magnet L to terminal C. With the vehicle at rest, therefore, the low speed braking magnet L is energized to condition the braking system of the vehicle to provide the degree of braking power appropriate for low vehicle speeds.

On rotation of the axle 1 and the cam 101, the movable contact 100 is oscillated between the positions in which it engages the contacts 102 and 103. With the equipment in the position shown in Fig. 1 of the drawings, the contact 100 establishes a circuit from terminal B to the wire 105 from which a circuit is established by way of the wire 130 and contact 117 of relay A2 to the winding of relay A1 and energizes this winding. Contact 120 of relay A1 accordingly is picked up with the result that current is supplied from wire 105 to the winding 108 of relay KL to energize that winding.

On rotation of the axle 1 and the cam 101, the contact 100 moves to a position in which it no longer establishes the circuit from the terminal B to the wire 105, and in which the contact 100 connects the terminal B to the wire 104. As soon as the connection between the terminal B and the wire 105 is broken by the contact 100, the circuit through the winding 108 of relay KL and through the winding of relay A1 is interrupted.

The connection from terminal B to wire 104 is established by the contact 100 before the circuit to the wire 105 is interrupted. However, the circuit from wire 104 to the winding of relay A2 is not completed until the contact 119 of relay A1 is released, which does not occur until a small time interval after the interruption of the supply of current to the winding of relay A1. Furthermore, a circuit is not established from the wire 104 to the winding 107 of the relay KL until the contact 121 of relay A2 is picked up, which does not occur for a small time interval after the circuit to the winding of relay A2 is completed by the release of the contact 119 of relay A1.

It will be seen, therefore, that on movement of the contact 100 out of engagement with the contact 102 and into engagement with the contact 103, the winding 108 of the relay KL is deenergized as soon as the contact 100 becomes disengaged from the contact 102, but that the winding 107 does not become energized until a brief time interval afterwards. This time interval is determined by the release time of relay A1 and by the pick-up time of relay A2. This time interval remains substantially uniform at all times, and is not affected by changes in the rate of rotation of the axle, and accordingly of the speed of the train with which the equipment is associated. This time interval in which neither of the windings 107 and 108 of relay KL is energized is only of such duration, however, that the contacts of the relay KL, if picked up, will remain picked up until one of the windings is again energized.

As the axle 1 and the cam 101 continue to revolve, the contact 100 will be moved into engagement with the contact 102. When the contact 100 engages the contact 102 it establishes a circuit from terminal B to the wire 105, but at this time the circuits from wire 105 to the winding of relay A1 and to the winding 108 of relay KL are not complete because the winding of relay A2 is energized and its contact 117 is open. On disengagement of contact 100 from contact 103, the circuit to the wire 104 is interrupted, thereby interrupting the supply of current to the winding of relay A2 and to the winding 107 of relay KL.

Although the circuit from terminal B to wire 105 is established before the circuit to the wire 104 is interrupted, the circuits from the wire 105 to the winding of relay A1 and to the winding 108 of relay KL are not established for a time interval after the circuit to the wire 104 is interrupted by the contact 100. When the contact 100 breaks the circuit to the wire 104, the supply of current to the winding of relay A2 is interrupted and this relay thereupon releases after a small time delay known as the release time of the relay. When the relay A2 becomes released, its contact 117 establishes a circuit from the wire 105 to the winding of the relay A1, and after a time interval the contact 120 of relay A1 is picked up and completes a circuit from wire 105 to the winding 108 of relay KL.

It will be seen, therefore, that on movement of the contact 100 out of engagement with the contact 103 and the accompanying interruption of the supply of current to the winding 107 of relay KL, the winding 108 will not become energized until after a time interval determined by the release time of relay A2 and the pick-up time of relay A1. As previously stated, the time interval during which neither winding 107 nor winding 108 is energized is only of such duration that during movement of the vehicle at extremely slow speeds the contacts of the relay KL will remain picked up until one of the windings is again energized.

On continued rotation of the axle 1 and the cam 101, the cycle of operations described above is repeated, the windings of relays A1 and A2 being alternately energized, while the windings 107 and 108 of the relay KL are alternately energized, there being intermediate periods in which neither winding is energized, the length of these intermediate periods being determined by the release and pick-up times of relays A1 and A2.

The duration of the periods in which a circuit is established from terminal B to each of the wires 104 and 105, and similarly the time intervals between disengagement of movable contact 100 from one of the stationary contacts, and from the other of the stationary contacts, varies in accordance with the speed of rotation of the axle 1, these periods being relatively long when the axle is rotating at a slow speed, and being relatively short when the axle is rotating at a high speed.

As previously pointed out, there is a substantially constant time interval from the time at which the circuit to either of the wires 104 and 105, and therefore to one of the windings of the relay KL, is interrupted, and the time at which the supply of current is established to the other of the windings of the relay KL. This constant time interval in which neither winding of relay KL is energized is substantially shorter than the periods between interruptions in the circuits from terminal B to the wires 104 and 105 when the axle 1 is revolving at a very slow speed. Accordingly when the axle 1 is rotating at a very slow speed, after each interruption in the circuit to one of the wires 104 or 105, there will be the previously mentioned constant time interval in which neither winding of the relay KL is energized, while this time interval will be followed by a period in which current is supplied to one of the windings of the relay KL. As the axle is assumed to be rotating at a very slow speed, the intervals between interruptions in the circuits to the wires 104 and 105 will be relatively long, and after each such interruption, the substantial time interval mentioned above must elapse during which current is not supplied to either of the windings of the relay KL. The portion of the total elapsed time in which current is supplied to one or the other of the windings of the relay KL is such, however, during rotation of the axle at very low speeds, that the contacts of the relay KL will be picked up and will remain picked up.

As the speed of rotation of the axle increases, the duration of the intervals between interruptions in the circuits from terminal B to the wires 104 and 105 decreases, and since the duration of the periods following each interruption in which no current is supplied to the windings of the relay KL is unaffected by the change in the rate of rotation of the axle, the duration of the time intervals remaining after these periods and in which current is supplied to the windings of the relay KL gradually decreases with the result that with an increase in the vehicle speed, the portion of the total elapsed time in which current is supplied to the windings of relay KL progressively decreases.

When the rate of rotation of the axle has increased to a predetermined relatively low value, such as the rate corresponding to a vehicle speed of 5 miles per hour or even less, the portion of the total elapsed time in which current is supplied to the windings 107 and 108 of the relay KL is reduced to such an extent that the degree of energization of the windings of relay KL is insufficient to hold the relay contacts picked up. As the rate of rotation of the axle 1 increases to an even higher value, the degree of energization of the windings 107 and 108 of relay KL is further reduced and is reduced to such an extent that the force exerted by these windings to hold the relay contacts picked up is negligible. The contacts of relay KL are thereafter entirely under the control of the winding 106, the supply of current to which is controlled by the relay JL.

When the vehicle is in motion so that the axle 1 is rotated and the contact 100 is oscillated between its two positions, circuits are alternately established to the wires 104 and 105 with the result that windings 111 and 112 of relay JL are alternately energized to cause its contact 126 to operate between its extreme right-hand and left-hand positions. Similarly the windings 113 and 114 of relay JH are alternately energized to cause the contact 132 of that relay to operate between its extreme right-hand and left-hand positions.

When the axle 1 is rotating so that the contact 100 is operated between its two positions, the two end portions of primary winding 129 of transformer 128 are alternately energized in opposite directions simultaneously with the energization of windings 111 and 112 of relay JL, while contact 126 of relay JL rectifies the current of the transformer secondary winding 127 sufficiently to cause current of one relative polarity to be predominant in the current supplied to winding 106 of relay KL from the secondary winding 127 of transformer 128. The circuit for energizing winding 111 and the right-hand portion of primary winding 129 may be traced from terminal B through contact 100—102, wire 105, wire 130, winding 111 of relay JL, and right-hand portion of secondary winding 129 to terminal C. The circuit for energizing winding 112 of relay JL and left-hand portion of primary winding 129 of transformer 128 may be traced from terminal B through contact 100—103, wire 104, wire 116, winding 112, and left-hand portion of winding 129 to terminal C.

Similarly, the left-hand and right-hand portions of the primary winding 134 of transformer 133 are alternately energized in opposite directions simultaneously with energization of windings 113 and 114 of relay JH, while the contact 132 of this relay causes rectified current to be supplied from the secondary winding 135 of transformer 133 to the winding 109 of relay KH.

The circuits through which current is supplied to the windings 113 and 114 of relay JH and to primary winding 134 of transformer 133 are similar to the circuits traced in detail in connection with relay JH and transformer 128.

Condensers 45 and 46 are connected across the transformer primary windings 129 and 134, respectively, in order to reduce the arcing at contacts 100—102 and 100—103.

*Operation of the system shown in Fig. 1 of the drawings*

When the vehicle is moving at a speed of less than 30 miles per hour, the frequency of the reversals in the periodic energization of windings 111 and 112 are such that contact 126 of relay JL is capable of following these reversals in energization and effects the supply of substantially unidirectional current to winding 106 of relay KL. The force exerted by winding 106 of relay KL when energized with rectified current supplied over contact 126 supplements and assists the force exerted by the windings 107 and 108 of relay KL. Upon an increase in the vehicle speed, however, to some value above 30 miles per hour but below 60 miles per hour, for reasons hereinafter explained in detail, relay JL will cease operation so that contact 122 of relay KL becomes released, thereby interrupting the circuit to the winding 110 of relay KH and thus placing the high speed relay KH entirely under the control of polarized relay JH. Relay JH, however, continues to be operative at this vehicle speed with the result that its contact 132 alternately engages its right-hand and left-hand fixed contacts to supply rectified current from transformer 133 to winding 109 of relay KH to maintain the contact 123 of relay KH picked up. The force exerted by winding 109 of relay KH, when energized by rectified current supplied over contact 132 supplements and assists the force exerted by winding 110.

It will be seen that the windings 111 and 112 of relay JL are energized in series with portions of the primary winding 129 of the transformer 128. On each transfer in energization from one winding to the other of the relay JL there is a reversal in the direction of flow of current in the primary winding 129 of the transformer 128, and a corresponding reversal of the flux in the iron of the transformer core.

As the speed of the train increases the frequency of the operations of contact 100 increases, and there is a corresponding increase in the rate of alternate energizations of wires 104 and 105 and, therefore, in the reversals in the direction of flow of current through the transformer primary winding. With this increase in the frequency of reversals of the flow of current through the primary winding of transformer 128, and in the rate of the reversals in the flux in the transformer core, there is an increase in the impedance of the primary winding portions, and a corresponding decrease in the flow of current through these winding portions, and also through the windings 111 and 112 of relay JL, which are connected in series with the portions of the transformer primary winding.

When the speed of rotation of the axle 1 is increased to a predetermined value, such as a rate corresponding to a vehicle speed in excess of 30 miles an hour, the reversals in current flow through the transformer primary winding 129 are increased to such a degree that the impedance of the winding builds up to a value such that too little current flows in the circuits of the transformer primary winding portions and therefore, in the windings of the relay JL to operate the movable contact 126 of the relay JL. This contact thereafter remains in its last operated position and does not rectify the current supplied from the transformer secondary winding 127 to the winding 106 of relay KL. The winding 106 of relay KL thereafter is energized with alternating current and no longer assists in maintaining the relay contacts picked up.

On the increase in the impedance of the primary winding of the transformer 128, and the corresponding decrease in the magnitude of the current flowing in the circuit of the primary winding, there may be some reduction in the magnitude of the current induced in the transformer secondary winding, and therefore in the current supplied from the transformer secondary winding 127 to the winding 106 of the relay KL. The operating characteristics of the relay KL, however, are such that the contacts of the relay will both pick up and remain picked up when the current supplied to its winding 106 is at the value which is present at the time that the flow of current through the transformer primary winding portions and the windings 111 and 112 of the relay JL becomes insufficient to effect operation of the movable contact 126 of the relay JL. The contacts of relay KL will remain picked up, therefore, until the relay JL becomes inoperative, whereupon the winding 106 of relay KL will no longer be supplied with rectified current and the contacts of relay KL will be released.

As previously pointed out, on an increase in the rate of rotation of the axle 1 there is a reduction in the portion of the total elapsed time in which current is supplied to the windings 107 and 108 of the relay KL, thereby weakening the force created by these windings and tending to hold the contacts of relay KL picked up. The values of the various parts of the system are arranged and proportioned so that the current supplied to the windings 107 and 108 will be sufficient when the axle is rotating at relatively low speeds, such as rates corresponding to vehicle speeds of 5 miles per hour or less, to keep the contacts of relay KL picked up. When the rate of rotation of the axle exceeds this value, the current supplied to the windings 107 and 108 is so greatly diminished that these windings do not exert substantial force tending to maintain the relay contacts picked up.

As soon as the axle starts to rotate, however, circuits are periodically established to the wires 104 and 105, and therefrom to the primary winding 129 of the transformer 128, and accordingly rectified current is supplied from the transformer secondary winding to the winding 106 of the relay KL. At very slow speeds of the axle 1 the impulses of current in the circuit of the wires 104 and 105, and therefore in the windings 111 and 112 of relay JL and the portions of primary winding of transformer 128, are relatively infrequent with the result that the impulses of current supplied to the winding 106 of the relay KL are relatively infrequent, and little force is created by the winding 106 tending to hold the relay contacts picked up. As the rate of rotation of the axle 1 increases, the frequency of the impulses of current to the winding 106 of relay KL increases, and increases the force created by this winding tending to hold the relay contacts picked up.

The various parts of the system are arranged and proportioned so that on an increase in the rate of rotation of the axle 1, the value of the current supplied to the winding 106 increases rapidly enough to compensate for the decrease in the value of the current supplied to the windings 107 and 108. Accordingly, as the force exerted by the windings 107 and 108 diminishes, the force exerted by the winding 106 increases, with the result that the contacts of relay KL are maintained picked up throughout the increase in the rate of rotation of the axle 1 from zero speed to a rate in excess of that at which the windings 107 and 108 are ineffective to hold the contacts of relay KL picked up.

As the rate of rotation of the axle 1 increases further, the frequency of the impulses of current supplied to the primary of the transformer 128 increases to a degree such that the impedance of the transformer winding reduces the flow of current through the circuits of the transformer primary winding portions and the windings 111 and 112 of relay JL, as explained in detail above. When the rate of rotation of the axle 1 reaches a predetermined value, such as the rate corresponding to a vehicle speed of 30 miles an hour, the current flowing in the windings of relay JL is insufficient to effect operation of the movable contact of this relay, and this contact will no longer rectify the current supplied from the transformer secondary winding to the winding 106 of relay KL and the contacts of relay KL are thereupon released, as has previously been explained.

When contact 123 of relay KH is picked up and contact 124 of relay KL is released, a circuit is established for the medium speed brake magnet M so that the braking system of the vehicle is conditioned to provide medium speed braking power. The circuit for magnet M is traced from terminal B through front point of contact 123 of relay KH, back point of contact 124 of relay KL, and magnet M to terminal C.

As previously mentioned, when the contacts of relay KL become released, the circuit for supplying current to the winding 110 of relay KH is interrupted, thereby placing contact 123 of relay KH entirely under the control of winding 109, which at this time is supplied with rectified current from the secondary winding 135 of transformer 133.

The relay JH and the transformer 133 are chosen so that their operating characteristics are such that when the vehicle speed is below a predetermined relatively high speed, such as 60 miles an hour, the current flowing in the circuits of the windings 113 and 114 of the relay JH and the primary winding 134 of the transformer 133 will be sufficient to cause operation of the contact 132 of the relay JH. The relay JH and the transformer 133 are also chosen so that their operating characteristics are such that when the vehicle speed exceeds this predetermined relatively high rate, because of the increase in the impedance of the transformer primary winding 134, the current flowing in the windings 113 and 114 of the relay JH will be so greatly reduced as to be insufficient to cause operation of the contact 132 of relay JH. This contact will thereafter remain in its last operated position and will not rectify the current supplied from the transformer secondary winding 135 to the winding 109 of relay KH. The contact 123 of relay KH will thereupon be released.

On the reduction in current flow in the circuits of the windings 113 and 114 of the relay JH, and in the primary winding 134 of transformer 133, caused by the increase in the impedance of the transformer winding, there may be a reduction in the magnitude of the current induced in the transformer secondary winding, and therefore in the value of the current supplied from the transformer secondary winding to the winding 109 of the relay KH.

The relay KH and the other portions of the system are arranged and proportioned, however, so that the contacts of relay KH will both pick up and remain picked up until the current in winding 109 is reduced to an even lower value than that which is present when the relay JH becomes inoperative. The contact 123 of relay KH, therefore, will remain picked up until the relay JH becomes inoperative, whereupon the contact of relay KH becomes released and interrupts the circuit of the medium speed magnet M. The releasing of the contact of relay KH causes it to engage its back point of contact 123 to energize the high speed magnet H to condition the braking apparatus to provide the high speed braking power.

*Modification shown in Fig. 1A of the drawings*

If desired, the control for windings 111 and 112 of relays JL and JH may be modified as shown in Fig. 1A. In this modification, the circuit for winding 11 of relay JL includes a back contact 137 of relay A2, and the circuit for winding 112 includes a back contact 138 of relay A1.

Thus it will be seen that an engagement of contact 100 with contact 103, a circuit is established to wire 104 and thus to wire 130, but that a circuit is not immediately completed through winding 112 of relay JL as is done in the system shown in Fig. 1. Instead the supply of current to winding 12 of relay JL is delayed until relay A1 becomes released. Relay A1 will not become released for a brief time interval after the circuit to wire 105, and therefore to the wire 116 is interrupted, which will not occur for a brief time interval after the circuit to wire 104 is completed.

Similarly, on movement of contact 100 into engagement with contact 102, a circuit is completed to wire 105 and wire 116, but the circuit from wire 116 through winding 111 of relay JL is not completed until the relay A2 becomes released, which will not occur for a brief time interval after the circuit to wire 104 is interrupted.

On each oscillation of contact 100, there is a brief time interval in which neither winding 111 nor winding 112 of relay JL is energized. This time interval is determined by the release times of relays A1 and A2 and is not affected by changes in the rate of rotation of the axle 1. However, as previously pointed out in connection with the supply of current to the windings 107 and 108 of the relay KL, on an increase in the rate of rotation of the axle 1, the portion of the total elapsed time in which current is supplied to the windings 111 and 112 of relay JL gradually decreases.

It will be seen that with the arrangement shown in Fig. 1A, on an increase in the rate of rotation of the axle 1, there is a reduction in the degree of energization of the windings of the relay JL for two reasons. One cause of the reduction in the degree of energization of these windings is the gradually reduced portion of the total time in which current is supplied to these windings, while the other cause of the reduction in the degree of energization of the windings of the relay JL is the reduction in the flow of current through the primary winding of the transformer associated with the relay occasioned by the increase in impedance on the increase in the frequency of the reversals in the flow of current in the transformer primary winding.

As two different forces are operative to reduce the degree of energization of the windings of relay JL in the system shown in Fig. 1A, the degree of energization of these windings will be reduced more rapidly than it is reduced in the system shown in Fig. 1, in which only a single force is operative to reduce the degree of energization of the windings of the relay JL. It has been found that the rapid reduction in the degree of energization of the windings of relay JL provided by the system shown in Fig. 1A results in a sharper and more clearly defined cut-off point for the relay. Furthermore, the arrangement shown in Fig. 1A provides some protection against variations in the cut-off value of the relay JL due to increases in voltage for the reason that any increase in voltage supplied to relays A1 or A2 tends to maintain the back contacts of these relays open for a greater period, and thus still further reduce the period of energization of windings 111 and 112.

While the modification shown in Fig. 1A has been illustrated and described in connection with the relay JL, it is obvious that the supply of current to the windings of the relay JH may be controlled in the same manner.

*Modification shown in Fig. 1B of the drawings*

In Fig. 1B there is shown a modified form of circuit arrangement which I may employ to effect energization of a winding of the relay KLa by current supplied by the zero-speed relays A1 and A2. In the system shown in Fig. 1B the relay KLa is provided with only two windings, while current is supplied to the same one of these windings by both of the zero-speed relays.

In the operation of this modification, on completion of the circuit to the wire 116 at a time when wire 118 is deenergized, a circuit is established through contact 117 of relay A2 to energize the winding of relay A1. When contact 120 of A1 becomes picked up, a circuit is established through contact 120 to wire 120a leading to the winding 107a of relay KL.

Similarly, when a circuit is established to wire 118 at a time when wire 116 is deenergized, a circuit is completed through contact 119 of relay A1 to the winding of relay A2, while as soon as the contact 121 of relay A2 becomes picked up, a circuit is completed from wire 118 through contact 121 of relay A2 to wire 120a to winding 107a of relay KL.

The ratio of the time during which current is supplied to the winding 107a to the total elapsed time gradually decreases in the manner described in detail in connection with Fig. 1 when the frequency of the interruptions in the establishment of circuits to the wires 116 and 118 is increased. At extremely low vehicle speeds the winding 107a is energized a sufficiently large portion of the time to keep the contacts of relay KLa picked up, but when the vehicle speed is increased to a relatively low value, as in excess of five miles per hour, the time of energization of the winding 107a is reduced to such an extent that this winding is no longer effective to keep the relay contact picked up.

*Construction of system shown in Fig. 2 of the drawings*

Referring next to Fig. 2, I have provided a medium speed control relay KM in addition to the low speed control relay KL and the high speed control relay KH. I have also provided a super high speed brake control magnet SH in addition to the other brake control magnets L, M and H.

When relays KL, KM and KH are all energized, a circuit is closed for low speed brake magnet L so that the normal braking power of the vehicle brake equipment is effective. This circuit is traced from terminal B through front point of contact 150 of relay KH, front point of contact 151 of relay KM, and front point of contact 152 of relay KL.

When low speed relay KL is deenergized and relays KM and KH are both energized, a circuit is established for medium speed brake magnet M, which circuit is traced from terminal B through front point of contact 150 of relay KH, front point of contact 151 of relay KM, and back point of contact 152 of relay KL.

When relay KM is deenergized and relay KH is energized, a circuit is established for high speed brake control magnet H which circuit is traced from terminal B through front point of contact 150 of relay KH, back point of contact 151 of relay KM, and magnet H to terminal C.

When relay KH is released, a circuit is established for the super high speed magnet SH which circuit is traced from terminal B through back point of contact 150 of relay KH and magnet SH to terminal C.

Thus, it will be seen that brake control magnets L, M, H and SH may be selectively controlled in accordance with the condition of relays KL, KM and KH. The brake control magnets L, M and H will ordinarily be utilized to vary the braking power of the vehicle brake equipment in a manner similar to that described for the apparatus shown in the Fig. 1, and magnet SH when energized will usually be effective to condition the braking system to provide the maximum braking power.

Relay KL is controlled by contact 100, zero-speed relays A1 and A2, relay JL and transformer 128 in a manner identical to that described for the corresponding apparatus in Fig. 1. That is, windings 107 and 108 of relay KL are provided to maintain the contacts of relay KL picked up when the vehicle is at rest or is moving at very slow speeds, and the winding 186 of relay KL is controlled by contact 126 of relay JL and transformer 128 to maintain the relay KL in its energized condition when the vehicle is traveling below the speed of approximately 30 miles per hour. When relay KL is energized, energy is supplied over its front contact 153 to winding 154 of relay KM, and winding 155 of relay KH, in series to maintain relays KM and KH in their energized condition.

For controlling the relay KH, I provide the high speed polarized relay JH, and for controlling the relay KM, I provide a medium speed polarized relay JM. For governing the relay JM, I provide a pair of counting or stepping relays C1 and C2, and for controlling the relay JH, I provide a group of counting relays E1, E2, E3 and E4.

Relays C1 and C2 are controlled by each other and by contact 160 which is actuated by cam 161 on axle 1 in such a manner that these relays make a complete cycle of operation once in every two revolutions of axle 1.

Relays E1, E2, E3 and E4 are controlled by contact 160 and by each other in such manner that these relays go through a complete cycle of operation once in every four revolutions of the axle 1.

Thus, it will be seen that the relays C1 and C2 act as a speed reducing mechanism which, as will be explained more in detail hereinafter, provides for alternate energization of windings 162 and 163 of relay JM at a frequency which is proportional to the speed of operation of contact 160, but at a lower rate.

Likewise the counting relays E1, E2, E3 and E4 act as a speed reducing mechanism for alternately energizing windings 164 and 165 at a frequency corresponding to the speed of operation of contact 160, but at a still further reduced rate.

The contact 160 differs from the contact 130 as the contact 160 is arranged so that it will become disengaged from either of the stationary contacts associated therewith before it engages the other stationary contact. This is desirable because if the contact 160 were of the make-before-break type, both stationary contacts would be engaged simultaneously at times with the result that wires 167 and 171 would both be energized, which might cause two or more of the groups of counting relays to be energized simultaneously, thereby interfering with the intended operation of these relays.

The operation of relays C1 and C2 is as follows: Upon the first operation of contact 160, which is assumed to be closing of contact 160-166, winding 168 of relay C1 is energized by a circuit which may be traced over a path from terminal B through contact 160-166, wire 167, upper winding 168 of relay C1, and back point of contact 169 of relay C2 to terminal C. Upon the second operation of contact 160, that is engagement of contacts 160-170, a circuit is established for maintaining relay C1 in its energized condition, and another circuit is also established for causing relay C2 to assume its energized condition. The circuit for maintaining relay C1 energized is traced from terminal B through contact 160-170, wire 171, lower winding 172 of relay C1, and front contact 173 of relay C1 to terminal C. The circuit for energizing relay C2 may be traced over a path which passes from terminal B through contact 160-170, wire 171, lower winding 174 of relay C2, and front contact 175 of relay C1 to terminal C.

Upon the third operation of contact 160 when contact 160-170 becomes open and 160-166 becomes closed, energy is disconnected from lower winding 172 of relay C1 to cause this relay to become released, and a circuit is established for relay C2 to maintain this relay in the energized condition. The last named circuit is traced over a path which passes from terminal B through contact 160-166, wire 167, upper winding 176 of relay C2, and front point of contact 169 of relay C2 to terminal C. On this movement of contact 160 into engagement with contact 166 with the resultant supply of energy to wire 167, the winding 168 of relay C1 does not become energized because the contact 169 of relay C2 is picked up, thereby interrupting the circuit through the winding 168 of relay C1. Accordingly, when the supply of current to the wire 171 is interrupted on the third operation of contact 160, the relay C1 becomes released and its contacts 173 and 175 are opened.

Upon the fifth operation of contact 160, that is, when contact 160-166 becomes open and contact 160-170 becomes closed, the circuit through winding 176 of relay C2 is interrupted so that this relay will assume its released condition.

On this movement of contact 160 into engagement with contact 170 with the resultant completion of a circuit to wire 171, the winding 172 of relay C1 does not become energized since contact 173 of relay C1 is released, thereby interrupting the circuit through winding 172. The contacts of relay C1, therefore, remain released.

Similarly on this completion of the circuit to wire 171, the winding 174 of relay C2 does not become energized since contact 175 of relay C1 is open, thereby interrupting the circuit through the winding 174 of relay C2. As the circuit to wire 167, and therefore to winding 176 of relay C2, is interrupted on this operation of the contact 160, both windings of relay C2 are de-energized, and the contact of this relay become released.

Upon the fifth operation of contact 160, that is when contact 160-166 again becomes closed, which is the start of a new cycle, winding 168 of relay C1 again becomes energized to initiate another cycle of operation similar to that just described for the first four operations of contact 160. The contact 160 makes two operations for each revolution of the axle 1, and since the contacts of relay C1 become picked up and released once for each four operations of contact 160, that is, once for each two revolutions of axle 1, it will be plain that contact 178 of relay C1 may be utilized to effect the alternate energization of windings 162 and 163 of relay JM, and of the right-hand and left-hand portions of the primary winding of the transformer 197 associated with relay JM, at a frequency which will be exactly one-half the rate of operation of contact 160.

In addition, it will be seen that contact 178 of relay C1 becomes picked up on the first operation of contact 160, and remains picked up until the third operation of contact 160, whereupon the contact is released and remains released until the first operation of contact 160 in a new cycle of operation, with the result that the periods in which current is supplied to the windings 162 and 163 of relay JM are of substantially equal length.

*Operation of the counting relays employed in the system shown in Fig. 2 of the drawings*

The counting relays E1, E2, E3 and E4 operate as follows: Upon the first operation of contact 160, that is closing of contact 160—166, winding 180 of relay E1 becomes energized by a circuit which passes from terminal B through contact 160—166, wire 167, upper winding 180 of relay E1, and back point of contact 181 of relay E4.

Upon the second operation of contact 160, which is closing of contact 160—170, winding 182 of relay E2 becomes energized by a circuit which passes from terminal B through contact 160—170, wire 171, upper winding 182 of relay E2, and front contact 183 of relay E1 to terminal C1. Relay E1 is maintained in its energized condition even though contact 160—166 becomes open because another circuit is established for relay E1 which circuit may be traced from terminal B through contact 160—170, wire 171, lower winding 184 of relay E1, and front contact 185 of relay E1 to terminal C.

Upon the third operation of contact 160, that is, when a circuit is again established to wire 167, upper winding 180 of relay E1 is again energized by the previously traced circuit for this winding, and winding 186 of relay E3 becomes energized by a circuit which includes wire 167, upper winding 186 of relay E3, and front contact 187 of relay E2, the latter contact being maintained picked up because the lower winding 188 of relay E2 receives energy from wire 167 over a circuit which includes front contact 189 of relay E2.

Upon the fourth operation of contact 160, that is, when energy is again supplied to wire 171, lower winding 184 of relay E1 and upper winding 182 of relay E2 both receive energy over the previously traced circuits to maintain these relays in their energized condition. Relay E3 is also maintained in its energized condition because its lower winding 190 is energized by current from wire 171 through a circuit which includes front contact 191 of relay E3. Upon this operation of contact 160, relay E4 becomes energized because its upper winding 192 receives energy from a circuit which includes wire 171, upper winding 192 of relay E4 and front contact 193 of relay E3.

Upon the fifth operation of contact 160, that is, when a circuit is established to wire 167, relays E2 and E3 are maintained in their energized condition because windings 188 and 186 of these relays respectively, are energized over their previously traced circuits. Relay E4 is also maintained in its energized condition by a circuit which includes wire 167, lower winding 194 of relay E4 and front point of contact 181 of relay E4. Upon this operation of contact 160, however, relay E1 becomes released because the circuit for its upper winding 180 became opened by the opening of the back point of contact 181 of relay E4 which occurred when contact 181 was picked up on the fourth operation of contact 160.

Upon the sixth operation of contact 160, that is, when a circuit is established to wire 171 and the circuit to wire 167 is interrupted, relay E2 becomes released because the circuit through its winding 182 is interrupted by the opening of contact 183 of relay E1, but relays E3 and E4 remain energized because lower winding 190 of relay E3 receives energy over a circuit which includes front contact 191 of relay E3, and upper winding 192 of relay E4 receives energy over a circuit which includes front contact 193 of relay E3.

Upon the seventh operation of contact 160, that is, when a circuit is established to wire 167 and the circuit to wire 171 is interrupted, relay E3 becomes released because its upper winding 186 is deenergized as the circuit of this winding was interrupted by the opening of front contact 187 of relay E2, but relay E4 remains in its energized condition because its lower winding 194 is energized over front point of contact 181 of relay E4. Upon this operation of contact 160 to complete the circuit to wire 167, the winding 180 of relay E1 does not become energized because the contact 181 of relay E4 is picked up, thereby interrupting the circuit through the winding 180 of relay E1.

Upon the eighth operation of contact 160, that is, when a circuit is again completed to wire 171 and the circuit to wire 167 is interrupted, relay E4 becomes released because the circuit for its upper winding 192 became interrupted by the opening of front contact 193 of relay E3. The closing of back point of contact 181 of relay E4 conditions the pick-up circuit for upper winding 180 of relay E1 so that upon the ninth operation of contact 160, that is the first operation in a new cycle of operations, when a circuit is again completed to wire 167, the relay E1 becomes energized and a new cycle of operations of the counting relays E1, E2, E3 and E4 is initiated.

From the foregoing description of the operation of the counting relays, it is apparent that contact 196 of relay E1 picks up and releases once for each eight operations of contact 160. Furthermore, it will be seen that the contacts of relay E1 become picked up on the first operation of contact 160, and become released on the fifth operation of contact 160 so that the periods in which the relay is energized and deenergized are of substantially equal duration. Contact 160 being operated twice for each revolution of axle 1, it follows that contact 196 of relay E1 will pick up and release once for each four revolutions of axle 1. Thus, the alternate energizations of windings 164 and 165 of relay JH, and of the right-hand and left-hand portions of the primary winding of transformer 198 associated with relay JH, the circuits of which are controlled by contact 196, are made at a frequency corresponding to the speed of the vehicle, but at a rate which is still lower than the energizations of relay JM.

The relay JM and the transformer 197 associated therewith may, for example, be so chosen and adjusted that, when periodically energized at a frequency corresponding to a vehicle speed of approximately 60 miles per hour, the flow of current in the relay windings will be so greatly reduced because of the impedance of the transformer winding that contact 200 of relay JM will become inoperative. Similarly, relay JH and the transformer 198 associated therewith may, for example, be so chosen and adjusted that, when periodically energized at a frequency corresponding to speeds in excess of 90 miles per hour, contact 201 of relay JH will become inoperative.

*Operation of the system shown in Fig. 2 of the drawings*

As previously stated, the relay JL and the transformer 128 associated therewith are so chosen that when periodically energized at a frequency corresponding to speeds in excess of 30 miles an hour, contact 126 of relay JL will be inoperative.

I shall first assume that the train is traveling at some slow speed say, for example, 20 miles per hour at which speed neither winding 107 nor winding 108 of relay KL will be supplied with sufficient energy by the zero-speed relays A1 and A2, for reasons explained in detail in connection with the system shown in Fig. 1, to maintain the contacts of relay KL picked up with the result that the control of relay KL will depend entirely upon the energy received through contact 126 of relay JL and transformer 128. In addition, during this movement of the train, the axle 1 is rotated so that contact 160 alternately engages contacts 166 and 170 with the result that the contact 178 of counting relay C1 is periodically operated, as described in detail above, to alternately energize the windings 162 and 163 of relay JM and the two portions of the primary winding of transformer 197.

Similarly, the contact 196 of counting relay E1 is operated to alternately energize the windings 164 and 165 of relay JH and the portions of the primary winding of transformer 198.

Since the contacts 178 and 196 of relays C1 and E1 are operated at rates proportionately lower than the rate at which contact 160 is operated, at comparatively low train speeds the impulses of current supplied by the contacts 178 and 196 to the primary windings of transformers 197 and 198 will be relatively infrequent. Accordingly, the impulses of current supplied from the secondary windings of transformers 197 and 198 to the windings 202 and 203 of relays KM and KH, respectively, will be relatively infrequent, and at extremely low train speeds these impulses of current to the windings 202 and 203 may be too infrequent to energize these windings to a degree sufficient to cause these windings to hold the contacts of the relays picked up. This is immaterial, however, as the windings 154 and 155 of relays KM and KH are energized at this time through the circuit controlled by contact 153 of relay KL and operate to maintain the relay contacts picked up.

When the speed of the vehicle is increased to some point above 30 miles per hour, relay JL becomes inoperative, as described in detail in connection with the system shown in Fig. 1, and the contact 126 no longer rectifies the current supplied to winding 106 of relay KL. Accordingly the contacts of relay KL are released and the medium speed magnet M is effective to determine the condition of the braking system of the vehicle, while windings 154 and 155 of relays KM and KH are both deenergized. The contacts of relays KM and KH do not, however, become released on this deenergization of the relay windings 154 and 155 because, in the meantime, the rate of operation of contact 178 of relay C1 and contact 196 of relay E1, respectively, will have increased to such a degree that sufficient rectified current is supplied to upper winding 202 of relay KM and to upper winding 203 of relay KH to render these windings effective to maintain the relay contacts picked up.

I shall next assume that the speed of the vehicle is increased to some value in excess of 60 miles per hour. Under this condition, the periodic energization of windings 162 and 163 of relay JM will be of such frequency that the impedance of the primary winding of transformer 197 will be high enough to reduce the current flow in the windings of relay JM to a value to render this relay inoperative. As a result, the contact 151 of relay KM will become released and will energize the high speed brake control magnet H to condition the braking system for the high speed braking power.

I shall next assume that the speed of the vehicle is increased to some speed in excess of 90 miles per hour. Under this condition, the operation of contact 196 of relay E1 will be so rapid as to render the relay JH inoperative with the result that contact 150 of relay KH will become released. When contact 150 of relay KH is released, the super high speed magnet HS will be energized to condition the braking system for applying the braking power necessary at this high speed.

As the train speed reduces, relays JH, JM and JL will again become effective to selectively control the brake governing magnets L, M, H and SH so that the braking system of the vehicle will be properly conditioned in accordance with the speed of the vehicle.

*Modification shown in Fig. 2A of the drawings*

If desired, windings 162 and 163 of polarized relay JM may be controlled by contact 205 of relay E2 and contacts 206 and 207 of relay E4 as indicated in Fig. 2A. That is, relays C1 and C2 can be dispensed with and windings 162 and 163 of relay JM controlled as follows: Starting with all the relays E deenergized, at the start of the second period of operation of contact 160, relay E2 will be energized and its contact 205 will become picked up with the result that during the periods following the second and third operations of contact 160 winding 163 of relay JM will receive current through front point of contact 205 of relay E2 and back point of contact 206 of relay E4.

During the periods following the fourth and fifth operations of the contact 160, the contacts of relay E4 are also picked up and winding 162 of relay JM will receive current through front point of contact 205 of relay E2 and front point of contact 206 of relay E4.

During the periods following the sixth and seventh operations of contact 160, the contacts of relay E2 are released while the contacts of relay E4 remain picked up and winding 163 of relay JM will receive current through back point of contact 205 of relay E2 and front point of contact 207 of relay E4.

During the period following the eighth operation of contact 160 and the period following the first operation of contact 160 in the next cycle of operation, the contacts of relays E2 and E4 are released and winding 162 of relay JM will receive current through the back point of contact 205 of relay E2 and back point of contact 207 of relay E4.

From the foregoing explanation, it will be seen that in the system shown in Fig. 2A windings 162 and 163 are alternately energized at a rate which is exactly twice the rate of energization of windings 164 and 165 of relay JH. In other words, the rate of energization of windings 162 and 163 with the arrangement shown in Fig. 2A will be the same as that described for the apparatus shown in Fig. 2.

While the modifications shown in Figs. 1A and 1B have been shown and described in connection with the system shown in Fig. 1, it is to be understood that the system shown in Fig. 2 may be altered to include these modifications if desired.

Thus the supply of current to the relay JL in the system shown in Fig. 2 of the drawings may be controlled by the relays A1 and A2 in the manner shown in Fig. 1A, while the relay KL employed in the system shown in Fig. 2 may be provided with but two windings instead of three, and the relays A1 and A2 arranged to supply current to the same one of these windings in the manner shown in Fig. 1B.

Construction of system shown in Fig. 3 of the drawings

Referring to Fig. 3 of the drawings, I have illustrated therein a modified form of speed responsive mechanism embodying my invention. This form of speed responsive mechanism is adapted for use on a vehicle equipped with signal apparatus which is selectively responsive to different kinds of current impulses transmitted through the track rails, or otherwise, in accordance with traffic conditions in advance.

The mechanism shown in this figure of the drawings includes a brake control magnet valve device H which, when deenergized, effects an application of the brakes, while the speed responsive mechanism is arranged to maintain the magnet valve device H energized at all times except when the vehicle speed exceeds either of a plurality of permissible limits, the particular limit which is in effect being determined by the vehicle carried signal apparatus.

The system shown in Fig. 3 of the drawings is similar to that shown in Fig. 2 and includes contacts 220 and 221 which correspond to the contacts 100 and 160 of the system shown in Fig. 2, and are actuated by a suitable cam 222 mounted on the vehicle axle 223.

The system shown in Figs. 3 of the drawings includes zero-speed relays A4 and A5, while it also includes a chain of four counting relays E5, E6, E7 and E8. This system also includes a control relay CR which controls the brake magnet valve device Q, and a master relay MR, which controls energization of a winding of the control relay CR.

The system employs, in addition, the train control relay TCR which forms a part of the train control or vehicle carried signal apparatus. The relay TCR has a plurality of movable contacts which are movable to a plurality of positions. When the winding of the relay TCR is deenergized, the movable contacts of this relay occupy an intermediate or vertical position. This is the low speed position of the contacts. When the relay winding is energized with current of one character, the relay contacts are caused to move to their right-hand or medium speed positions, while when the relay winding is energized with current of a different character, the relay contacts are caused to occupy their left-hand or high speed positions, as shown in Fig. 3 of the drawings.

The details of the train control apparatus or vehicle carried signal mechanism which controls the supply of current to the winding of the relay TCR forms no part of this invention, and any suitable apparatus well-known in the railway signalling art may be employed for this purpose.

The zero-speed relays A4 and A5 are provided for the purpose of maintaining a winding of the control relay CR energized when the vehicle is standing still or is moving at extremely low speed.

The zero-speed relays A4 and A5 are controlled by the contact 220 in a manner similar to that described in detail in connection with the system shown in Fig. 1 of the drawings.

The contact 220 is of the make-before-break type so that it is always in engagement with one or the other of the stationary contacts 225 and 226. The contact 225 is connected by a wire 228 to a movable contact 229 of relay A5, while contact 226 is connected by a wire 230 to a movable contact 231 of relay A4.

When the relay A5 is deenergized, as shown, the contact 229 engages its back point of contact to establish a circuit from one terminal B of a suitable source of electric current through contacts 220 and 225, wire 228 to wire 232 which is connected to one terminal of the winding of the relay A4. The other terminal of the winding of the relay A4 is connected by a wire 235 to the terminal at the left-hand end of the primary winding 236 of the transformer 238. The center tap of the primary winding 236 is connected to the other terminal C of the same source of current as that to which the contact 220 is connected.

When contact 220 engages contact 226 and relay A5 is deenergized, therefore, the winding of relay A4 will be energized in series with the left-hand portion of the primary winding 236 of transformer 238.

When the winding of relay A4 is energized, its contact 240 engages its front point of contact, thereby establishing connection between the wire 232 and wire 242 leading to one terminal of the winding 243 of relay CR. The other terminal of the winding 243 is connected by a wire 244 in series with a ballast lamp 245, the characteristics of which are hereinafter explained in detail, to the terminal C of the same source of current as that to which the contact 220 is connected. Accordingly, when relay A4 is energized, current will be supplied to the winding 243 of relay CR by way of a circuit which includes the ballast lamp 245 in series.

In addition, at a time when the relay A4 is energized and the relay A5 is deenergized, the contact 247 of the relay A5 engages its back point of contact to thereby connect the end terminal of the right-hand portion of the secondary winding 249 of transformer 238 to a wire 250 which is connected to one terminal of the winding 252 of relay CR. The other terminal of the winding 252 of relay CR is connected by a wire 253 to a stationary contact 254 associated with the train control relay TCR.

The contact 254 is engaged at certain times by a movable contact 255 of the relay TCR, while the movable contact 255 is connected by a wire 257 with the center tap of the secondary winding 249 of transformer 238.

Accordingly, at a time when the relay A5 is deenergized, current induced in the right-hand portion of the transformer secondary winding 249 as a result of the supply of current to and the interruption in the supply of current to the left-hand portion of the transformer primary winding 226 will be supplied to the winding 252 of the relay CR providing the movable contact 255 of the train control relay TCR is in its high speed position as shown in Fig. 3 of the drawings.

When as a result of rotation of the axle 223, the cam 222 is moved to a position to permit the movable contact 220 to move into engagement with the stationary contact 26 and out of engagement with the contact 225, the relay A4 becomes deenergized because of the interruption in the supply of current to its winding due to operation of contact 220, while the terminal B is connected to the wire 230, and when the contact 231 of relay A4 engages its back point of contact, the wire 230 is connected to wire 259 which is connected to one terminal of the winding of the relay A5. The other terminal of the winding of the relay A5 is connected by the wire 260 to the terminal at the right-hand end of the primary winding 226 of transformer 238, while the center terminal of this winding is connected to the terminal C of the same source of current as that to which contact 220 is connected.

It will be seen, therefore, that when contact 220 is out of engagement with contact 225 and in engagement with contact 226, a circuit is established from terminal B through the winding of relay A5 and through the right-hand portion of the primary winding 226 of transformer 238 as soon as contact 231 of relay A4 engages its back point of contact.

On energization of the winding of relay A5, its contacts become picked up, and when the movable contact 262 of relay A5 engages its front point of contact, a circuit is established from wire 259 to wire 242 leading to the winding 243 of relay CR, the other terminal of which is connected in series with ballast lamp 245 to the terminal C of the source of current.

On energization of the winding of relay A5, its contact 247 becomes picked up, thereby interrupting the connection between the right-hand end portion of secondary winding 249 of transformer 238 and the wire 250, while on deenergization of the winding of relay A4, its contact 261 engages its back point of contact, thereby establishing a connection from the left-hand end portion of the transformer secondary winding 249 to the wire 250 with the result that current induced in the transformer secondary winding by current supplied through the contact 231 of relay A4 to the transformer primary winding will be supplied by way of the wire 250 to energize the winding 252 of relay CR.

On a subsequent operation of the contact 220 by the cam 22 so that the contact 220 no longer engages the contact 226 and again engages the contact 225, the relay A5 becomes deenergized due to the interruption in the supply of current to its winding on movement of contact 220 out of engagement with contact 226, and contact 247 of relay A5 establishes a connection to permit the supply of current from the right-hand portion of transformer secondary winding 249 to the wire 250 and thereby to the winding 252 of relay CR, while the relay A4 again becomes energized and effects the supply of current to wire 242 leading to the winding 243 of relay CR.

As will be understood, the various portions of the primary and secondary windings of the transformer 238 are arranged so that the current supplied from the secondary winding 249 to the wire 250, and thereby to the winding 252 of relay CR, will always flow in the same direction and so that the direction of flow will be such that the force created on energization of the winding 252 will assist the winding 243 in maintaining the contacts of the relay CR picked up.

As explained in detail in connection with the system shown in Fig. 1 of the drawings, on each movement of contact 220 into engagement with one stationary contact and out of engagement with the other stationary contact, the supply of current to the winding 243 of relay CR is interrupted, while one of the zero-speed relays becomes deenergized. Thereafter, after a period of time the duration of which is determined by the time required for one zero-speed relay to release and for the other to pick up, the other zero-speed relay becomes energized and effects the supply of current to the winding 243 of relay CR.

The winding 243 of relay CR, therefore, is periodically supplied with current, there being intervals between each supply period in which no current is supplied. The intervals in which no current is supplied are substantially constant irrespective of the speed at which the axle 223 is rotated, as it is determined by the release time of one of the zero-speed relays plus the pick-up time of the other of these relays. As the frequency of current interruption increases due to the increase in the speed of rotation of the axle 223, the portion of the total elapsed time in which current is supplied to the winding 243 progressively diminishes, and the various parts of the apparatus are arranged and proportioned so that when the axle 223 is rotated at a speed corresponding to a relatively low vehicle speed, such as 5 miles per hour, insufficient current is supplied to the winding 243 to energize this winding to cause the contacts of the relay CR to be held in their picked up positions. At this point, therefore, and at higher vehicle speeds, the relay CR is no longer controlled by the zero-speed relays A4 and A5. However, at extremely low vehicle speeds, due to operation of the zero-speed relays A4 and A5, the contact 263 of control relay CR will be picked up and will establish a circuit to energize the brake control magnet valve device Q and prevent this device from effecting an application of the brakes.

Similarly, when the vehicle is standing still, the contact 220 will be in engagement with one or the other of the stationary contacts 225 and 226 with the result that the contacts of one or the other of the zero-speed relays will be picked up and will establish a circuit to supply current to the winding 243 of relay CR to cause the contacts of this relay to be picked up and thus effect energization of the brake control magnet valve device Q.

Under most operating conditions, before the vehicle speed has increased to a value high enough to cause the zero-speed relays A4 and A5 to reduce the supply of current to the winding 243 of relay CR to a value insufficient to maintain the relay contacts picked up, the master relay MR will be caused to effect a sufficient supply of rectified current to the winding 264 of relay CR to maintain the relay contacts picked up. However, when the train control relay TCR is conditioned to permit high speed operation, the master relay MR, as will be explained in detail hereinafter, is operated at a relatively slow speed with the result that at comparatively low train speeds, the master relay MR will not supply sufficient current to the winding 264 of relay CR to maintain the relay contacts picked up, and the energization of winding 243 being diminished by operation of the relays A4 and A5, the relay contacts might become released unless some supplementary means is provided to maintain them picked up.

The transformer 238 and the winding 252 of relay CR are provided to maintain the contacts of the relay CR picked up under these circumstances.

It will be seen that when the contact 255 of train control relay TCR is in its high speed position, as shown in Fig. 3 of the drawings, a circuit is established between wire 257, leading from the center tap of the secondary winding 249 of the transformer 238, to the wire 253 connected to one terminal of the winding 252 of relay CR, while the other terminal of winding 252 is connected by wire 250 to one or the other portions of the transformer secondary winding 249. When axle operated contact 220 moves out of engagement with one of the stationary contacts associated therewith, the supply of current to one portion of the transformer primary winding 226 is interrupted and the resulting change in flux in the transformer core induces a current in the transformer secondary winding 249 which current is supplied to the winding 252 of relay CR as explained above.

Similarly, on each movement of the contact 220 into engagement with a stationary contact associated therewith, and on subsequent energization of the winding and picking up of the contacts of the one of the zero-speed relays which is energized over that stationary contact, current is supplied to a portion of the transformer primary winding 236 and the resulting flux change in the transformer core causes current to be induced in the transformer secondary winding and this current is supplied to the winding 252 of relay CR.

It will be seen, therefore, that the transformer 238 and associated apparatus operates to effect the supply of an impulse of current to the winding 252 of relay CR on each movement of contact 220 into or out of engagement with either of the associated stationary contacts, that is, at twice the frequency of the impulses supplied to the winding 243 of relay CR. The various parts of the system are arranged and proportioned so that the impulses of current supplied to the winding 252 of relay CR will energize this winding to a degree sufficient to maintain the contacts of the relay picked up until the axle 223 is rotated at a substantially higher speed than is necessary to cause the degree of energization of the winding 243 of relay CR to be reduced to such a degree that the winding 243 is no longer able to hold the relay contacts picked up.

It will be seen that when the axle 223 is rotated and the contact 220 is caused to move between its two positions, the primary winding 249 of transformer 238 is alternately energized from opposite ends. With each such change in the end at which current is supplied to the transformer primary winding, there is a reversal in the direction of flow of current in the transformer primary winding and consequently a reversal in the flux in the transformer 4.

As the speed of the axle 223 is increased, there is an increase in the frequency of the reversals of current flow in the transformer primary winding and a corresponding increase in the impedance of the transformer primary winding portions, and a corresponding decrease in the flow of current in the transformer primary windings, and also in the windings of the zero-speed relays A4 and A5 which are connected in series with the transformer primary winding portions.

When the current flow in the circuits of the transformer primary winding portions is reduced to a predetermined value, the current flow in the winding of one or the other of the zero-speed relays is insufficient to maintain the contacts of the relay picked up or to cause them to be picked up, and thereafter the contacts of this relay remain in their released positions with the result that one end portion of the transformer secondary winding is thereafter constantly connected to the wire 250 leading to the winding 252 of relay CR.

On the subsequent supply of current in alternate directions to the primary winding 236 of transformer 238 alternating current is supplied by the portion of the transformer secondary winding controlled by the released one of the zero-speed relays to the wire 250 and thereby to the winding 252 of relay CR. This alternating current flowing in the winding 252 of relay CR is not effective to create force to assist in maintaining the relay contacts picked up. The contacts of relay CR, therefore, will become released at this time unless sufficient current is supplied to the winding 264, as will hereinafter be explained in detail, to maintain the relay contacts picked up.

From the foregoing it will be seen that when the vehicle is standing still or is traveling at a very slow speed, the zero-speed relays A4 and A5 effect the supply of sufficient current to the winding 243 of relay CR to maintain the contacts of this relay picked up. As the speed of the vehicle increases, the degree of energization of the winding 243 is reduced. At the same time, assuming that contact 255 of relay TCR is in the high speed position as shown in Fig. 3 of the drawings, the degree of energization of the winding 252 of relay CR is increased as a result of operation of the transformer 238 and associated apparatus. This increase in energization of the winding 252 is sufficient to offset the reduction in energization of winding 243 and causes the contacts of the relay CR to be maintained picked up.

Similarly, on a further increase in the vehicle speed so that the degree of energization of winding 252 is diminished, there is an increase in the degree of energization of winding 264 for reasons to be hereinafter explained in detail. This increase in the degree of energization of winding 264 is rapid enough to offset the decrease in the degree of energization of winding 252 with the result that the contacts of relay CR are maintained picked up until the speed of the vehicle is increased to a degree such that winding 264 is no longer energized sufficiently to maintain the contacts of relay CR picked up.

When the contact 255 of relay TCR is in its low speed position, in which it engages stationary contact 266, or is in the medium speed position, in which it engages contact 267, a circuit is established which short circuits one-half of the secondary winding 249 of transformer 238. This circuit is traced from the center tap of the transformer secondary winding 249 through wire 257, contact 255, contact 266 or 267, and wire 269 to the terminal at the left-hand end of the transformer secondary winding 249.

When the end portion of the transformer secondary winding is short circuited, no current is supplied from the transformer secondary winding to the winding 252 of relay CR, and hence this winding is ineffective to assist in maintaining the contacts of the relay picked up.

However, at a time when the contact 255 of the train control relay TCR is in the low speed or medium speed position, the master relay MR is conditioned to operate at a substantially more rapid rate at the same train speed than the speed at which it operates when the contact 255 of relay TCR is in the high speed position. Accordingly, the master relay MR will operate to supply current in sufficient degree to winding 264 of relay CR to energize this winding to cause it to maintain the relay contacts picked up.

When one end portion of the secondary winding is short circuited in this manner, there is a reduction in the impedance to the flow of current in the transformer primary winding portions on the repeated reversals in current flow in this winding occasioned by operation of the contact 220. As a result of this reduction in the impedance of the transformer primary winding, there will be a greater flow of current in the circuits of the transformer primary winding portions and a consequent more rapid increase in the current in the windings of the zero-speed relays A4 and A5 with the result that these relays will pick up more promptly. This results in a reduction in the duration of the periods in which no energy is supplied to the winding 243 of relay CR, and thereby slightly increases the degree of effective energization of this winding for a given train speed over that which is present when the portion of the transformer secondary winding is not short circuited.

The values of the various portions of the equipment are selected with this characteristic of the system in view, and these values are such that with the contacts of relay TCR in their low or medium speed positions, the supply of current by the zero-speed relays A4 and A5 to the winding 243 of relay CR will be reduced to a low ineffective value before the vehicle speed has been increased to a rate such that the relay MR becomes ineffective to supply rectified current to the winding 264 of relay CR.

The counting relays E5, E6, E7 and E8 employed in the system shown in Fig. 3 of the drawings operate in a manner similar to the counting relays employed in the system shown in Fig. 2 of the drawings. When the movable contacts of the train control relay TCR are in their high speed positions as shown in Fig. 3 of the drawings, the counting relays are operated to go through a complete cycle of operation every four revolutions of the vehicle axle 223, while they effect operation of the relay MR once for every cycle of operation, that is, once for each four revolutions of the vehicle axle.

Similarly, when the contacts of relay TCR are in their medium speed or right-hand positions, the counting relays effect operation of the relay MR once every two revolutions of the axle 223, while when the contacts of the relay TCR are in their center or low speed positions, the counting relays also effect operation of the relay MR once every two revolutions of the axle 223, but effect energization of different portions of the primary windings of transformer 279 than are energized when the relay TCR is conditioned to permit medium speed movement of the train.

When the contacts of relay TCR are in their high speed positions as shown, the contact 275 of relay TCR establishes connection from the wire 276, leading from one terminal of the upper winding 278 of relay E6, to wire 280 leading to a stationary contact which is engaged by a movable contact 281 of the relay E5 when the contacts of relay E5 are picked up.

In addition, in this condition of the relay TCR, the movable contact 282 thereof, which is constantly connected to the terminal B of the source of energy, engages a stationary contact which is connected by a wire 283 to a movable contact 284 of the relay E7. The front point of contact of contact 284 is connected by a wire 285 to an intermediate tap on the primary winding 286 of transformer 279, while the back point of contact of contact 284 is connected by a wire 288 to an intermediate tap on the primary winding 290 of transformer 279.

One end terminal of primary winding 286 of transformer 279 is connected by a wire 292 to one terminal of the armature winding 293 of the polarized relay MR, while an end terminal of primary winding 290 of transformer 279 is connected by a wire 295 to the armature winding 296 of the relay MR. The other terminal of each of the windings 293 and 296 of relay MR is connected to a branch of the wire 244, and thereby in series with the ballast lamp 245 to the terminal C of the same source of current as that to which contact 282 of the train control relay TCR is connected.

The relay MR employed in this figure of the drawings has a field winding 349 and the armature windings 293 and 296. The armature windings 293 and 296 of relay MR are mounted on a movable armature for operating the relay contact 298.

The armature windings 293 and 296 of relay MR are arranged so that when one of these windings is energized, the movable contact 298 of the relay MR is caused to move to its left-hand position as shown in Fig. 3 of the drawings, while when the other of these windings is energized, the movable contact 298 is caused to move to its right-hand position.

The movable contact 298 of relay MR is connected by a wire 299 to one terminal of the winding 264 of relay CR, while the other terminal of this winding is connected by a wire 300 to a center tap of the secondary winding 301 of transformer 279. The contact 298 of relay MR when in one position engages a stationary contact which is connected by a wire 302 to one terminal of the secondary winding 301, while in the other position of the contact 298 it engages another stationary contact which is connected by way of a wire 303 to the other end terminal of the secondary winding 301 of the transformer 279. The contact 298 serves to rectify the current supplied from the secondary winding 303 of transformer 279 with the result that current of one relative polarity is predominant in the current which is supplied to the winding 264 of relay CR.

*Operation of counting relays employed in the system shown in Fig. 3 of the drawings when train control relay is in its high speed position*

In the operation of the counting relays with the train control relay TCR conditioned, as shown, to permit high speed running, assuming that all of the counting relays are deenergized, then on the first operation of the contact 221, which is assumed to be movement of the contact 221 into engagement with contact 270, a circuit is established to energize the upper winding 305 of relay E5. This circuit is traced from terminal B, contact 221, contact 270, wire 304, winding 305 of relay E5, wire 306, back point of contact 308 of relay E8, and wire 310 to terminal C of the source of current. The winding 305 of relay E5, therefore, is energized and the contacts 311 and 281 of relay E5 are picked up and engage their front points of contact.

On the second operation of contact 221, which is movement of contact 221 out of engagement with contact 270 and into engagement with contact 272, the circuit to wire 304 is interrupted, while a circuit is established to wire 312. On the completion of the circuit to wire 312, a circuit is completed by a branch of this wire to the lower winding 314 of relay E5, and then by a wire 315 to front point of contact of contact 311 and a branch of wire 310 to terminal C.

In addition, on this establishment of a circuit to the wire 312, a circuit is completed through the upper winding 278 of relay E6, and thence by wire 276, contact 275 of relay TCR, wire 280, front point of contact of contact 281 of relay E5 and a branch of the wire 310 to terminal C. The winding 278 of relay E6, therefore, will be energized and the movable contacts 307 and 309 of this relay are picked up and engage their front points of contact.

On the third operation of contact 221, that is, movement of the contact out of engagement with the stationary contact 272 and into engagement with the stationary contact 270, the upper winding 305 of relay E5 is again energized to maintain the contacts of this relay picked up, while a circuit is completed which includes the wire 304, the lower winding 316 of relay E6, wire 317, and front point of contact 309 of relay E6, a branch of the wire 310, and the terminal C of the source of current.

As the winding 316 of relay E6 is energized, the movable contacts 307 and 309 of this relay are maintained picked up.

In addition, on this third operation of the contact 221, with the resultant completion of a circuit to the wire 304, a circuit is completed through the upper winding 318 of relay E7 and thence by a wire 319 and front point of contact 307 of relay E6 to a branch of the wire 310 and to terminal C of the source of current. As the winding 318 of relay E7 is energized, the contacts 322 and 323 of relay E7 will be picked up and will engage their front points of contact.

On the fourth operation of contact 221, that is, movement out of engagement with contact 270 and into engagement with contact 272, the winding 314 of relay E5 and the winding 278 of relay E6 are energized over the previously traced circuits with the result that the movable contacts of these relays are maintained picked up. In addition, on this fourth operation of contact 221, a circuit is completed which includes the wire 312, lower winding 324 of winding E7, wire 325, front point of contact of contact 322 of relay E7, and a branch of the wire 310 and to the terminal C of the source of current. As the winding 324 is energized, the movable contacts 322 and 323 of relay E7 are maintained picked up.

In addition, on this fourth operation of contact 221, that is, movement of contact 221 into engagement with contact 272 to which is connected the wire 312, a circuit is completed through the upper winding 327 of relay E8, wire 328, front point of contact 323 of relay E7, which at this time is picked up, and a branch of the wire 310 to the terminal C of the source of current. As the winding 327 of the relay E8 is energized, the movable contact 308 thereof is moved out of engagement with its back point of contact and into engagement with its front point of contact.

On the fifth operation of contact 221, that is, movement of contact 221 out of engagement with contact 272 and into engagement with contact 270, a circuit is again completed from the terminal B to the wire 304 with the result that the winding 316 of relay E6 and the winding 318 of relay E7 are again energized through the previously traced circuits for these windings.

At this time, however, the winding 305 of relay E5 is not energized since the circuit of this winding is interrupted because the contact 308 of relay E8 is no longer in engagement with its back point of contact. Accordingly, the movable contacts 311 and 281 of relay E5 become released.

In addition, on this fifth operation of contact 221, a circuit is completed through the wire 304 and the winding 330 of relay E8, and thence by a wire 331 and the front point of contact of contact 308 of relay E8 to a branch of the wire 310 and to the terminal C of the source of current. As the winding 330 of relay E8 is energized, the contact 308 of relay E8 is maintained picked up.

On the sixth operation of contact 221, that is, movement of the contact out of engagement with contact 270 and into engagement with contact 272, a circuit is completed from the terminal B to wire 312 and the winding 324 of relay E7, and winding 327 of relay E8 are energized over the previously traced circuits for these windings. At this time, as the movable contact 311 of relay E5 is in its released position, the circuit through the winding 314 of the relay E5 is interrupted and this winding remains deenergized.

Similarly, as the contact 281 of relay E5 is in its released position, the circuit through the winding 278 of relay E6 is interrupted and this winding does not become energized. Accordingly, the contacts 307 and 309 of relay E6 will become released upon this the sixth operation of contact 221.

On the seventh operation of contact 221, that is, movement of the contact out of engagement with contact 272 and into engagement with contact 270, current is supplied to the winding 330 of relay E8 over the previously traced circuit. At this time, as the contact 308 of the relay E8 is in its engagement with its front point of contact, the circuit of the winding 305 of relay E5 is interrupted and this winding remains deenergized.

Similarly, as the contact 309 of relay E6 is in its released position, the circuit through the lower winding 316 of relay E6 is interrupted and the winding 316 remains deenergized and the contacts of relay E6 remain in their released positions.

Likewise, as the contact 307 of relay E6 is in its released position, the circuit through the winding 318 of relay E7 is interrupted and this winding does not become energized on the completion of the circuit to the wire 304. As the winding 324 of relay E7 is deenergized on interruption of the circuit to the wire 312, the movable contacts 322 and 323 of relay E7 become released.

On the eighth operation of contact 221, that is, movement out of engagement with contact 270 and into engagement with contact 272, the supply of current to winding 330 of relay E8 is interrupted, while at this time, as the circuit through the winding 327 of relay E8 is interrupted since contact 323 of relay E7 is in its released position, the movable contact 308 of relay E8 becomes released and engages its back point of contact.

Likewise at this time the circuit through the winding 324 of relay E7 is interrupted because contact 322 of relay E7 is released, while the circuit through the winding 278 of relay E6 is interrupted because contact 321 of relay E5 is released. In addition, the circuit through the winding 314 of relay E5 is interrupted as contact 311 of relay E5 is released.

It will be seen, therefore, that on the eighth operation of contact 221, all of the relays E5, E6, E7 and E8 are released.

On the ninth operation of contact 221, which is the first operation in a new cycle of operation, the contact 221 is moved into engagement with the contact 270, thereby establishing a circuit from terminal B to the wire 304, through the upper winding 305 of relay E5, thence by the wire 306 to back point of contact of contact 308, which at this time is in its released position, and through a branch of the wire 310 to the terminal C of the source of current. As the winding 305 of relay E5 is energized, the contacts of this relay become picked up, and a new cycle of operation of the counting relays is initiated.

From the foregoing it will be seen that with the contact 275 of relay TCR in the high speed position, as shown in Fig. 3 of the drawings, the contacts of relay E7 become picked up on the third operation of contact 221, and that the contacts of relay E7, when picked up, remain picked up until the seventh operation of contact 221, whereupon the contacts of relay E7 become released and thereafter remain released until the third operation of contact 221 in a new cycle of operation.

*Operation of the counting relays employed in the system shown in Fig. 3 of the drawings when train control relay is in its medium or low speed positions*

The counting relays E5, E6, E7 and E8 are controlled by the relay TCR in such a manner that when the contact 275 of relay TCR is in its low or medium speed positions, the counting relays will complete a cycle of operation every four operations of contact 221, that is, every two revolutions of the axle 223.

With the contact 275 in the low or medium speed positions, it will engage either contact 329 or 334, and in either case will establish a circuit from a branch of wire 328 to wire 280 leading to front point of contact of contact 281 of relay E5.

With the apparatus in this condition, on the first operation of contact 221, which is assumed to be movement of this contact into engagement with stationary contact 270, a circuit is established from terminal B of the source of current to wire 304, through the upper winding 305 of relay E5, wire 306 to the back point of contact of contact 308 of relay E8, and thence by way of a wire 310 to the terminal C of the source of current. As the winding 305 is energized, the contacts 311 and 281 of relay E5 become picked up.

On the second operation of contact 221, which is assumed to be movement of this contact out of engagement with the contact 270 and into engagement with the contact 272, a circuit is established from terminal B to the wire 312, through the winding 314 of relay E5, wire 315, front point of contact 311, which is picked up at this time, and thence by a branch of the wire 310 to the terminal C of the source of current. As the winding 314 is energized, the contacts 311 and 281 of relay E5 remain picked up.

On this operation of the contact 221 to complete a circuit from terminal B to the wire 312, the winding 278 of relay E6 is not energized since the circuit through the winding 278 is interrupted due to the fact that the contact 275 of relay TCR is no longer in engagement with stationary contact 277 to which is connected the wire 276.

However, at this time since contact 275 of relay TCR is in engagement with one of the contacts 329 and 334, a circuit is established through the upper winding 327 of relay E8 with the result that current supplied to the wire 312 flows through the winding 327, and thence through wire 328, contact 275 and wire 280 to front point of contact of contact 281 of relay E5, which is picked up at this time, and to the terminal C of the source of current. The winding 327, therefore, will be energized and the contact 308 of relay E8 will be picked up and will engage its front point of contact.

On the third operation of contact 221, which is movement of contact 221 into engagement with contact 270 and out of engagement with contact 272, a circuit is again established from terminal B of the source of current to the wire 304, but as the contact 308 of relay E8 is no longer in engagement with its back point of contact, the circuit through the winding 305 of relay E5 is interrupted and this winding will not become energized. Accordingly, on interruption of the supply of current to the winding 314 of relay E5, occasioned by movement of contact 221 out of engagement with contact 272, the contacts of relay E5 become released.

In addition, on the third operation of contact 221, that is, movement of the contact into engagement with the contact 270 and establishment of a circuit from terminal B to the wire 304, a circuit is thereby completed through the lower winding 330 of relay E8, wire 331, front point of contact of contact 308 of relay E8, and a branch of wire 310 to terminal C. The contact 308 of relay E8, therefore, will remain picked up during the third operation of contact 221.

On the fourth operation of contact 221, that is, on movement of the contact out of engagement with contact 270 and into engagement with contact 272, the circuit from terminal B to the wire 304 is interrupted, while a circuit is established to wire 312. At this time, as the contact 311 of relay E5 is released, the circuit through the winding 314 of that relay is interrupted and when a circuit is established from terminal B to wire 312, this winding will not be energized. The contacts of relay E5, therefore, will remain released.

Similarly, as the contact 281 of relay E5 is released at this time, the circuit through the upper winding 327 of relay E8 is interrupted and this winding will not become energized. Accordingly, on the fourth operation of contact 221, with resultant interruption of the circuit from terminal B to wire 304, the relay E8 becomes deenergized and its contact 308 moves out of engagement with its front point of contact into engagement with its back point of contact, so that on the next operation of contact 221, which is the first operation in a new cycle of operation, current is supplied from wire 304 to the upper winding 305 of relay E5, and thence through wire 306, contact 308 of relay E8, and wire 310 to the terminal C so that the contacts of the relay E5 become picked up on the first operation of the contact 221 in a new cycle.

From the foregoing it will be seen that when the contact 275 of train control relay TCR is in its low speed or medium speed position, the contacts of relay E5 become picked up on the first operation of the contact 221 and remain picked up until the third operation of that contact, whereupon they become released and remain released until the first operation of the contact 221 in a new cycle of operation.

Likewise, it will be seen that the contacts of relay E8 become picked up on the second operation of contact 221 and remain picked up until the fourth operation of that contact, whereupon they become released and remain released until the second operation of contact 221 in a new cycle of operation. The contacts of relays E5 and E8, therefore, are picked up and released once for each two revolutions of the axle 223.

The counting relays E5, E6, E7 and E8 control the frequency of the current impulses supplied to the secondary windings of the transformer 279, and, in addition, control the portions of these transformer windings which are energized to thereby vary the magnitude of the current impulses supplied from the transformer secondary winding 301 to the windings of the relay MR.

When the train control relay TCR is conditioned to permit high speed movement of the train, that is, when the contact 282 is in the left-hand position as shown, the contact 284 of relay E7 is connected by the wire 283 and the contact 282 to the terminal B of the source of current.

When the contact 282 is in this position, it does not engage the stationary contact to which is connected the wire 333 leading to the contact 335 of relay E8, nor does the contact 282 engage the stationary contact to which is connected the wire 337 leading to the contact 338 of relay E5. The contacts 335 and 338 therefore, are deenergized, and while they are moved between their released and picked up positions in accordance with the energization and deenergization of the windings of the relays with which they are associated, this movement is without effect when the contact 282 of the relay TCR is in the high speed position, as shown in Fig. 3 of the drawings.

The train control relay TCR has another movable contact 340 which controls the supply of current to the lamps employed in the cab signal of the vehicle carried signal apparatus of which the relay TCR forms a part.

The contact 340 is constantly connected to one terminal of a source of current and in the high speed position engages a stationary contact which is connected by way of a wire 341 to one terminal of a high speed lamp 342. In the low speed position of the contact 340 it engages a stationary contact to which is connected a wire 343 leading to one terminal of the low speed lamp 344, while in the medium speed position of the contact 340 it engages a stationary contact to which is connected a wire 345 leading to one terminal of the medium speed lamp 347. The other terminal of each of the various cab signal lamps is connected to the other terminal of the source of current so that one or the other of the various cab signal lamps is lighted depending upon the position of the contact 340 of the train control relay TCR.

The ballast lamp 245 is provided for the purpose of maintaining at a substantially constant value the voltage of the current employed in different portions of the system to thereby prevent changes in the operating points of the relay MR due to changes in the voltage of the source from which current is supplied to operate the system.

The ballast lamp 245 may be of any suitable well-known construction and may comprise a filament formed of material, such as iron wire, and mounted in a sealed envelope. The lamp filament has the characteristic of changing its resistance with changes in the voltage supplied thereto so that the current flowing in the circuit in series with the filament remains substantially constant throughout a wide range of variations in the voltage of the current supplied by the source of current.

One terminal of the ballast lamp 245 is connected to the terminal C of the source of current, while the other terminal of this lamp is connected to the terminal B of the source of current in series with a resistor 348 and with the field winding 349 of the relay MR. The wire 244 leading to one terminal of the winding 243 of relay CR, and to the armature coils 293 and 296 of relay MR is connected in the circuit of the ballast lamp at a point intermediate the lamp and the resistor 348.

The relay CR has a contact 351 which is constantly connected by a wire 352 to an intermediate tap on the field winding 349 of the relay MR. The contact 351 of relay CR, when picked up, engages a stationary contact which is connected by a wire 353 to an end terminal of the winding 349 so that when the contacts of relay CR are picked up, a portion of the field winding 249 of relay MR is short circuited.

The operating characteristics of the relay MR are such that when the entire field coil 349 is energized, substantially more current must flow in the armature windings 293 and 296 of this relay in order to effect movement of the movable contact 298 between its two operating positions than is required at a time when a portion of the field winding 349 is short circuited.

The purpose of this structure is to condition the relay MR so that the relay armature will not be started to operate until the current flowing in the armature windings of this relay is raised to a predetermined value. As soon as the armature of relay MR begins to operate, the winding 264 of relay CR is energized and the contacts of this relay become picked up, if they are not already picked up, thereby short circuiting a portion of the field winding 349 of the relay MR. Thereafter the armature of relay MR will continue to operate until the current flowing in the armature windings 293 and 296 of that relay is reduced to a somewhat lower value than was required to initiate operation of the relay MR. This is desirable as it prevents hunting of the relay MR when the degree of energization of the armature windings of that relay is at or near the critical value effective to cause operation of the relay.

In the system as shown, the armature of relay MR will not start to operate until the degree of energization of the armature windings is somewhat higher than is required to continue operation of the relay armature once its operation is begun. Similarly, the relay MR, when operating, will continue to operate until the current in the armature windings is reduced to a value somewhat lower than that which is required to start operation of the relay armature again after it has ceased operating.

*Operation of the system shown in Fig. 3 when train control relay is in the low speed position*

The construction of the system and the operation of various portions thereof having been explained, the operation of the system as a whole will now be explained. It will be assumed that the vehicle is idle and that the contacts of the train control relay TCR are occupying their low speed positions, that is, their intermediate positions.

At this time the contact 340 of relay TCR engages the stationary contact to which is connected the wire 343 leading to lamp 344, which is lighted to inform the engineer or operator that only low speed movement of the train is permitted.

As the train control relay TCR is conditioned to permit only low speed operation, the contact 255 thereof completes the circuit to short circuit a portion of the secondary winding 249 of transformer 238, thereby rendering the transformer ineffective to supply current to the winding 252 of relay CR. Furthermore, the contact 255 interrupts the circuit through the winding 252 of relay CR so that this winding cannot be energized.

In addition, the contact 282 of relay TCR establishes a circuit to connect terminal B of the source of current to wire 337 leading to the contact 338 of relay E5, while the contact 275 of relay TCR engages contact 329 to establish a circuit from front point of contact 281 of relay E5 to the winding 327 of relay E8.

As the vehicle is assumed to be standing still, the axle 223 will not be rotating, while the contact 220 will be in engagement with at least one of the stationary contacts associated therewith so that one or the other of the zero-speed relays A4 and A5 is energized and establishes a circuit to energize the winding 243 of relay CR. The contacts of relay CR, therefore, are picked up and a circuit is established to energize the brake control magnet valve device Q to prevent it from effecting an unintended application of the brakes.

At this time the contact 221 may or may not be in engagement with one or the other of the stationary contacts associated therewith, and for purposes of illustration it will be assumed that the contact 221 is out of engagement with both of the stationary contacts, and that the first operation of the contact on rotation of the axle 223 is movement of the contact into engagement with the stationary contact 270.

As the contact 221 is assumed to be out of engagement with both of the stationary contacts associated therewith, the counting relays E5, E6, E7 and E8 are all deenergized. The contact 338 of relay E5, therefore, is in engagement with the back point of contact with the result that primary winding 286 of transformer 279 is energized throughout its entire length, while the armature winding 293 of relay MR, which is connected in series with the transformer primary winding 286, will also be energized.

After the vehicle is started in motion, the contact 220 is reciprocated between its two positions and effects alternate energization of the zero-speed relays A4 and A5 with the resultant gradual reduction in the proportion of the total elapsed time during which current is supplied to the winding of relay 243 of relay CR, as explained in detail above. At relatively low speeds, however, the degree of energization of winding 243 is sufficient to cause this winding to maintain the contacts of relay CR picked up.

In addition, on rotation of the axle 223, the contact 221 is reciprocated between its two positions, and, as stated above, it will be assumed that the first operation of the contact 221 is movement into engagement with contact 270. This establishes a circuit from terminal B of the source of current to wire 304, and thereby through the upper winding 305 of relay E5, wire 306, back point of contact of contact 308 of relay E8, and wire 310 to the terminal C of the source of current. The winding 305 of relay E5, therefore, is energized and the relay contacts are picked up, and its contact 338 engages its front point of contact to establish a circuit to energize the primary winding 290 of transformer 279 throughout its entire length, while the armature winding 296 of relay MR, which is connected in series with the transformer primary winding 290, is energized, thereby effecting movement of the contact 298 of relay MR to the position other than the one which it occupied when armature winding 293 was energized.

It will be seen also that on movement of contact 338 out of engagement with its back point of contact, the supply of current to the primary winding 286 of transformer 279 is interrupted, and the current in this winding accordingly diminishes. As a result of the decrease in the current in winding 286 and of the increase in current in winding 290, a flux change is produced in the transformer core, while current is induced in one end portion of the secondary winding 301 which is supplied over contact 298 and wire 299 to winding 264 of relay CR, which is connected by way of wire 300 to a center tap of the transformer secondary winding 301.

As the axle 223 continues to rotate, the contact 221 will be moved out of engagement with the stationary contact 270 and into engagement with the contact 272. This is the second operation of contact 221. At this time terminal B is connected to wire 312, and a circuit is thereby completed through winding 314 of relay E5, wire 315, and front point of contact 311 and a branch of the wire 310 to terminal C of the source of current. At this time, therefore, the contacts of relay E5 are maintained picked up.

In addition, on this movement of the contact 221 to establish a circuit from terminal B to the wire 312, a circuit is completed through the upper winding 327 of relay E8, wire 328, contacts 330 and 275 of relay TCR, wire 280 to front point of contact of contact 281 of relay E5, and thence by way of a branch of the wire 310 to the terminal C of the source of current. The contact 308 of relay E8, therefore, will become picked up and will engage its front point of contact, while it will be out of engagement with its back point of contact.

On the third operation of contact 221, that is, movement of the contact out of engagement with stationary contact 272 and into engagement with contact 270, a circuit is again established from terminal B to the wire 304, but at this time the winding 305 of relay E5 does not become energized since the circuit through this winding is interrupted because the contact 308 of relay E8 is no longer in engagement with its back point of contact. Accordingly, on this operation of the contact 221 with the resultant movement of the contact out of engagement with stationary contact 272, thereby interrupting the circuit to wire 312 and winding 314, both of the windings of relay E5 are deenergized and the movable contacts of this relay become released.

At this time the contact 338, therefore, moves out of engagement with its front point of contact, thereby interrupting the circuit through the primary winding 290 of transformer 279 and also through the armature winding 293 of relay MR. On engagement of contact 338 with its back point of contact, a circuit is established through the primary winding 286 of transformer 279 and the armature winding 293 of relay MR. At this time, therefore, the contact 298 of relay MR will be shifted to its other position, while as a result of the decrease in current in the primary winding 290 and the increase in current in the primary winding 286 of transformer 279 a flux change will be produced in the transformer core which will induce a current in the transformer secondary winding 301 which will be supplied to the winding 264 of relay CR over the previously traced circuit. The flow of current in this circuit will be maintained in the same direction due to movement of the contact 298 of relay MR into engagement with its other stationary contact, thereby connecting a different portion of the secondary winding 301 in the circuit of the winding 264 of relay CR.

On the fourth operation of contact 221, that is, movement of this contact out of engagement with stationary contact 270 and into engagement with contact 272, the lower winding 314 of relay E5 does not become energized since the circuit through this winding is interrupted due to the fact that contact 311 of relay E5 is in its released position.

Likewise, at this time the upper winding 327 of relay E8 does not become energized since the circuit through this winding is interrupted due to the release of contact 281 of relay E5. Accordingly, on this fourth operation of contact 221, on movement of the contact out of engagement with contact 270, thereby interrupting the circuit from terminal B to wire 304 and thus deenergizing the lower winding 330 of relay E8, the contact 308 of relay E8 becomes released and engages its back point of contact.

As a result, on the next operation of contact 221, which is the first operation in a new cycle of operation, and the establishment of a circuit from terminal B to wire 304, the upper winding 305 of relay E5 again becomes energized over the previously traced circuit which includes wire 306 and the back point of contact of contact 308 of relay E8.

On this energization of winding 305, the contacts of the relay E5 become picked up and the contact 338 is moved out of engagement with its back point of contact and into engagement with its front point of contact, thereby interrupting the circuit through the transformer primary winding 286 and the armature winding 293 of relay MR, and again energizing the transformer primary winding 290 and the armature winding 296 of relay MR.

From the foregoing, it will be seen that when the contact 275 of relay TCR is in its low speed or intermediate position, the contact 338 is moved between its front and back points of contact once every four operations of contact 221, that is once every two revolutions of the axle or at a rate equal to one-half of the speed of rotation of the axle 223.

When the vehicle is in motion, therefore, the armature windings 293 and 296 of relay MR are alternately energized, while the contact 298 of relay MR is operated to rectify the current supplied from the transformer secondary winding 303 to the winding 264 of relay CR so that current of one relative polarity is predominant in the current supplied to the winding 264. The frequency of the impulses of current supplied to the winding 264 of relay CR depends upon the rate of operation of contact 338 of relay E5, which, as stated above, occurs at one-half the rate of rotation of axle 223.

As the speed of the vehicle increases, the frequency of the impulses of current supplied to winding 264 increases with the result that the force exerted by the winding 264 of relay CR to maintain the contacts of the relay picked up gradually increases so as to offset the gradual decrease in the force exerted by the winding 243. As the speed of the vehicle increases, therefore, the contacts of relay CR will be maintained picked up, and the circuit to the brake control magnet valve device Q will be maintained.

When the vehicle speed increases to some predetermined relatively low value, such as in excess of 5 miles per hour, the degree of energization of winding 243 will have been reduced to a point such that this winding exerts negligible force to maintain the relay contacts picked up. However, before the energization of winding 243 is reduced to this extent, the energization of winding 264 is increased to a value sufficient to hold the relay contacts picked up.

It will be seen that when the train control relay TCR is conditioned to permit only low speed operation of the vehicle, and in which the contact 282 establishes a circuit from the terminal B to the movable contact 338 of relay E5, the primary windings 286 and 290 of transformer 279 are energized throughout their entire length and the impedance of these windings is at the maximum.

As the speed of the train is increased and the speed of operation of the contact 338 of relay E5 is correspondingly increased, the frequency of the reversals in the flux in the core of the transformer 279 is similarly increased. When the rate of these reversals reaches a predetermined value, such as that corresponding to a vehicle speed in excess of 30 miles per hour, the impedance of the transformer primary windings will have increased to a degree such as to reduce the flow of current in the circuits of these windings, and therefore in the armature windings 293 and 296 of relay MR, to a value insufficient to effect operation of the armature of the relay MR. Thereafter the movable contact 298 of the relay MR will remain in its last operated position and will not rectify the current supplied from the secondary winding 301 of the transformer 279 to the winding 264 of relay CR. Accordingly, alternating current will be supplied to the winding 264 of the relay CR with the result that the contacts of the relay CR will become released, thereby interrupting the circuit through the brake control magnet valve device Q which thereupon initiates an application of the brakes on the vehicle.

When the speed of the vehicle is subsequently reduced below the predetermined value, the frequency of the alternate energization of the primary windings 286 and 290 of the transformer 279 is reduced, and the impedance of these windings decreases so as to permit sufficient current to flow in the circuits of these windings, and, therefore, in the circuits of the armature windings 293 and 296 of the relay MR to again effect operation of the armature of the relay MR to cause it to rectify the current supplied to the winding 264 of the relay CR. When this occurs, the contacts of the relay CR again become picked up and establish the circuit to the brake controlling magnet valve device Q.

Before the relay MR is again caused to operate, however, the speed of the vehicle must be reduced to a somewhat lower value than existed at the time the relay MR ceased to operate. This is true because when the relay CR becomes released, its contact 351 is opened, thereby interrupting the circuit which short circuits a portion of the field winding 349 of the relay MR, thus making the relay MR somewhat more difficult to operate. Accordingly, the current in the armature windings of the relay MR must be increased to a value somewhat higher than that which existed at the time the relay MR became inoperative, and current of this value will not be present until the frequency of operation of the contact 338, and, therefore, the speed of the vehicle, is decreased to a slightly lower value than existed at the time the relay MR became inoperative.

As soon as the relay MR again becomes operative and effects the supply of rectified current to the winding 264 of relay CR, the contacts of the relay CR become picked up and the contact 351 short circuits a portion of the field winding 349 of the relay MR, thereby rendering the armature of the relay MR somewhat easier to operate and insuring that the relay armature will continue to operate until the vehicle speed is increased to a value somewhat higher than existed at the time the relay MR again became operative.

*Operation of the system shown in Fig. 3 when train control relay is in its medium speed position*

The operation of the equipment when the train control relay TCR is conditioned to permit only slow speed movement of the vehicle having been explained, the operation of the equipment while the relay TCR is conditioned to permit movement of the vehicle at medium speed, that is, at rates not in excess of 60 miles per hour will now be explained.

When the relay TCR is conditioned to permit medium speed movement of the vehicle, the contact 340 of relay TCR is in engagement with the stationary contact to which is connected the wire 345 leading to the lamp 347 of the cab signal with the result that this lamp is illuminated.

When the train control relay TCR is conditioned to permit medium speed movement of the vehicle, the counting relays operate as described in detail in connection with operation of the system when the train control relay TCR is conditioned to permit low speed operation of the vehicle. That is, the counting relays complete a cycle of operation every four operations of the contact 221, or every two revolutions of the axle 223. The contact 335 of relay E8 becomes picked up on the second operation of contact 221, and remains picked up until the fourth operation of contact 221, whereupon contact 335 is released and remains released until the second operation of contact 221 in a new cycle of operation.

The contact 335, when released, engages a stationary contact which is connected to an intermediate tap on the primary winding 286 of transformer 279, while the contact 335, when picked up, engages a contact which is connected to an intermediate tap on the primary winding 290 of the transformer 279.

In addition, in this condition of the relay TCR, the contact 255 thereof is in engagement with the stationary contact 267 with the result that a short circuit is established for a portion of the secondary winding 249 of the transformer 238, while the circuit through the winding 252 of relay CR is interrupted by the contact 255 with the result that the winding 252 will not become energized.

In addition, when the relay TCR is conditioned for medium speed operation, the contact 282 thereof is in engagement with the stationary contact which is connected by way of the wire 333 to the movable contact 335 of relay E8, while the contact 275 of the relay TCR is in engagement with the stationary contact 334 to establish a circuit from one terminal of the winding 327 of the relay E8 to wire 280 leading to a front point of contact of contact 281 of relay E5.

It will be seen, therefore, that when the primary windings 286 and 290 of the transformer 279 are energized by current supplied over the contact 335 of relay E8, they are alternately energized at the same frequency as when they are energized by current supplied over the contact 338 of relay E5. However, it will be seen that when the winding 286 and 290 of the transformer 279 are energized by current supplied over contact 335, a portion only of each of these windings is energized, while when the windings are energized by current supplied over the contact 338, the entire windings are energized.

As the speed of the vehicle increases, the frequency of the impulses of current supplied to the primary windings 286 and 290 of transformer 279 increases, and there is a corresponding increase in the rate of operation of the contact 298 of relay MR and of the frequency of the impulses of rectified current supplied to the winding 264 of the relay CR.

The various parts of the equipment are arranged and proportioned so that the increase in energization of the winding 264 of relay CR takes place rapidly enough on an increase in the speed of the vehicle to offset the decrease in the degree of energization of the winding 243 of relay CR by current supplied by the zero speed relays A4 and A5 with the result that the contacts of the relay CR are maintained picked up. As previously pointed out, as soon as the vehicle speed reaches a predetermined relatively low value, the degree of energization of winding 243 is reduced to a low ineffective value and thereafter the contacts of relay CR are maintained picked up by winding 264 substantially unassisted by the other windings of the relay.

The impedance of the primary windings 286 and 290 of the transformer 279 varies with the number of turns included in the energized portions of these windings. When the train control relay TCR conditions the equipment for medium speed operation, substantially fewer turns of the transformer primary windings are included in the energizing circuits of the armature windings 293 and 296 of the relay MR than is the case when the train control relay TCR conditions the equipment for low speed operation. Accordingly, the impedance of the transformer primary windings will be substantially less at this time, and the flow of current through these windings, and, therefore, through the armature windings 293 and 296 of relay MR, will not be reduced to a value too low to effect operation of the armature of the relay MR until the frequency of alternate energization of the transformer primary windings is increased to a somewhat higher value than is the case when the equipment is conditioned for low speed operation.

As the speed of the vehicle is increased, the rate of operation of contact 335 of relay E8 is increased, and the frequency of alternate energization of the transformer primary windings will be increased, and as a result of the increasing impedance of these windings, the flow of current in the circuit of these windings will gradually be reduced, and will eventually reach a point at which insufficient current flows therein, and in the armature windings 293 and 296 of relay MR to effect operation of that relay. When this condition develops, the movable contact 298 of relay MR will remain in its last operated position and will no longer rectify the current supplied from the secondary winding 301 of transformer 279 to the winding 264 of relay CR. As a result, alternating current will flow in the winding 264 of relay CR and the contacts of that relay will thereupon become released, thereby interrupting the circuit to the brake control magnet valve device Q which will be operated to effect an application of the brakes on the vehicle.

The various parts of the equipment are selected so that with the train control relay TCR conditioned to permit medium speed of the vehicle, the relay MR will become inoperative when the vehicle speed exceeds a predetermined speed, such as 60 miles an hour.

On a subsequent reduction in the speed of the vehicle and a corresponding reduction in the frequency of alternate energization of the transformer primary windings, the relay MR will again become operative, as previously described, and will effect energization of the winding 264 of relay CR with rectified current to cause the contacts of that relay to again be picked up.

*Operation of the equipment when the train control relay is in its high speed position*

The operation of the equipment when the train control relay is conditioned to permit either slow speed or medium speed movement of the vehicle having been explained, the operation of the equipment while the relay TCR is conditioned to permit high speed movement of the train will now be described.

When the train control relay TCR conditions the equipment to permit high speed movement of the train, the contacts of that relay are in the positions in which they are shown in Fig. 3 of the drawings. At this time the contact 340 engages the contact to which is connected the wire 341 leading to the clear lamp 342 with the result that the clear lamp of the cab signal is illuminated.

At this time the contact 255 of the relay TCR engages the stationary contact 254 to thereby connect one terminal of the winding 252 of the relay CR to the center tap of the secondary winding 249 of transformer 238, while the circuit short circuiting a portion of the transformer secondary winding 249 is interrupted.

The contact 282 of relay TCR at this time engages the stationary contact to which is connected the wire 283 leading to the contact 284 of relay E7, while the contact 275 of relay TCR engages the stationary contact 277 to thereby establish a circuit from the upper winding 278 of relay E6 to wire 280 leading to the front point of contact of contact 281 of relay E5.

If the vehicle is now started in motion from a standing start, the zero-speed relays A4 and A5 will operate as previously described to energize winding 243 of relay CR to maintain the contacts of that relay picked up at relatively low vehicle speeds. In addition, the zero-speed relays A4 and A5 will rectify the current supplied from the secondary winding 249 of transformer 238 to the circuit of the winding 252 of relay CR with the result that winding 252 will assist winding 243 in maintaining the contacts of the relay picked up.

On movement of the vehicle and rotation of the axle 223, the contact 221 is moved into and out of engagement with the contacts 270 and 272, while the counting relays E5, E6, E7 and E8 operate so as to complete one cycle of operation every four revolutions of the axle 223. As previously pointed out, the contacts of relay E7, including contact 284, become picked up on the third operation of contact 221, and remain picked up until the seventh operation of contact 221, whereupon contact 284 becomes released and remains released until the third operation of contact 221 in a new cycle of operation.

When the contact 284 of relay E7 is in engagement with its back point of contact, a circuit is established from terminal B through contact 282, wire 283, contact 284, and wire 288 to energize a portion of the primary winding 290 of transformer 279, and to also energize the armature winding 296 of relay MR which is connected in series with transformer primary winding 290.

On movement of contact 284 into engagement with its front point of contact, the previously traced circuit through transformer primary winding 290 is interrupted, while a circuit is established to energize a portion of transformer primary winding 286, this circuit including contact 284 and wire 285 as well as wire 292 and the armature winding 293 of relay MR.

On these alternate energizations of the transformer primary windings, the armature windings of relay MR are alternately energized and effect operation of the contact 298 of relay MR between its two positions to rectify the current supplied from the transformer secondary winding 301 to the winding 264 of relay CR. The winding 264 of relay CR being energized assists the other windings of this relay in maintaining the contacts of the relay picked up. As the speed of the train increases, and as the frequency of the current impulses supplied from the transformer secondary winding 301 to the winding 264 of relay CR increases, the force exerted by the winding 264 to maintain the contacts of relay CR picked up increases, and the various parts of the system are arranged and proportioned so that the increase in the force exerted by winding 264 will offset the reduction in force exerted by the windings 243 and 252 with the result that the contacts of relay CR remain picked up.

As previously stated, when the train control relay TCR conditions the equipment to permit high speed movement of the train, the impulses of current from the secondary winding 301 of transformer 279 to the winding 264 of relay CR occur relatively infrequently since the contact 284 is operated through a cycle of operation only once every four revolutions of the axle 223. Since the impulses of current to the winding 264 of relay CR occur so infrequently at relatively low vehicle speeds, the degree of energization of winding 264 is not increased sufficiently rapidly to offset the decrease in energization of winding 243. However, at this time the winding 252 of relay CR is also energized and assists the windings 243 and 264 so that the contacts of relay CR are maintained picked up until sufficient current is supplied to the winding 264 to enable this winding when unassisted by the winding 243 to maintain the relay contacts picked up.

Similarly, as the vehicle speed is increased, the degree of energization of winding 252 is gradually decreased, but the increase in energization of winding 264 is sufficient to offset this decrease, with the result that by the time the degree of energization of windings 243 and 264 is reduced to a low ineffective value, the energization of winding 264 is increased sufficiently to enable it alone to maintain the relay contacts picked up.

When the vehicle speed is increased in excess of a predetermined relatively high value, such as in excess of 90 miles an hour, the frequency of the alternate energizations of the primary windings 286 and 290 of transformer 279 is increased to such a degree that the impedance of these windings builds up and reduces the flow of current in the circuits of the windings to such a degree that so little current flows in the armature windings 293 and 296 of relay MR that the relay armature is rendered inoperative. The contact 298 of the relay MR accordingly remains in its last operated position and no longer rectifies the current supplied to the winding 264 of relay CR, and as the other windings of the relay CR are no longer energized to an effective degree, the contacts of the relay become released, thereby interrupting the circuit to the brake control magnet valve device Q which thereupon effects an application of the brakes.

When the speed of the vehicle is sufficiently reduced the frequency of the alternate energization of the transformer primary windings 286 and 290 is reduced, and the flow of current in these windings and in the armature windings 293 and 296 of relay MR is increased so that the armature of relay MR again becomes operative and rectifies the current supplied to the winding 264 of relay CR with the result that the contacts of relay CR again become picked up and complete the circuit to the brake control magnet valve device Q.

From the foregoing, it will be seen that the system shown in this figure of the drawings provides means to normally maintain a brake controlling magnet valve device energized and to automatically effect deenergization of this device, and thereby effect an application of the brakes, if the vehicle speed exceeds one of a plurality of different speeds, the particular speed limit which is in effect being determined by the vehicle carried signal apparatus.

It will be seen that the system provided by this invention is arranged so that substantially the same apparatus is employed to provide each of the several different speed limits with the result that a minimum of apparatus is required to provide a plurality of different speed limits.

Furthermore, it will be seen that the system provided by this invention is arranged so that it can be readily and positively conditioned by the train control relay incorporated in the vehicle carried signal apparatus to effect deenergization of the brake controlling magnet valve device Q at either of a plurality of different speeds.

*Construction of system shown in Fig. 4 of the drawings*

In Fig. 4 of the drawings there is shown a further modification of the speed responsive mechanism provided by this invention. The equipment shown in this figure of the drawings is similar to that shown in Figs. 1 and 2 of the drawings, and operates in accordance with the speed of the vehicle to vary the maximum braking force which may be developed by the brake equipment on the vehicle.

The system shown in Fig. 4 of the drawings has magnet valve devices HM, MM and LM which condition the brake equipment, not shown, to permit different maximum degrees of brake applications.

The brake equipment is arranged so that when all of the magnet valve devices are deenergized, it is conditioned to provide a maximum degree of breaking force suitable for vehicle speeds in excess of twenty miles an hour, but less than forty miles an hour.

The equipment is arranged so that when the low speed magnet valve device LM is energized, the other magnet valve devices are deenergized, while the brake equipment is conditioned to provide a maximum degree of braking force suitable for vehicle speeds less than 20 miles an hour.

Similarly, the equipment is arranged so that when either the medium speed magnet valve device MM, or the high speed magnet valve device HM, is energized, the low speed magnet valve device is deenergized. The equipment is also arranged so that when the medium speed magnet valve device MM is energized, and the high speed magnet valve device HM is deenergized, the brake equipment is conditioned to provide a maximum braking force suitable for vehicle speeds between 40 and 65 miles an hour.

When the high speed magnet valve device HM and the medium speed magnet valve device MM are both energized, the brake equipment is conditioned to develop the maximum braking force, and thereby provide braking power suitable for vehicles speeds in excess of 65 miles an hour.

The system shown in Fig. 4 of the drawings includes zero-speed relays A6 and A7 which have associated therewith a transformer 373, which is substantially the same as the corresponding apparatus employed in the system shown in Fig. 3 of the drawings. The system shown in Fig. 4 of the drawings employs a chain of counting relays E11, E12, E13 and E14 which are similar to the counting relays employed in the system shown in Fig. 2 of the drawings. These counting relays operate in the manner described in detail in connection with the system shown in Fig. 2, and complete one cycle of operation every four revolutions of the axle of the vehicle with which the equipment is associated.

The system shown in Fig. 4 of the drawings has a relay RA which controls the circuits to all of the brake control magnet valve devices except the valve device MM, and a relay RB which controls the circuits for the low and medium speed magnet valve devices. This system includes, in addition, a polarized relay MA which controls the supply of current to one winding of the relay RA, and a polarized relay MB which controls the supply of current to a winding of the relay RB. The system also includes a relay RC which controls the circuits for the medium and high speed magnet valve devices, as well as the circuits of a winding of the relays RA and RB.

The speed responsive system shown in Fig. 4 of the drawings includes means to prevent the equipment from being rendered inoperative if the wheels on the axle carrying the main commutator or contacts should be caused to slide, that is, to cease rotating due to an excessively heavy application of the brakes while the vehicle is still in motion.

The equipment shown in this figure of the drawings includes main contacts 375 and 376 associated with one axle 370 of the vehicle, and auxiliary contacts 379 and 380 associated with a different axle 371 of the vehicle. It is highly improbable that both of these axles will cease to rotate at the same time as a result of an application of the brakes, and, therefore, the contacts associated with one of these axles will always operate while the vehicle is in motion and will supply periodically interrupted current to the speed responsive mechanism.

The contacts associated with these axles may be of any suitable construction. They may be movable contacts actuated by cams mounted on the vehicle axles, or they may be in the form of commutators mounted on the axles and engaged by suitable brushes. The contacts 375, and 379 are of a type which interrupt one circuit controlled thereby before establishing the other circuit. The contacts 376 and 380, however, are of the make-before-break type with the result that at least one of the circuits associated therewith is always established. The contacts 375, 376, 379 and 380 are arranged so that each completes and interrupts each of the circuits controlled thereby once each revolution of the axle with which it is associated.

The contact 376 as well as the contacts 375, 379 and 380, is connected to terminal B of the source of current, and alternately engages stationary contacts to which are connected the end terminals of the winding 381 of a reactor 382, while the center terminal of this winding is connected by a wire 383 to one terminal of a pick-up winding 384 of a transfer relay TR. The other terminal of the winding 384 is connected to one terminal of an opposing winding 386 of the relay TR, while the other terminal of the winding 386 is connected by a wire 387 to terminal C of a suitable source of current. A contact 388 of relay TR operates when picked up to establish a circuit short circuiting the winding 386. When this contact is released, however, the windings 384 and 386 are connected in series, and are both energized when current is supplied to the circuit of these windings.

The windings 384 and 386 are wound to oppose each other when energized in series, and are proportioned so that when both are energized, the force exerted by the winding 384 substantially exceeds that exerted by the winding 386. Accordingly, when these windings are energized with current in excess of a predetermined value, sufficient force is exerted on the contact 388 of the relay TR to cause the contact to become picked up, thereby establishing a shunt circuit around the opposing winding 386 and effecting deenergization of the winding 386. On this deenergization of winding 386, the force exerted thereby and opposing that of winding 384 is eliminated, leaving the full force generated by winding 384 to maintain the contacts of the relay TR picked up. The winding 384, therefore, will operate to maintain the relay contacts picked up until the current in the circuit of the winding is reduced to a substantially lower value than is required to effect picking up of the relay contacts.

Similarly, once the current in the energizing circuit of the winding 384 is reduced to a value such that the contact 388 of relay TR becomes released, this contact will not again become picked up until current of substantially greater value is supplied to the relay windings than was supplied at the time the relay contacts became released.

In operation, on rotation of the vehicle axles, the contact 376 is operated to alternately complete circuits to the opposite end terminals of the winding 381 of reactor 382. Accordingly, the direction of flow of current in winding 381 is alternately reversed and the flux in the core of the reactor is correspondingly reversed.

At relatively low vehicle speeds, the frequency of the reversals of current flow in the winding 381 and of the flux in the core of the reactor is relatively low and the impedance of the winding is relatively low with the result that sufficient current flows through the reactor winding, and thence to the wire 383 leading to the winding 384 and 386 of transfer relay TR to cause the contacts of relay TR to become picked up and to remain picked up.

However, as the speed of the vehicle is increased, and as the frequency of the reversals of current flow in the reactor winding 381 is correspondingly increased, the impedance of this winding increases with the result that there is a reduction in the current flow through this winding, and, therefore, from the center tap of the winding through wire 383 to the winding 384 of transfer relay TR. When the vehicle speed is increased to a predetermined relatively low value, the current in the circuit of the winding 384 of transfer relay TR is reduced to such a low value that the winding 384 is no longer effective to maintain the contacts of the relay picked up, and the relay contact 388, as well as contacts 389 and 390, thereupon become released and engage their back points of contact to establish connection from the wires 392 and 393 to the wires 395 and 396, which are connected to contacts associated with the main contacts 375.

When the contacts 389 and 390 of transfer relay TR are in engagement with the front points of contact, they establish connection from the wires 392 and 393 to wires 398 and 399 leading to contacts associated with the auxiliary contact 379.

From the foregoing, it will be seen that when the axle 370 with which the contact 376 is associated is rotating at a speed in excess of a predetermined relatively low speed, the contacts 389 and 390 of transfer relay TR are released and establish circuits to wires 392 and 393 leading to the counting relays from the wires 395 and 396 leading from the main contact 375. When the axle 370 with which the main contact 376 is associated is rotating at an extremely low speed or is not rotating at all, the contacts 389 and 390 of transfer relay TR are picked up and establish circuits from wires 398 and 397 leading from the auxiliary contact 379 to the wires 392 and 393 leading to the counting relays E11, E12, E13 and E14. The circuits leading to the counting relays, therefore, will be provided with interrupted current from the main contact 375 if the axle 370 with which it is associated is rotating, and, if this axle ceases to rotate, the circuits leading to the counting relays will be supplied with interrupted current by the auxiliary contact 379 which is associated with a different axle.

The counting relays E11, E12, E13 and E14 operate in the same manner as the counting relays employed in the system shown in Fig. 2 of the drawings. As described in detail above, the contacts of the first counting relay of the counting chain, that is, relay E11 in the system shown in Fig. 4 of the drawings, becomes picked up on the first operation in a cycle of operation of the axle actuated contact which controls the supply of current to the circuits of the counting relays. Thus the contacts 402 and 403 of relay E11 become picked up on the first operation of the axle actuated contact, and remain picked up until the fifth operation of that contact, whereupon the contacts of relay E11 become released, and remain released until the first operation of the axle actuated contact in a new cycle of operation.

Similarly, the contacts 405 and 406 of counting relay E12 become picked up on the second operation of the axle actuated contact, and remain picked up until the sixth operation of that contact, whereupon they become released.

The contacts 408 and 409 of relay E13 become picked up on the third operation of the axle operated contact, and remain picked up until the seventh operation of that contact, whereupon they are released.

Likewise, the contacts 411 and 412 of counting relay E14 become picked up on the fourth operation of the axle operated contact, and remain picked up until the eighth operation of that contact, whereupon they become released.

The windings of the zero-speed relays A6 and A7 are connected in series with portions of the primary winding of the transformer 373 in the manner described in detail in connection with the system shown in Fig. 3 of the drawings. The circuits of the relay windings are alternately energized from the wires 414 and 415 which are controlled by the contact 380 with the result that the relays A6 and A7 are alternately picked up and complete circuits from terminal B to the wire 417 which is connected to one terminal of the winding 418 of the relay RA, while a branch of wire 417 is connected to a terminal of winding 430 of relay RB. The other terminal of these windings is connected by wire 420 to the back point of contact of contact 421 of relay RC.

This system includes a ballast lamp BL of the type employed in the system shown in Fig. 3 of the drawings, one terminal of this lamp being connected to the terminal C of the source of current, and its other terminal being connected in series with a resistance 422 to the other terminal B of the same source of current.

The movable contact 421 of relay RC is connected by a wire 423 to a point in the circuit of the ballast lamp intermediate the resistance 422 and one terminal of the lamp.

The zero-speed relays A6 and A7 operate not only to supply current to wire 417, but they also operate to rectify the current supplied from the secondary winding of transformer 373 to the circuit of the winding 426 of relay RA.

The relay RA has a contact 432 which is connected by a wire 433 to a tap at an intermediate point on the winding 434 of polarized relay MA. The contact 432 when released engages a stationary contact which is connected by the wire 435 to a tap at an intermediate point on the winding 436 of relay MA. When the contacts of relay RA are released, therefore, the contact 432 establishes a circuit to connect a portion of each of the windings 434 and 436 in parallel with the result that when either of these windings is energized, a portion of the other winding will also be energized. The windings 434 and 436 are arranged so that when energized the force generated by each opposes that of the other. When the contact 432 is released, therefore, the end portions of the windings 434 and 436 of relay MA neutralize each other leaving only the remaining portions of these windings to exert force to effect movement of the relay armature. Since portions only of the windings are effective at that time, the windings must be energized to a somewhat higher degree to effect movement of the relay armature than is required at a time when all of these windings are available to effect movement of the relay armature, which is the case when the contact 432 of relay RA is picked up.

The relay RB has a winding 430 one terminal of which has connected thereto a branch of the wire 417 leading from the zero-speed relays A6 and A7. The other terminal of the winding 430 has connected thereto a branch of the wire 420 leading to relay RC. When the contact 421 of relay RC is released, the winding 430 of relay RB is energized in parallel with winding 418 of relay RA, and in series with the ballast lamp BL, by current supplied to wire 417 by the zero-speed relays A6 and A7.

The relay RB has a contact 439 which is connected by a wire 440 to a tap at an intermediate point on the winding 442 of polarized relay MB. The contact 439 when released engages a stationary contact which is connected by wire 444 to a tap at an intermediate point on the winding 442 of polarized relay MB. The contact 439 when released, therefore, establishes a circuit which connects in parallel a portion of the windings 442 and 446 of relay MB for the purpose described in detail in connection with relay MA.

The relay MA has a movable contact 447 which is reciprocable by the relay armature between two positions, and is connected by a wire 448 to one terminal of the winding 450 of the relay RA. The other terminal of the winding 450 is connected by a wire 451 to a center tap of the secondary winding 452 of transformer 454. The contact 447 operates in the well-known manner to rectify the current supplied from the transformer secondary winding 452 to the circuit of the relay winding 450 so that current of one relative polarity is predominant in the current supplied to the relay winding.

The relay winding 450 when supplied with rectified current generates force which supplements the force exerted by windings 418 and 426 to hold the relay contacts picked up.

Similarly, the relay MB has a moveable contact 455 which is operated by the relay armature and is connected by a wire 456 to one terminal of the winding 458 of relay RB. The other terminal of the winding 458 is connected in series with a resistance 460 to the center tap of the secondary winding 462 of transformer 464. The contact 455 operates in the usual manner to rectify the current supplied from the secondary winding 462 to the circuit of the relay winding 458.

The winding 458 of relay RB, when supplied with rectified current, generates force supplementing that of winding 430 and tending to hold the relay contacts picked up.

The relay RB has a contact 465, which, when picked up, establishes a circuit shunting the resistor 460. As a result, the contacts of relay RB, when released, will not become picked up until sufficient current is supplied to the winding 458 through the resistor 460 to energize this winding to a predetermined degree, but once the contacts of relay RB do become picked up, the contact 465 shunts the resistor with the result that the contacts will remain picked up until the energy supplied from the transformer secondary winding 462 is reduced to a somewhat lesser degree than is necessary to cause picking up of the relay contacts. When the relay contacts become released, however, the contact 465 is opened and the relay contacts will not thereafter become picked up again until the winding 458 is supplied with current of a relatively high predetermined magnitude.

The relay RB has, in addition, a contact 467 which is constantly connected to terminal B of the source of current. The contact 467 when released engages a stationary contact which is connected by a wire 469 to the contact 402 of relay E11. When the contact 467 is picked up, it engages a stationary contact which is connected by a wire 470 to the contact 403 of relay E11.

The contact 402 of relay E11 is engageable with stationary contacts one of which is connected by wire 471 to a tap intermediate the ends of primary winding 472 of transformer 454, while the other stationary contact is connected by wire 474 to an intermediate tap of primary winding 475 of transformer 454. An end terminal of primary winding 472 is connected by wire 476 to one terminal of winding 434 of relay MA, while an end terminal of winding 475 is connected to an end terminal of winding 436 of relay MA.

The other terminal of each of the windings 434 and 436 of relay MA is connected to a branch of the wire 423, which is connected in series with the ballast lamp BL to the terminal C of the source of current.

It will be seen, therefore, that when the contact 467 of relay RB is in engagement with its back point of contact, the contact 402 of counting relay E11 operates to alternately energize portions only of the primary windings 472 and 475 of transformer 454 in series with the windings 434 and 436 of relay MA.

The contact 403 of relay E11 is engageable with stationary contacts one of which is connected to contact 408 of counting relay E13, and the other of which is connected to contact 409 of relay E13.

The contact 408 of relay E13, when released, engages a stationary contact which is connected by a wire 479 to an end terminal of the primary winding 472 of transformer 454, while the contact 409 of relay E13, when released, engages a stationary contact which is connected by a wire 478 to an end terminal of the primary winding 475 of transformer 454. The contact 408, when picked up, engages a stationary contact which is connected to the wire 478, while contact 409, when picked up, engages a stationary contact to which is connected a branch of the wire 479.

It will be seen, therefore, that when the contact 467 is picked up, it establishes a circuit from terminal B of the source of current to contact 403 of counting relay E11. The contact 403 when picked up and released alternately completes circuits to the contacts 408 and 409 of relay E13, while each of these circuits is alternately connected to one or the other of the transformer primary windings by means of the contacts 408 and 409 of relay E13.

As a result of this operation of the relays E11 and E13, the supply of energy to the transformer primary windings is transferred from one of these windings to the other whenever the contacts of relay E11 or the contacts of relay E13 become picked up or released.

When both relays E11 and E13 are released, a circuit is established through which current may be supplied over contact 403 of relay E11, contact 409 of relay E13 and wire 478 to energize the primary winding 475 of transformer 454. When the contact 403 of relay E11 becomes picked up, which occurs on the first operation of the axle operated supply contact, as previously explained, the circuit to supply current to transformer primary winding 475 is interrupted, and a circuit is established to energize transformer primary winding 472, this circuit including the contact 403, contact 408, and wire 479.

When the contact 403 is picked up, then on subsequent energization of relay E13, which occurs on the third operation of the axle driven supply contact, the circuit to energize winding 472 is interrupted by the contact 408, and a circuit is established to again energize winding 475, which circuit includes contact 408 and wire 478.

On subsequent release of contact 403 of relay E11, which occurs on the fifth operation of the axle driven supply contact, at which time the contacts 408 and 409 of relay E13 remain picked up, the previously mentioned circuit to energize transformer primary winding 475 is interrupted, and a circuit is established to again energize winding 472. This circuit includes contact 403, its back point of contact, contact 408, its front point of contact, and wire 479.

When the relay E13 subsequently becomes released, which occurs on the seventh operation of the axle driven supply contact, at which time contact 403 of relay E11 continues to be released, the circuit to energize transformer winding 472 is interrupted by the release of contact 408, while a circuit is now established to again energize primary winding 475, this circuit including contact 403, contact 409 and wire 478.

Similarly, on subsequent picking up of contact 403, which occurs on the first operation of the axle driven supply contact in a new cycle of operation, the circuit to energize the transformer primary winding 475 is interrupted, and the winding 472 is again energized over the previously traced circuit.

It will be seen, therefore, that when the transformer primary windings 472 and 475 are energized by current supplied through the contact 403, each of the windings is energized and deenergized twice during each cycle of operation of the counting relays. There is a change in the condition of energization of each of the windings each time the condition of either counting relay E11 or E13 is changed, and the condition of each of these relays is changed twice during each cycle of operation of the relays, one change occurring when the relay picks up and the other change occurring when the relay is released.

It will be seen also that when the transformer primary winding 472 and 475 are energized by current supplied over the contact 402 of relay E11, each winding is energized and deenergized only once during each cycle of operation of the counting relays. One of the transformer primary windings is energized when the relay E11 picks up, and the other is energized when the relay E11 becomes released.

It will be seen, therefore, that when the transformer primary windings 472 and 475 are energized by current supplied over the contact 403 of relay E11, that is, when the contacts of relay RB are picked up, the frequency of the alternate energizations of these windings is twice as rapid as when the windings are energized over contact 402 of relay E11, that is, when relay RB is released.

In addition, it will be seen that when the transformer primary windings 472 and 475 are energized by current supplied over contact 402 of relay E11, fewer turns of these windings are connected in series with the windings 434 and 436 of relay MA than is the case when the transformer windings are supplied with current over contact 403 of relay E11. As a result, the impedance of the transformer primary windings will be substantially less when the windings are energized by current supplied over contact 402 than when they are energized by current supplied over contact 403, and the flow of current in these windings, and, therefore, in the windings 434 and 436 of relay MA, which are connected in series with the transformer primary windings, will be maintained at a sufficiently high value to operate the relay MA until the frequency of the alternate energizations of the transformer primary windings is increased to a substantially higher value than is the case when these windings are energized over the contact 403.

The transformer 464 has primary windings 482 and 483 which are connected in series with the windings 442 and 446, respectively, of relay MB. The supply of current to the circuits of the transformer primary windings and the relay windings is controlled by contact 405 of relay E12, and contacts 411 and 412 of relay E14 in a manner similar to that described in detail in connection with the supply of current to the primary windings of transformer 454 over contact 403 of relay E11, and contacts 408 and 409 of relay E13.

The contacts of relays E12 and E14 operate to alternately energize the primary windings 482 and 483 of transformer 464 so that each of these windings becomes energized and deenergized twice during each cycle of operation of the counting relays.

The contact 406 of relay E12 alternately connects terminal B of the source of current to opposite end portions of the primary winding of a transformer 485, while the center tap of this primary winding is connected to the terminal C of the source of current. The secondary winding of the transformer 485 is connected through a suitable asymmetric unit 486 to the winding of the relay RC. The relay RC has a slow release characteristic so that the contacts of this relay will remain picked up during intervals between the supply of impulses of current thereto, such as may be occasioned at a time when the contact 406 is operating at a relatively slow speed.

The relay RB has a contact 487 which is connected to terminal B of the source of current, and which, when picked up, engages a stationary contact which is connected to contact 488 of relay RA. The contact 487 of relay RB when released engages a stationary contact which is connected by a wire 490 to a contact 491 of relay RC.

The contact 488 of relay RA, when picked up, engages a stationary contact which is connected to one terminal of the low speed magnet valve device LM, the other terminal of which is connected to the terminal C of the source of current.

The contact 491 of relay RC, when picked up, engages a stationary contact which is connected by a wire 493 to one terminal of the medium speed magnet valve device MM, the other terminal of which is connected to terminal C of the source of current. The wire 493 also has connected thereto a contact 495 of relay RA which, when released, engages a stationary contact which is connected by a wire 496 to one terminal of the high speed magnet valve device HM, the other terminal of which is connected to terminal C of the source of current.

It will be seen, therefore, that when the relays RA and RB are both energized, the low speed magnet valve device LM is energized by way of a circuit which includes front points of contact of contacts 487 and 488. At this time, the magnet valve devices MM and HM are both deenergized, and the brake equipment is conditioned to provide the degree of braking power appropriate for low speed movement of the vehicle.

If the relay RA becomes released at a time when the relay RB is energized, the circuit for energizing magnet valve device LM is interrupted, while the circuit for energizing the magnet valve devices MM and LM is maintained interrupted. All of the magnet valve devices are deenergized and the brake equipment is conditioned to provide the degree of braking power appropriate for vehicle speeds in excess of 20 miles an hour, but below 40 miles an hour.

When the relay RB becomes released, the circuit to supply current to the brake controlling magnet valve device LM is interrupted, if it is not already interrupted by contact 488 of relay RA, and a circuit is established through which current is supplied to the brake controlling magnet valve device MM provided the contact 491 of relay RC is picked up. If at this time the relay RA is picked up, its contact 495 is open with the result that the circuit to the magnet valve device HM is interrupted and only the magnet valve device MM is energized. When this magnet valve device is energized, the brake equipment is conditioned to provide the degree of braking power appropriate for medium speed operation of the vehicle, that is, speeds in excess of 40 miles an hour but less than 65 miles an hour.

If at a time when the relay RB is deenergized and the relay RC is energized, the relay RA is released, its contact 495 will establish the circuit to the magnet valve device HM, and the brake equipment will be conditioned to provide the degree of braking power appropriate for high speed movement of the vehicle, that is, speeds in excess of 65 miles an hour.

*Operation of the system shown in Fig. 4 of the drawings*

The construction and operation of various portions of the system shown in Fig. 4 of the drawings having been described, the operation of the system as a whole will now be explained. For purposes of illustration, it will be assumed that the vehicle is idle and that it starts at a time when the contact 379 is out of engagement with both of the stationary contacts associated therewith with the result that the counting relays are all deenergized. It will be further assumed that the first operation of the contact 379 is movement into engagement with the stationary contact to which is connected the wire 397 to thereby establish connection from the terminal B of the source of current to wire 393 leading to the upper winding of relay E11 with the result that on this first operation of contact 379, the contacts of counting relay E11 become picked up.

It is also assumed that at this time the contact 376 is in engagement with one of the stationary contacts associated therewith so that a circuit is established through the reactor 382 to energize the winding 384 of transfer relay TR to maintain the contacts of this relay picked up.

When the vehicle is standing still, the contact 380, being of the make-before-break type, will be in engagement with one or the other of the stationary contacts associated therewith with the result that one of the zero-speed relays A6 or A7 will be energized and will establish a circuit from terminal B to the wire 417 leading to the winding 418 of relay RA and to winding 430 of relay RB.

At this time as the vehicle is idle, no current is supplied to the winding of relay RC and the contact 421 of this relay is in engagement with its back point of contact to thereby complete the circuits through the winding 418 of relay RA and the winding 430 of relay RB with the result that windings 418 and 430 are energized and the contacts of relays RA and RB are picked up.

Since the contacts of both relays RB and RA are picked up, a circuit is established over contacts 487 and 488 to energize the low speed brake controlling magnet valve device LM, and thereby condition the brake equipment for low speed operation of the vehicle.

At a time when the vehicle is idle, the counting relays are not being operated, and current is not supplied to alternately energize the windings of the relays MA and MB and the contacts of these relays, therefore, remain in their last operated positions.

As soon as the vehicle starts to move, the contact 376 is operated to change the point of supply of current to the winding 381 of reactor 382 from one end of the winding to the other. When the frequency of these changes is increased to a predetermined value, such as that present at a relatively low speed of the vehicle, the flow of current in the circuits of the reactor winding, and therefore in the winding 384 of transfer relay TR, is reduced to such a point that the contacts of this relay become released. On this release of the relay contacts, the control of the supply of current from terminal B to the wires 392 and 393 leading to the counting relays is transferred from the auxiliary contact 379 to the main contact 375.

In addition, on movement of the vehicle, the contact 389 is operated to alternately energize the wires 414 and 415, and the zero-speed relays A6 and A7 become alternately energized and released as previously explained in detail. Likewise, current is supplied from the secondary winding of transformer 373 to the winding 426 of relay RA so that the force exerted by this winding will help compensate for the gradual reduction in the force exerted by the winding 418.

As the contacts of relay RB are picked up due to the energization of winding 430, its contact 497 establishes a circuit from the terminal B of the source of current to wire 470 to thereby condition contact 403 of relay E11 to control the supply of current to the primary windings 472 and 475 of transformer 454. As previously explained in detail the circuits for energizing the transformer primary windings are also controlled by contacts 408 and 409 of relay E13.

Accordingly, on movement of the vehicle, the transformer primary windings 472 and 475 will be alternately energized throughout their entire lengths as previously described in detail, while the relay MA will be operated to rectify the current supplied from the transformer secondary winding 452 to the winding 450 of relay RA. As the speed of the vehicle increases, the degree of energization of winding 450 will be increased due to the increase in the rate of operation of relay MA, and the various parts of the system are arranged and proportioned so that the increase in energization of winding 450 will be sufficient to compensate for the gradual reduction in energization of windings 418 and 426 which occurs as the speed of the vehicle increases. Accordingly, the contacts of relay RA will be maintained picked up as long as the contact of relay MA continues to be operated.

Similarly, on movement of the vehicle, the primary windings 462 and 463 of transformer 464 are alternately energized, while the contact 455 of relay MB is operated to rectify the current supplied from the transformer secondary winding 462 to the winding 458 of relay RB. The degree of energization of winding 458 will increase as the speed of the vehicle is increased, and is great enough to compensate for the gradual reduction in energization of winding 430 which occurs with increasing speed of the vehicle. The contacts of relay RB, therefore, will be maintained picked up as long as the contact of relay MB continues to follow alternate energization of the relay windings.

As the speed of the vehicle increases beyond a low rate, such as in excess of 5 miles an hour, the current supplied by the zero-speed relays A6 and A7 to the winding 418 of relay RA and to the winding 430 of relay RB is reduced to a low ineffective value. Similarly, the current supplied from the transformer 373 to winding 426 of relay RA is reduced to a low value, and thereafter the contacts of relays RA and RB are maintained picked up by the windings 450 and 458, respectively.

When the speed of the vehicle is increased so as to exceed a predetermined relatively slow speed, such as in excess of 20 miles per hour, the frequency of the alternate energization of the primary windings 472 and 475 of transformer 454 is increased to a degree such that the impedance of the transformer windings reduces the current flow in the circuits of the transformer primary windings, and, therefore, in the windings 434 and 436 of relay MA, to such an extent that the relay MA becomes inoperative. The contact 447 thereof will thereafter remain in its last operated position and will not rectify the current supplied to the winding 450 of relay RA. Accordingly, the relay RA will become released and its contact 488 will interrupt the circuit to the low speed magnet valve device LM thereby conditioning the brake equipment to provide the degree of braking power appropriate for vehicle speeds in excess of 20 miles an hour but less than 40 miles an hour.

At this time the relay MB continues to be operative and maintains the winding 458 of relay RB energized with rectified current with the result that contact 487 of relay RB is maintained in engagement with its front point of contact. Accordingly, on release of the contact of relay RA, the low speed magnet valve device LM becomes deenergized, but the other magnet valve devices do not become energized.

On the release of the contacts relay RA, the contact 432 establishes the circuit to connect in parallel the end portions of the windings 434 and 436 of relay MA with the result that relay MA will not again become operative until the energization of the windings thereof is increased to a somewhat higher value than was in effect at the time the relay became inoperative. This higher degree of energization will not be produced until the vehicle speed is reduced slightly below the speed which was effective to cause the relay to become inoperative. This difference in the points at which relay MA becomes inoperative, and at which it again becomes operative, prevents hunting or repeated changes in the condition of the relay MA, when the vehicle is operating substantially at the critical speed effective to initiate operation of the relay MA or to cause it to cease to operate.

On an increase in the vehicle speed to a value in excess of 20 miles per hour, the frequency of operation of the contact 406 is such as to energize the winding of the relay RC to effect picking up of the contacts of that relay, thereby interrupting the circuit of winding 418 of relay RA and of winding 430 of relay RB, and establishing a circuit through which magnet valve devices MM and HM may be energized.

When the speed of the vehicle is increased to a somewhat higher predetermined speed, such as in excess of 40 miles per hour, the frequency of alternate energization of the primary windings 482 and 483 of transformer 464 is increased to a degree such that the impedance of the windings of this transformer reduces the current flow in the transformer primary windings, and, therefore, in the windings 442 and 446 of relay MB to such a low value that the relay MB becomes inoperative. Thereafter the contact 455 of relay MB remains in its last operated position and no longer rectifies the current supplied to the winding 458 of relay RB. Accordingly the contacts of relay RB become released and contact 487 engages its back point of contact to thus establish a circuit to supply current to the medium speed magnet valve device MM. This circuit includes contact 487, wire 490, contact 491, and wire 493.

On energization of the magnet valve device MM, the brake equipment is conditioned to provide the degree of braking force appropriate when the vehicle is moving in excess of 40 miles per hour, but less than 65 miles per hour.

On the release of the contacts of relay RB the contact 439 establishes the circuit to connect in parallel the end portions of the windings 442 and 446 of the relay MB with the result that the relay MB will not again become operative until the energization of the windings thereof is increased to a somewhat higher value than was in effect at the time the relay became inoperative. As previously explained this prevents hunting of the relay in the event that the vehicle is operated substantially at the critical speed at which relay MB becomes inoperative.

In addition, on release of the contacts of relay RB, the contact 467 thereof is moved out of engagement with its front point of contact and into engagement with its back point of contact to thereby condition contact 402 of relay E11 to control the supply of current to the primary windings 472 and 475 of transformer 454.

As previously pointed out, the contact 402 becomes picked up and released once in every cycle of operation of the counting relays, that is, once every four revolutions of the axle with which is associated the contact for supplying current to the counting relays. In addition, the contact 402 supplies current to circuits which include a portion only of the transformer primary windings so that the impedance of these windings is somewhat smaller than when the entire windings are energized.

Accordingly, on the release of the contacts of relay RB and the supply of current to the transformer primary windings 472 and 475 through the contact 402, the relay MA is again rendered operative and the contact 447 thereof again rectifies the current supplied from the secondary winding 452 to the winding 450 of relay RA. The contacts of relay RA, therefore, again become picked up, and as the contact 495 is picked up, it interrupts the circuit to the high speed magnet valve device HM with the result that this magnet valve device is not energized at this time. The medium speed magnet valve device MM, therefore, is the only magnet valve device which is energized.

If the speed of the vehicle is further increased so as to exceed a predetermined relatively high speed, such as in excess of 65 miles per hour, the frequency of the alternate energizations of the primary windings 472 and 475 of transformer 454 by current supplied over the contact 402 is increased to such a degree that the impedance of the transformer windings reduces the current flow in the circuits of the transformer primary windings, and, therefore, in the relay windings 434 and 436, so that the relay MA again becomes inoperative. Its contact 447, therefore, no longer rectifies the current supplied to winding 450 of relay RA and the contacts of this relay thereupon becomes released with the result that contact 495 engages its back point of contact to establish a circuit to energize the high speed magnet valve device HM in addition to the magnet valve device MM, and thereby condition the brake equipment to provide the degree of braking force appropriate for operation of the vehicle at a high speed, that is, in excess of 65 miles per hour.

As previously explained, on the release of contacts of relay RA, the contact 432 establishes the circuit to connect in parallel the end portions of the windings 434 and 436 of relay MA with the result that relay MA will not again become operative until the energization of the windings thereof is increased to a somewhat higher value than was in effect at the time the relay became inoperative.

On a subsequent reduction in the speed of the vehicle to a speed slightly lower than 65 miles an hour but more than 40 miles an hour, the relay MA again becomes operative and supplies current to the winding 450 of relay RA to effect picking up of the contacts of that relay. When the contact 432 of relay RA becomes picked up, it interrupts the circuit for connecting in parallel the end portion of the windings 434 and 436 of relay MA with the result that the operation of this relay becomes more positive.

In addition, on the picking up of the contacts of relay RA, the contact 495 interrupts the circuit to the high speed magnet valve device HM, thereby leaving the medium speed magnet valve device MM as the only one which is energized, thus conditioning the brake equipment to provide the degree of braking force appropriate for operation of the vehicle at speeds between 40 and 65 miles per hour.

On a further reduction in the speed of the vehicle to a value less than 40 miles per hour but more than 20 miles per hour, the relay MB again becomes operative and supplies current to the circuit of the winding 458 of relay RB through the resistance 460 to effect picking up of the contacts of the relay RB. When the contacts of relay RB become picked up, the contact 465 establishes a circuit shunting the resistance 460, thereby increasing the degree of energization of winding 458 and insuring that the contacts of relay RB will remain picked up.

In addition, the contact 439 of relay RB interrupts the circuit which connects in parallel the end portions of the windings 442 and 446 of relay MB and renders operation of this relay more positive.

Furthermore, on energization of winding 458 of relay RB, the contact 467 thereof is moved out of engagement with its back point of contact and into engagement with its front point of contact, thereby transferring the control of the supply of energy to the primary windings 472 and 475 of transformer 454 from the circuits controlled by contact 402 to the circuits controlled by the contact 403 of relay E11.

As previously explained, when the primary windings of transformer 454 are energized over the circuits controlled by contact 403, the windings are energized throughout their entire lengths while the frequency of the alternate energization of these windings is such that at vehicle speeds in excess of 20 miles per hour insufficient current flows in the windings of relay MA to effect operation of this relay, and as a result the relay is inoperative and its contact 447 does not rectify the current supplied to the winding 450 of relay RA. Accordingly, the contacts of relay RA are released, and the contact 488 interrupts the circuit to the low speed magnet valve device LM.

At this time as the contacts of relay RB are picked up, the contact 487 engages its front point of contact and does not engage its back point of contact. As a result, no current is supplied to the circuits leading to the medium speed and high speed magnet valve devices MM and HM, respectively, and all of the brake controlling magnet valve devices are deenergized, thereby conditioning the brake equipment for operation when the vehicle is traveling at speeds in excess of 20 miles per hour, but less than 40 miles per hour.

On a further reduction in the speed of the vehicle to a value somewhat in excess of 20 miles per hour, the supply of current to the winding of the relay RC is reduced to such a degree that the contacts of this relay become released, and the contact 421 thereof establishes the circuit through the winding 418 of relay RA and winding 430 of relay RB to permit energization of these windings by current supplied by the zero-speed relays A6 and A7. As previously explained, however, the degree of energization of these windings is not increased to an effective value until the train speed is reduced to a relatively low value, such as less than 5 miles per hour.

On a reduction in the speed of the vehicle to a value less than 20 miles per hour, the relay MA again becomes operative and supplies rectified current to the winding 450 of relay RA with the result that the contacts of relay RA become picked up.

At this time, the contact 432 again completes the circuit connecting in parallel the end portions of the windings of relay MA, while the contact 488 establishes a circuit to the low speed magnet valve device LM. At this time the contact 487 of relay RB is maintained in engagement with its front point of contact so that current is supplied to the magnet valve device LM to thereby condition the brake equipment for operation at vehicle speeds below 20 miles per hour.

On a reduction in the speed of the vehicle to a very low speed, or when the vehicle is brought to a complete stop, the zero-speed relays A6 and A7 supply current to energize the winding 418 of relay RA and winding 430 of relay RB over the circuits controlled by the relay RC to thereby maintain the contacts of relays RA and RB picked up.

In addition, the winding 426 of relay RA is energized at low vehicle speeds to assist the winding 418, as previously explained.

It will be seen, therefore, that at low vehicle speeds, or when the vehicle is brought to a complete stop, the relays RA and RB are both maintained energized with the result that the brake equipment is conditioned for proper operation at these vehicle speeds.

It will be seen that at speeds somewhat higher than 20 miles an hour, the relay RC is energized and its contact 421 interrupts the circuit through the winding 418 of relay RA and through winding 430 of relay RB. Accordingly, if at a time when the vehicle is traveling in excess of 20 miles per hour, the axle with which the contact 380 is associated should slide, thereby effecting operation of the zero-speed relays A6 and A7 to supply steady energy to the wire 417, the windings 418 and 430 will not become energized, and the contacts of relays RA and RB will remain released unless they are picked up due to the energization of their windings by current supplied by the relays MA or MB, respectively. This control of the circuit of the winding 418 of relay RA and of winding 430 of relay RB by the relay RC prevents undesired energization of the windings 418 and 430 in the event of wheel sliding, and insures that the brake equipment will be conditioned to provide the degree of braking power appropriate for the speed of the vehicle as determined by the axle other than the one which operates contact 380.

It will be seen that when the vehicle is traveling at a speed in excess of 20 miles an hour, but less than 40 miles an hour, all of the brake controlling magnet valve devices are deenergized and the brake equipment is thereby conditioned to provide the degree of braking appropriate for these speeds.

If for any reason, such as failure of the source of electric current, the speed responsive mechanism provided by this invention should be rendered inoperative, the relays RA and RB will both become released, and the magnet valve devices will all be deenergized and will condition the brake equipment to provide this moderate degree of braking power. It has been found that this degree of braking power is most satisfactory under these conditions since a high degree of braking power will cause wheel sliding with resultant injury to the vehicle wheels and increase in the distance required to bring the vehicle to a stop, while a lesser degree of braking power will not provide sufficient braking force.

*Construction of the system shown in Fig. 5 of the drawings*

In Fig. 5 of the drawings of this application there is shown a modified form of the equipment shown in Fig. 3 of the drawings. The speed responsive equipment shown in Fig. 5 of the drawings operates to effect an application of the brakes on a vehicle if the speed of the vehicle exceeds either of a plurality of permissive speed limits, the particular speed limit which is in effect being determined by vehicle carried signal apparatus which is controlled in accordance with traffic conditions in advance of the vehicle.

The system shown in Fig. 5 of the drawings also operates to give the operator one type of warning indication when the speed of the vehicle approaches the speed limit which is in effect at that time, to give a different warning indication if the vehicle exceeds the speed limit, and to thereafter effect an application of the brakes if the vehicle speed is not reduced below the permitted speed limit within a predetermined time interval after the start of the second warning indication.

The vehicle carried signal apparatus may be of any suitable well-known design and the details of its construction form no part of this invention. The vehicle carried signal system shown in Fig. 5 includes relays Y1, Y2 and Y3 which are selectively energized in accordance with traffic conditions in advance of the vehicle. These relays control the supply of current to indication lamps which indicate the permissible speed limits and are identified by numerals corresponding to the speed in miles an hour which each lamp is intended to indicate. These speed limits are illustrative only and the invention is not confined to these exact valves, and it is contemplated that any other suitable speed limits may be employed.

When the track section in which the vehicle is located is occupied, all of the relays are released, and a low speed limit, such as 11 miles an hour is in effect, while the lamp marked 11 is lighted.

When the traffic conditions in advance are such that relay Y3 is energized, and the relays Y1 and Y2 are released, a circuit is established to light the lamp marked 17. When traffic conditions are such that relay Y2 is energized and the relay Y1 is deenergized, a circuit is established to light the lamp marked 25, while when traffic conditions are such that the relay Y1 is energized, a circuit is established to light the lamp marked 35.

It will be apparent, therefore, that the operator of the vehicle will be constantly informed of the speed limit which is in effect, while in the event that there is a change in the permitted speed, as may occur when a vehicle enters a different block section, the operator will be instantly informed of such a change by the change in the illumination of the indication lamps. These lamps may be provided with lenses of different colors to make changes conspicuous when they occur.

The system shown in Fig. 5 of the drawings includes zero-speed relays A8 and A9 and a pair of counting relays E15 and E16. The circuits for energizing the zero-speed relays A8 and A9 are controlled by an axle operated contact 500 of the make-before-break type while the circuit from one terminal of a source of current to wires 502 and 503, from which the windings of the counting relays E15 and E16 are energized, is controlled by an axle operated contact 505 which is arranged so that the circuit to one of the wires is interrupted before that to the other is established. The contacts 500 and 505 are constantly connected to a terminal B of a source of electric current.

The system shown in Fig. 5 of the drawings includes a relay VA which controls the warning light WL, and a relay VB which controls a magnet valve device 510 and a relay 512 having a time delay characteristic. The valve device 510 is operative when deenergized to permit the supply of suitable fluid under pressure, such as compressed air, to a whistle 513, while the contact of the relay 512 becomes released only after the expiration of a predetermined time interval, such as 5 seconds, after the supply of current to the relay is interrupted. The contact of the relay 512, when released, interrupts the circuit to a brake controlling magnet valve device 515 which, when deenergized, effects an application of the brakes on the vehicle.

The system shown in Fig. 5 of the drawings includes a relay MVA which controls the supply of current to a winding of relay VA, and a relay MVB which controls the supply of current to a winding of relay VB.

The relay MVA has windings 518 and 519 which are connected in series with the primary windings 520 and 521, respectively, of transformer TVA, while the relay MVB has windings 525 and 526 which are connected in series with the primary windings 528 and 529, respectively, of transformer TVB.

The relay MVA has a movable contact 530 which is operated to one position or another according as to whether winding 518 or 519 of the relay is energized. The contact 530 rectifies the current supplied from the secondary winding 532 of transformer TVA to winding 516 of relay VA.

Similarly, the relay MVB has a movable contact 534 which is operated to one position or another according as to whether winding 525 or 526 is energized. The contact 534 rectifies the current supplied from the secondary winding 536 of transformer TVB to winding 517 of relay VB.

The zero-speed relays A8 and A9 operate in the manner previously described in detail when the vehicle is idle or is moving at an extremely low speed to establish a circuit to wire 536 which is connected to one terminal of winding 538 of relay VA. The other terminal of the winding 538 is connected to one terminal of winding 539 of relay VB, while the other terminal of the winding 539 is connected to the terminal C of the source of current. It will be seen, therefore, that at extremely low vehicle speeds or when the vehicle is idle, the windings 538 and 539 of relays VA and VB, respectively, are energized in series by current supplied by the zero-speed relays. At this time, therefore, the contact 541 of relay VA is picked up to interrupt the circuit to the warning light WL and maintain this light deenergized.

In addition, at this time the contact 542 of relay VB is picked up and engages its front point of contact to thereby establish a circuit to the magnet valve device 510 to maintain it energized and cut off the supply of fluid under pressure to the whistle 513, while the timing relay 512 is also maintained energized and maintains the circuit to the brake controlling magnet valve device 515 and thus prevents it from operating to effect an application of the brakes.

The relays Y1 and Y2 of the vehicle carried signal apparatus control the counting relays E15 and E16, while the relays Y1, Y2 and Y3, together with the counting relays E15 and E16, control both the frequency of the alternate energization of the primary windings of transformers TVA and TVB and the portions of these windings which are energized.

The relay E15 has a winding 544 one terminal of which is connected to the wire 503 and the other terminal of which is connected by a wire 545 to back point of contact of contact 546 of relay E16, while the contact 546 is connected by a wire 547 to the terminal C of the source of current.

The relay E15 has, in addition, a winding 548 one terminal of which is constantly connected to the wire 502 and the other terminal of which is connected by a wire 550 to contact 552 of relay Y1. The contact 552 when released engages a stationary contact which is constantly connected to a contact 554 of relay Y2, while the contact 552, when picked up, engages a stationary contact which is connected by a wire 555 to a front point of contact of contact 556 of relay E15. The contact 554 of relay Y2 when picked up engages a stationary contact to which is connected a branch of the wire 555. The contact 556 of relay E15, as well as a contact 558 of that relay, are constantly connected to the terminal C of the source of current. It will be seen, therefore, that when the contacts of relay E15 are picked up, a circuit is established from wire 502 through winding 548 of relay E15 if the relay Y1 is energized, or if the relay Y2 is energized at a time when relay Y1 is deenergized.

The relay E16 has a winding 560 one terminal of which is constantly connected to the wire 502, and the other terminal of which is connected by a wire 561 to front point of contact of contact 558 of relay E15.

The relay E16, has in addition, a winding 563 one terminal of which is constantly connected to the wire 503, and the other terminal of which is connected to front point of contact of contact 546.

*Operation of the system shown in Fig. 5 of the drawings*

The operation of the system shown in Fig. 5 of the drawings will now be explained. It will be assumed that the vehicle stopped at a time when the contact 505 was out of engagement with both of the stationary contacts associated therewith, and that the first operation of the contact 505 is to establish a circuit to the wire 503.

It will be assumed also that the relays Y1, Y2 and Y3 are all deenergized. As a result, the lamp identified by the number 11 will be energized over an easily traced circuit, while the other indication lights will be deenergized.

When the vehicle is standing still, one or the other of the zero-speed relays A8 or A9 is energized with the result that a circuit is established from the terminal B to wire 536, to thereby energize the windings 538 and 539 of relays VA and VB, respectively, so that the contacts of each of these relays are picked up. Accordingly, the warning light WL is not illuminated, while the magnet valve device 510 is energized to prevent the supply of fluid under pressure to the whistle 513. In addition, the relay 512 is energized and establishes the circuit to the magnet valve device 515.

On movement of the contact 505 so as to establish a circuit from terminal B to wire 503, the winding 544 of relay E15 becomes energized by way of a circuit which includes wire 503, winding 544, wire 545, back point of contact of contact 546 of relay E16, and wire 537 to terminal C of the source of current.

When the relays Y1, Y2, Y3 and E15 are released, a circuit is established from terminal B of the source of current through contact 561 of relay Y1, contact 562 of relay Y2, contact 563 of relay Y3, and contact 564 of relay E15 to wire 565, one branch of which is connected to an end terminal of the primary winding 520 of transformer TVA, while the other branch of the wire 565 is connected to an end terminal of the primary winding 528 of relay TVB. At this time, therefore, the transformer windings 520 and 528 are energized in series with the relay windings 518 and 525, respectively.

When the contacts of relay E15 become picked up on energization of winding 544, the contact 564 is moved out of engagement with its back point of contact, thereby interrupting the circuits to the windings 520 and 528 of the transformers TVA and TVB, respectively, and establishing a circuit from terminal B to wire 567, one branch of which is connected to an end terminal of the winding 521 of transformer TVA, and the other branch of which is connected to an end terminal of the winding 529 of transformer TVB. Accordingly the transformer primary windings 521 and 529 are energized in series with the relay windings 519 and 526, respectively.

In addition, on energization of winding 544 of relay E15, the contacts 556 and 558 of this relay engage their front points of contact.

On the second operation of contact 505, that is, movement of the contact so as to interrupt the circuit to the wire 503 and to establish a circuit to wire 502, the winding 544 of relay E15 becomes deenergized. At this time, however, the winding 548 of relay E15 does not become energized since the circuit through this winding is interrupted because the contacts 552 and 554 of relays Y1 and Y2, respectively, are both released. The contacts 556 and 558 of relay E15 accordingly become released, and, as a result, the circuit through the winding 560 of relay E16 is interrupted and the contact 546 of this relay remains in engagement with its back point of contact.

In addition, as a result of the release of the contacts of relay E15, the contact 564 moves out of engagement with its front point of contact, thereby interrupting the circuit to the wire 567 and deenergizing the primary windings 521 and 529 of transformers TVA and TVB as well as the windings 519 and 526 of relays MVA and MVB, respectively.

On movement of contact 564 into engagement with its back point of contact, the transformer primary windings 520 and 528 and the relay windings 518 and 525 are again energized over the previously traced circuits.

On the third operation of contact 505 which is the first operation of the contact in a new cycle of operation, a circuit is again established to the wire 503 and the winding 544 of relay E15 again becomes energized over the previously traced circuit. The contacts of this relay accordingly become picked up, thereby transferring the supply of energy from transformer primary windings 520 and 528 to windings 521 and 529 as previously explained.

It will be seen, therefore, that when the relays Y1 and Y2 are both deenergized, the relay E15 becomes picked up and released once for each revolution of the axle which operates the contact 505. It will be seen also that when the relays Y1, Y2 and Y3 are all deenergized, each of the transformer primary windings is energized and deenergized once throughout its entire length during each revolution of the axle which controls the contact 505.

As a result of the alternate energization of the primary windings of the transformers TVA and TVB, currents are induced in the transformer secondary windings, and these currents are rectified by the contacts of the relays MVA and MVB and supplied to the windings 516 and 517 of the relays VA and VB to compensate for the reduction in the degree of energization of windings 538 and 539 of the relays VA and VB which takes place as the speed of the vehicle increases.

The various parts of the equipment provided by this invention are arranged and proportioned so that the increase in energization of windings 516 and 517 of relays VA and VB, in this and in all other conditions of the equipment, is rapid enough to compensate for the reduction which occurs in the degree of energization of windings 538 and 539 of relays VA and VB and insures that the contacts of relays VA and VB will be maintained picked up until the relays MVA and MVB become inoperative.

The various portions of the equipment are also arranged and proportioned so that when the transformer primary windings are each energized throughout their entire length at a frequency of once every revolution of the vehicle axle, the impedance of the primary windings of the transformer TVA will increase so that when the vehicle speed is increased to a predetermined relatively low rate, such as 10 miles per hour, the flow of current in the circuits of the primary windings of transformer TVA, and, therefore, in the windings of relay MVA, will be reduced to such a degree that relay MVA is no longer operative. Accordingly, its contact 530 will no longer rectify the current supplied to the winding 516 of relay VA from the secondary winding 532 of transformer TVA.

When the vehicle speed increases to this value, the relay winding 516 will no longer be effective to maintain the contact 541 picked up, and the contact, therefore, will become released and engage its back point of contact to establish a circuit to the warning lamp WL, which becomes illuminated to indicate to the operator that he is approaching the speed limit which is in effect at that time.

The various portions of the equipment are also arranged and proportioned so that the impedance of the transformer primary windings 528 and 529 of transformer TVB will not reduce the flow of current in these windings, and in the windings 525 and 526 of relay MVB, to render the relay MVB inoperative until the vehicle speed is increased to a slightly higher value, such as in excess of 11 miles per hour. When the vehicle speed is increased to this value, the relay MVB becomes inoperative and its contact 534 no longer rectifies the current supplied to winding 517 of relay VB, and this relay thereupon becomes released and its contact 542 interrupts the circuit to the magnet valve device 510 and to the relay 512. Accordingly, the magnet valve device 510 effects the supply of fluid under pressure to the whistle 513 which emits a warning sound to inform the operator that he should reduce the speed of the vehicle. If the vehicle speed is promptly reduced, the relay MVB will again become operative and its contact 542 will become picked up to again energize the magnet valve device 510 to cut off further operation of the whistle 513 and to cause the contacts of the slow release relay 512 to be maintained picked up.

If, however, the operator does not promptly reduce the speed of the vehicle to a value less than the permissible speed limit, the relay 512 will operate after a predetermined time interval, such as 5 seconds, to interrupt the circuit to the magnet valve device 515 which thereupon effects an application of the brakes and reduces the speed of the vehicle.

The operation of the speed responsive apparatus at a time when all of the relays of the vehicle carried signal equipment are released having been explained, its operation at a time when relay Y3 is energized, and the relays Y1 and Y2 are deenergized will now be explained.

When the relay Y3 is energized, the circuit to the indication lamp identified by the numeral 11 is interrupted, while current is supplied over an easily traced circuit to illuminate the indication lamp 17 to inform the operator that a maximum speed of 17 miles an hour is permitted.

When the relay Y3 is energized, its contact 563 is moved out of engagement with its back point of contact to thereby interrupt the circuit from terminal B of the source of current from contact 564 of counting relay E15, and to establish a circuit from terminal B to contact 570 of counting relay E15.

When the contact 570 engages its back point of contact, it establishes connection with a wire 572 one branch of which is connected to primary winding 520 of relay TVA at a point intermediate the ends of the winding, while another branch of the wire 572 is connected to an intermediate tap of primary winding 528 of transformer TVB.

When the contact 570 is picked up, it engages a stationary contact to which is connected a wire 573, one branch of which is connected to an intermediate tap on the primary winding 521 of transformer TVA, while its other branch is connected to an intermediate tap on primary winding 529 of transformer TVB.

When the relay Y3 is energized and the relays Y1 and Y2 are deenergized, the circuits to the windings of the counting relays E15 and E16 remain as previously described, and the contacts of relay E15 are picked up and released once for each revolution of the vehicle axle. Accordingly, the primary windings of transformers TVA and TVB will be alternately energized and deenergized at the same frequency as when the relay Y3 is deenergized.

However, when the relay Y3 is energized, current is supplied to a portion only of each of the transformer primary windings instead of to the entire winding. The impedance of the transformer windings is less when only portions of the windings are energized, and the various parts of the system are arranged and proportioned so that the flow of current in these windings, and, therefore, in the windings of the relays MVA, will not be reduced to a point sufficient to render the relay MVA inoperative until the frequency of the alternate energizations of the primary windings of transformer TVA is equal to that corresponding to a vehicle speed of approximately 16 miles per hour. When this speed is reached, the relay MVA becomes inoperative and no longer rectifies the current supplied to winding 516 of relay VA with the result that contact 541 of relay VA becomes released and engages its back point of contact to establish a circuit to the warning lamp WL to illuminate this lamp and inform the operator that he is approaching the speed limit.

Similarly, the various parts of the equipment are arranged so that the flow of current in the primary windings of transformer TVB, and, therefore, in the windings of relay MVB, is not reduced to a value such as to render the relay MVB inoperative until the frequency of the alternate energization of the primary windings of transformer TVB is equal to that which is present at a vehicle speed in excess of 17 miles an hour. When the speed of the vehicle is increased to this value, the relay MVB will become inoperative and will no longer rectify the current supplied to winding 539 of relay VB with the result that the contact 542 thereof becomes released to deenergize the magnet valve device 510, and the relay 512, which thereupon operate in the manner previously described in detail.

Having described the operation of the system when the 11 and 17 mile speed limits are in effect, its operation when the 25 mile speed limit is in effect will now be described. At this time the relay Y2 is energized and the relay Y1 is deenergized. As the relay Y2 is energized, the circuits to the 11 and 17 mile indication lights are interrupted, while a circuit is established to supply current to the 25 mile indication light.

In addition, at a time when the relay Y2 is energized, a connection is established from wire 550, leading from one terminal of the winding 548 of relay E15, to wire 555, this connection including contact 552 of relay Y1 and contact 554 of relay Y2.

When the relay Y2 is energized its contact 562 is picked up, thereby interrupting the circuit to contact 563 of relay Y3 and establishing a circuit from terminal B to contact 576 of relay E16.

On rotation of the vehicle axle and operation of contact 505, assuming that the first operation of this contact is its movement into engagement with the stationary contact to which is connected the wire 503, a circuit is established to energize winding 544 of relay E15, this circuit including wire 503, winding 544, wire 545, back point of contact of contact 546 of relay E16 to terminal C of the source of current.

On energization of winding 544 of relay E15, the contacts 556 and 558 of this relay become picked up so that on the next or second operation of the contact 505, that is, movement of contact 505 into engagement with the contact to which is connected the wire 502, a circuit is established to energize the winding 548 of relay E15. This circuit includes wire 502, winding 548, wire 550, contacts 552 and 554 of relays Y1 and Y2, respectively, wire 555, contact 556 of relay E15, and a branch of wire 547 to terminal C of the source of current. As the winding 548 of relay E15 is energized, the contacts 556 and 558 of this relay are maintained in engagement with their front points of contact.

Accordingly, the circuit through the winding 560 of relay E16 is complete and this winding becomes energized by a circuit which includes wire 502, winding 560, wire 561, contact 558 of relay E15, and a branch of wire 547 to terminal C.

On energization of winding 560 of relay E16, contact 546 thereof is moved out of engagement with its back point of contact and into engagement with its front point of contact.

As a result of energization of the winding 560 of relay E16, the contacts of this relay become picked up and the contact 576 is moved out of engagement with its back point of contact, thereby interrupting the circuit to the wire 578 leading to the transformer primary windings 520 and 528. In addition, the contact 576 engages its front point of contact, thereby establishing a circuit to wire 580 leading to the transformer primary windings 521 and 529.

On the next or third operation of contact 505, that is, movement of this contact into engagement with the stationary contact to which is connected the wire 503, a circuit is established to energize winding 563 of relay E16. This circuit includes wire 503, winding 563, contact 546 of relay E16 which is picked up at this time, wire 547, and terminal C of the source of current. As winding 563 of relay E16 is energized, the contacts of this relay are maintained picked up.

On this the third operation of contact 505, the circuit for energizing winding 548 of relay E15 is interrupted by movement of contact 505 out of engagement with the stationary contact to which is connected wire 502, while winding 544 of relay E15 does not become energized on movement of contact 505 into engagement with the contact to which is connected the wire 503 since the circuit of the winding 544 is interrupted at contact 546 of relay E16.

As both windings of relay E15 are deenergized, the contacts of this relay become released.

On the next operation of contact 505, that is, its fourth operation which is movement of the contact into engagement with the stationary contact to which is connected wire 502, the previously traced circuit to winding 563 of relay E16 is interrupted, while the circuit to energize winding 560 of relay E16 is not established because of the release of contact 558 of relay E15.

As neither winding of relay E16 is energized the contacts of relay E16 are released. Similarly, at this time the circuit for energizing winding 548 of relay E15 is interrupted because of the release of contact 556 of relay E15. Accordingly, on this the fourth operation of contact 505, the contacts of relay E16 become released, while the contacts of relay E15 remain released.

On the release of contact 576 of relay E16, the previously traced circuit for energizing primary windings 521 and 529 of transformers TVA and TVB, respectively, is interrupted, while a circuit is again established to wire 578 to energize the transformer primary windings 520 and 528.

On the first operation of contact 505 in a new cycle of operation, it again establishes a circuit to wire 503 with the result that winding 544 of relay E15 is again energized. The circuit for energizing this winding includes wire 503, winding 544, wire 545, contact 546 of relay E16, and wire 547 to terminal C.

It will be seen, therefore, that when the relay Y2 of the vehicle carried signal apparatus is energized, the contacts of relay E16 remain released until the second operation of the contact 505, whereupon the contacts of relay E16 are picked up and remain picked up until the fourth operation of contact 505, at which time the contacts of relay E16 are released and remain released until the second operation of contact 505 in a new cycle of operation.

The various parts of the equipment are arranged and proportioned so that when the primary windings 521 and 529 of transformer TVA are alternately energized at the frequency at which they are energized when the supply of current thereto is controlled by the contact 576 of relay E16, the flow of current in these windings, and, therefore, in the windings of relay MVA, will not be reduced to a value such that the relay MVA becomes inoperative until the vehicle speed is increased approximately to 24 miles per hour.

When a vehicle speed exceeds this value, the relay MVA becomes inoperative and its contact no longer rectifies the current supplied to the winding 516 of relay VA with the result that this winding is thereafter supplied with alternating current and the contact 541 of the relay becomes released.

Similarly, the various parts of the equipment are arranged and proportioned so that when the primary windings 528 and 529 of transformer TVB are alternately energized at the frequency at which they are energized when the supply of current thereto is controlled by the contact 576 of relay E16, the flow of current in these windings, and, therefore, in the windings of the relay MVB, will not be reduced to a value such as to render the relay MVB inoperative until the vehicle speed is increased to a rate in excess of 25 miles per hour.

When the vehicle speed reaches this value, the relay MVB becomes inoperative and no longer rectifies the current supplied to winding 517 of relay VB and causes contact 542 of relay VB to become released with the results heretofore mentioned.

Having described the operation of the system when the 11, 17 and 25 mile speed limits are in effect, the operation of the system when the 35 mile speed limit is in effect will now be described. At this time the relay Y1 is energized, while the other relays of the vehicle carried signal apparatus are deenergized. When the relay Y1 is energized, the circuits to the 11, 17 and 25 mile indication lamps are interrupted, while a circuit is established to illuminate the lamp of the 35 mile indication lamp.

In addition, when the relay Y1 is energized, its contact 552 is picked up and establishes connection from the wire 550, leading from one terminal of the winding 548 of relay E15, to the wire 555.

Furthermore, when relay Y1 is energized, its contact 561 establishes connection from the terminal B to the wire leading to the contact 582 of relay E16. At this time the contact 561 of relay Y1 interrupts the previously traced circuit to contact 576 of relay E16.

When the relay Y1 is energized, the counting relays E15 and E16 operate in the manner previously described. As stated, the contacts of relay E16 are picked up on the second operation of contact 505, and remain picked up until the fourth operation of that contact, whereupon they become released and remain released until the second operation of contact 505 in a new cycle of operation.

The various parts of the equipment are arranged and proportioned so that when the primary windings 520 and 521 of transformer TVA are energized through the circuits controlled by the contact 582 of relay E16, the flow of current in these windings, and, therefore, in the windings of the relay MVA, will not be reduced to a value such as to render the relay MVA inoperative until the vehicle speed is increased approximately to 34 miles per hour.

When the vehicle speed exceeds this value, the relay MVA becomes inoperative and effects the release of contact 541 of relay VA.

Similarly, the various parts of the equipment are arranged and proportioned so that when the primary windings 528 and 529 of transformer TVB are alternately energized at the frequency at which they are energized when supplied with current through the circuits controlled by the contact 582 of relay E16, the flow of current in these windings, and, therefore, in the windings of the relay MVB, will not be reduced to a value such as to render the relay MVB inoperative until the vehicle speed is increased to a rate slightly in excess of 35 miles an hour. When the vehicle speed reaches this value, the relay MVB becomes inoperative and effects the release of the contact of relay VB.

It will be seen that the system shown in each of the figures of the drawings of this application provides means operative in accordance with the speed of a moving member, such as a vehicle axle, for varying the frequency of the impulses of current supplied to a control device which assumes one condition when the frequency of these impulses is below one predetermined value, and a different condition when their frequency exceeds this value.

It will be seen also that each of the systems shown in this application employs a device having a magnetic core and a pair of windings inductively associated therewith, and which, when energized, produce opposite relative changes in the flux in the core. Each system includes, in addition, means operative in accordance with the speed of a moving member to interrupt the circuit of at least one of these windings, together with means responsive to the value of the current flowing in at least one of these windings.

Furthermore, it will be seen that each system employs a relay which is operative when its contacts are released to effect an application of the brakes, or to effect a predetermined change in the condition of the vehicle brake equipment, and that each of these relays has a plurality of windings each of which is effective to hold the relay contacts picked up. Each system incorporates means operative when and only when the vehicle is standing still or is traveling at extremely low speeds to energize one of these windings to thereby maintain the relay contacts picked up at these times, while there is means responsive to the speed of the vehicle for energizing another of the relay windings as long as the vehicle speed remains below a predetermined value.

It will be seen also that certain of the systems shown in this application may be selectively conditioned by a relay of the vehicle carried signal apparatus to effect an application of the brakes if either of a plurality of different speed limits is exceeded.

In addition, the various systems shown in this application are arranged so that changes of the magnitude normally encountered in the voltage of the source from which current is supplied to operate the systems will not materially affect the operating points of these systems. Also each of these systems is arranged on the closed circuit principle with the result that if a part of the system should fail to function in the intended manner, or if the source of current should fail, the system will operate automatically to effect an application of the brakes or to condition the brake equipment for a predetermined class of operation.

While several systems embodying my invention have been illustrated and described in detail, it is to be understood that the invention is not limited to these details of construction, and that numerous changes and modifications may be made without departing from the scope of the following claims.

Having now described my invention, what I claim is:

1. In a device of the class described, in combination, a magnetically permeable core, a pair of windings inductively associated with said core, one of said windings when energized tending to effect an increase in flux of one relative polarity in said core, the other winding when energized tending to effect an increase in flux of the other relative polarity in said core, means for periodically energizing one of said windings at frequencies varying within a predetermined range, means for energizing the other of said windings, the windings and the core being proportioned so that throughout a portion of the range of frequencies of periodic energization of said winding the flow of current in one of said windings is inversely proportional to the frequency of reversals in the relative polarity of the flux in said core, and a mechanism responsive to the magnitude of the current in said one winding.

2. In a device of the class described, in combination, a magnetically permeable core, a pair of windings inductively associated with said core, one of said windings when energized effecting one relative change in the flux in said core, the other of said windings when energized effecting the opposite relative change in the flux in said core, means for energizing said windings and including means for periodically interrupting energization of at least one of said windings at frequencies varying within a predetermined range, the windings and the core being proportioned so that throughout a portion of the range of frequencies of periodic interruption of energization the flow of current in one of said windings varies inversely with the frequency of the relative changes in the flux in said core, and a mechanism responsive to the magnitude of the current flowing in said one winding.

3. In a device of the class described, in combination, a magnetically permeable core, a pair of windings inductively associated with said core, one of said windings when energized effecting one relative change in the flux in said core, the other of said windings when energized effecting the opposite relative change in the flux in said core, means for alternately energizing said windings at frequencies varying within a predetermined range, the windings and the core being proportioned so that throughout a portion of the range of frequencies of alternate energization of said windings the flow of current in one of said windings varies inversely with the frequency of the relative changes in the flux in said core, and a mechanism responsive to the magnitude of the current flowing in said one winding.

4. In a vehicle control mechanism, in combination, a magnetically permeable core, a pair of windings inductively associated with said core, one of said windings when energized effecting one relative change in the flux in said core, the other of said windings when energized effecting the opposite relative change in the flux in said core, means for energizing said windings and including means operable in accordance with the speed of the vehicle for periodically interrupting the circuit for energizing at least one of said windings at frequencies varying within a predetermined range, the windings and the core being proportioned so that throughout a portion of the range of frequencies of periodic interruption of energization the flow of current in one of said windings varies inversely with the frequency of relative changes in the flux in said core, and a device responsive to the magnitude of the current flowing in said one winding for controlling the vehicle.

5. In a vehicle control mechanism, in combination, a magnetically permeable core, a pair of windings inductively associated with said core, one of said windings when energized effecting one relative change in the flux in said core, the other of said windings when energized effecting the opposite relative change in the flux in said core, means for alternately energizing said windings at a frequency varying in accordance with the speed of the vehicle, the windings and the core being proportioned so that throughout a portion of the range of frequencies of alternate energization of said windings the flow of current in one of said windings varies inversely with the frequency of relative changes in the flux in said core, and a device responsive to the magnitude of the current flowing in said one winding for controlling the speed of the vehicle.

6. In a device of the class described, in combination, a magnetically permeable core, a pair of windings inductively associated with said core, one of said windings when energized effecting one relative change in the flux in said core, the other of said windings when energized effecting the opposite relative change in the flux in said core, means for alternately energizing said windings at frequencies varying within a predetermined range, the windings and the core being proportioned so that throughout a portion of the range of frequencies of alternate energization of said windings the flow of current in the circuit of each of said windings varies inversely with the frequency of the relative changes in the flux in said core, and a mechanism responsive to the magnitude of the current flowing in the circuits of said windings.

7. In a vehicle control mechanism, a magnetically permeable core, a pair of windings inductively associated with said core, one of said windings when energized effecting one relative change in the flux in said core, the other of said windings when energized effecting the opposite relative change in the flux in said core, means for alternately energizing said windings at a frequency varying in accordance with the speed of the vehicle, the windings and the core being proportioned so that throughout a portion of the range of frequencies of alternate energization of said windings the flow of current in the circuit of each of said windings varies inversely with the frequency of the relative changes in the flux in said core, and a mechanism responsive to the magnitude of the current flowing in the circuits of said windings for controlling the vehicle.

8. In a device of the class described, in combination, a magnetically permeable core, a pair of windings inductively associated with said core, one of said windings when energized effecting one relative change in the flux in said core, the other of said windings when energized effecting the opposite relative change in the flux in said core, means for energizing the circuits of said windings and including means for periodically interrupting the circuit for energizing at least one of said windings at frequencies varying within a predetermined range, the windings and the core being proportioned so that throughout a portion of the range of frequencies of periodic interruption of energization the flow of current in one of said windings varies inversely with the frequency of the relative changes in the flux in said core, and a mechanism connected in series with said one of said windings and responsive to the magnitude of the current flowing in said winding.

9. In a device of the class described, in combination, a magnetically permeable core, a pair of control windings inductively associated with said core, one of said control windings when energized effecting one relative change in the flux in said core, the other of said control windings when energized effecting the opposite relative change in the flux in said core, means for energizing the circuits of said control windings and including means for periodically interrupting the circuit for energizing at least one of said control windings at frequencies varying within a predetermined range, the control windings and the core being proportioned so that throughout a portion of the range of frequencies of periodic interruption of energization the flow of current in one of said control windings varies inversely with the frequency of the relative changes in the flux in said core, and a mechanism having a pair of operating windings each connected in series with a different one of said control windings, said mechanism being responsive to the magnitude of the current flowing in said operating windings.

10. In a device of the class described, in combination, a magnetically permeable core, a pair of windings inductively associated with said core, one of said windings when energized effecting one relative change in the flux in said core, the other winding when energized effecting the opposite relative change in the flux in said core, means for alternately energizing said windings at frequencies varying within a predetermined range, the windings and the core being proportioned so that throughout a portion of the range of frequencies of alternate energization of said windings the flow of current in said windings varies inversely with the frequency of the relative changes in the flux in said core, and a mechanism having one portion connected in series with one of said windings and having another portion connected in series with the other of said windings, said mechanism being responsive to the magnitude of the current flowing in the circuits of said windings.

11. In a device of the class described, in combination, a relay having a winding and a contact which is picked up when said winding is energized to a predetermined degree with current predominantly of one relative polarity, a transformer having a core, a pair of primary windings and a pair of secondary windings, means for alternately energizing said primary windings to cause said windings to produce opposite relative changes in the flux in said core, said means being operable at frequencies varying within a predetermined range, the transformer core and primary windings being proportioned so that throughout a portion of the range of frequencies of alternate energization of said primary windings the flow of current in said primary windings varies inversely with the frequency of the relative changes in the flux in said core, a mechanism having a pair of operating windings each connected in series with a different one of said primary windings, said mechanism having a movable element movable between two positions by said operating windings when said windings are energized to a predetermined degree, said element being operable in one position to connect one of said secondary windings to said relay winding and being operable in the other position to connect the other of said secondary windings to said relay winding, and a control device controlled by said relay contact.

12. In a device of the class described, in combination, a relay having a winding and a contact which is picked up when said winding is energized to a predetermined degree with current predominantly of one relative polarity, a transformer having a core, a pair of primary windings and a secondary winding, means for alternately energizing said primary windings to cause said windings to produce opposite relative changes in the flux in said core, said means being operable at frequencies varying within a predetermined range, the transformer core and primary windings being proportioned so that throughout a portion of the range of frequencies of alternate energization of said primary windings the flow of current in said primary windings varies inversely with the frequency of the relative changes in the flux in said core, a mechanism having a pair of operating windings each connected in series with a different one of said primary windings, said mechanism having a movable element movable between two positions by said operating windings when said windings are energized to a predetermined degree, said element being operable in one position at a time when one of said transformer primary windings is energized to establish a circuit to supply current of one relative polarity from said transformer secondary winding to said relay winding, said element being operable in its other position at a time when the other of said primary windings is energized to also supply current of said one relative polarity from said transformer secondary winding to said relay winding, and a control device controlled by the contact of said relay.

13. In apparatus of the class described, in combination, a control device having a pair of windings and a movable element movable from a normal position to an operated position when either of said windings is energized with current of a predetermined value or when both of said windings are energized with currents of lesser values, a magnetically permeable core, a pair of control windings inductively associated with said core, one of said windings when energized effecting one relative change in the flux in said core, the other of said windings when energized effecting the opposite relative change in the flux in said core, means for energizing said control windings and including means operable in accordance with the speed of a vehicle for periodically interrupting the circuit for energizing at least one of said control windings, the control windings and the core being proportioned so that throughout a portion of the range of frequencies of periodic interruption of energization the flow of current in one of said control windings varies inversely with the frequency of the relative changes in the flux in said core, means governed by the magnitude of the current flowing in said one control winding for energizing one of said control device windings, and means responsive to the speed of the vehicle for supplying energy to the other winding of said control device, the effective value of the current supplied by said means being greatest when the vehicle is idle and varying inversely with the speed of the vehicle.

14. In apparatus of the class described, a control device having a plurality of windings and a movable element movable from a normal position to an operated position when any one of said windings is energized with current of a predetermined value or when more than one of said windings is energized with current of lesser value, a first and a second relay, a first and a second conductor, a circuit including a contact of the second relay through which a circuit is established from the first conductor to the winding of the first relay when the contact of the second relay is released, a circuit including a contact of the first relay through which a circuit is established from the second conductor to the winding of the second relay when the contact of the first relay is released, a contact of the first relay being operative when picked up to establish a circuit from the first conductor to a winding of said control device, a contact of the second relay being operative when picked up to establish a circuit from the second conductor to a winding of the control device, means operative in accordance with the speed of a vehicle for alternately connecting one terminal of a source of current to said first and second conductors, and other means responsive to the speed of the vehicle for supplying energy to a winding of said control device.

15. In apparatus of the class described, a control device having a plurality of windings and a movable element movable from a normal position to an operated position when any one of said windings is energized with current of a predetermined value or when more than one of said windings is energized with current of lesser value, a first and a second relay, a first and a second conductor, a circuit including a contact of the second relay through which a circuit is established from the first conductor to the winding of the first relay when the contact of the second relay is released, a circuit including a contact of the first relay through which a circuit is established from the second conductor to the winding of the second relay when the contact of the first relay is released, means operative in accordance with the speed of a vehicle for alternately connecting one terminal of a source of current to said first and second conductors, said means being operative to complete the connection of said source to either of said conductors before the connection of said source to the other of said conductors is interrupted, a contact of the first relay controlling a circuit for energizing a winding of said control device, a contact of the second relay controlling a circuit for energizing a winding of said control device, and other means responsive to the speed of the vehicle for supplying energy to a winding of said control device.

16. In apparatus of the class described, a control device having a plurality of windings and a movable element movable from a normal position to an operated position when either of said windings is energized with current of a predetermined value or when more than one of said windings is energized with current of lesser value, a first and a second relay, a first and a second conductor, a circuit including a contact of the second relay through which a circuit is established from the first conductor to the winding of the first relay when the contact of the second relay is released, a circuit including a contact of the first relay through which a circuit is established from the second conductor to the winding of the second relay when the contact of the first relay is released, a contact of the first relay being operative when picked up to establish a circuit from the first conductor to a winding of said control device, a contact of the second relay being operative when picked up to establish a circuit from the second conductor to the same winding of the control device, means operative in accordance with the speed of a vehicle for alternately connecting one terminal of a source of current to said first and second conductors, and other means responsive to the speed of the vehicle for supplying energy to a winding of said control device.

17. In apparatus of the class described, a control device having a plurality of windings and a movable element movable from a normal position to an operated position when either of said windings is energized with current of a predetermined value or when more than one of said windings is energized with current of lesser value, a first and a second relay, a first and a second conductor, a circuit including a contact of the second relay through which a circuit is established from the first conductor to the winding of the first relay when the contact of the second relay is released, a circuit including a contact of the first relay through which a circuit is established from the second conductor to the winding of the second relay when the contact of the first relay is released, a contact of the first relay being operative when picked up to establish a circuit from the first conductor to a winding of said control device, a contact of the second relay being operative when picked up to establish a circuit from the second conductor to the same winding of the control device, means operative in accordance with the speed of a vehicle for alternately connecting one terminal of a source of current to said first and second conductors, said means being operative to complete the connection of said source to either of said conductors before the connection of said source to the other of said conductors is interrupted, and other means responsive to the speed of the vehicle for supplying energy to a winding of said control device.

18. In apparatus of the class described, in combination, a control device having a plurality of windings and a movable element movable from a normal position to an operated position when either of said windings is energized with current of a predetermined value or when more than one of said windings is energized with current of a lesser value, a first and a second relay, a first and a second conductor, a circuit including a contact of the second relay through which a circuit is established from the first conductor to the winding of the first relay when the contact of the second relay is released, a circuit including a contact of the first relay through which a circuit is established from the second conductor to the winding of the second relay when the contact of the first relay is released, a contact of the first relay being operative when picked up to establish a circuit to a winding of said control device, a contact of the second relay being operative when picked up to establish a circuit to a winding of said control device, means operative in accordance with the speed of the vehicle for alternately connecting one terminal of a source of current to said first and second conductors, and other means responsive to the speed of the vehicle for supplying energy to a winding of said control device.

19. In apparatus of the class described, in combination, a control device having a plurality of windings and a movable element movable from a normal position to an operated position when either of said windings is energized with current of a predetermined value or when more than one of said windings is energized with current of a lesser value, a first and a second relay, a first and a second conductor, a circuit including a contact of the second relay through which a circuit is established from the first conductor to the winding of the first relay when the contact of the second relay is released, a circuit including a contact of the first relay through which a circuit is established from the second conductor to the winding of the second relay when the contact of the first relay is released, a contact of the first relay being operative when picked up to establish a circuit to a winding of said control device, a contact of the second relay being operative when picked up to establish a circuit to the same winding of said control device, means operative in accordance with the speed of the vehicle for alternately connecting one terminal of a source of current to said first and second conductors, said means being operative to complete the connection of said source to either of said conductors before the connection of said source to the other of said conductors is interrupted, and other means responsive to the speed of the vehicle for supplying energy to a winding of said control device.

20. In apparatus of the class described, in combination, a control device having a member movable from a normal position to an operated position when energy is supplied to said control device, a first relay and a second relay, a first conductor and a second conductor, means operative in accordance with the speed of a vehicle for alternately connecting one terminal of a source of current to said conductors, a circuit controlled by a contact of the second relay for connecting the first conductor to a terminal of the winding of the first relay, a circuit controlled by a contact of the first relay for connecting the second conductor to a terminal of the winding of the second relay, a circuit controlled by one of said relays for connecting one of said conductors to said control device, and a circuit controlled by the other of said relays for connecting the other of said conductors to said control device.

21. In apparatus of the class described, in combination, a control device having a plurality of windings, a first and a second relay, a first and a second conductor, means operative in accordance with the speed of a vehicle for alternately establishing a circuit from one terminal of a source of current to said conductors, a circuit which is complete only when the contacts of the first relay are released for connecting the second conductor to a terminal of the winding of the second relay, a circuit which is complete only when the contacts of the second relay are released for connecting the first conductor to a terminal of the winding of the first relay, a circuit which is complete only when the contacts of the first relay are picked up for connectnig the first conductor to a terminal of a winding of the control device, and a circuit which is complete only when the contacts of the second relay are picked up for connecting the second conductor to a terminal of a winding of the control device.

22. In apparatus of the class described, a pair of conductors, means operated in accordance with the rate of rotation of one vehicle axle for establishing circuits through which one terminal of a source of current may be alternately connected to said conductors, other means operated in accordance with the rate of rotation of another vehicle axle for alternately establishing other circuits through which said terminal of said source may alternately be connected to said conductors, means responsive to and operative on rotation of said one axle for transferring connection of said conductors from the circuits controlled by the means associated with said other axle to the circuits controlled by the means associated with said one axle, a control device having a winding, and means responsive to the frequency of alternate establishment of circuits to said conductors for controlling the supply of current to said control device winding.

23. In apparatus of the class described, in combination, a pair of conductors, means operated in accordance with the rate of rotation of one vehicle axle for establishing circuits through which one terminal of a source of current may be alternately connected to said conductors, other means operated in accordance with the rate of rotation of another vehicle axle for alternately establishing other circuits through which said terminal of said source may alternately be connected to said conductors, a magnetically permeable core, a pair of windings inductively associated with said core, said windings being operative when energized to effect opposite relative changes in the flux in said core, means operative in accordance with the rate of rotation of said one vehicle axle for alternately establishing connection between one terminal of a source of current and one terminal of each of said windings, a relay having one terminal of its winding connected to the other terminal of said source and having its other terminal connected to the other terminal of each said first named windings, means operated by said relay winding when and only when said winding is energized with current in excess of a predetermined value to transfer connection of said conductors from the circuits controlled by the means associated with said other axle to the circuits controlled by the means associated with said one axle, a control device having a winding, and means responsive to the frequency of the alternate establishment of circuits to said conductors for controlling the supply of current to said control device winding.

24. In combination with a vehicle having thereon a control device having a movable element selectively movable to a plurality of positions, apparatus of the class described and comprising a magnetically permeable core, a pair of windings inductively associated with said core, one of said windings when energized producing one relative change in the flux in said core, the other of said windings when energized producing the opposite relative change in the flux in said core, means for energizing said windings and including means operable in accordance with the speed of the vehicle for periodically interrupting energization of at least one of said windings, the control device movable element being operative in one of its positions to connect one portion of one of said windings in a circuit and being operative in another of its positions to connect a different portion of said one winding in said circuit, the windings and the core being proportioned so that throughout a portion of the range of frequencies of periodic interruption of energization the flow of current in the circuit including the said one winding varies inversely with the frequency of the relative changes in the flux in said core, the range of frequencies in which said variation occurs varying with the portion of the said winding which is connected in said circuit by said control device movable element, and a mechanism responsive to the magnitude of the current flowing in the circuit including said one winding.

25. In apparatus of the class described, in combination, a magnetically permeable core, a pair of windings inductively associated with said core, one of said windings when energized producing one relative change in the flux in said core, the other of said windings when energized producing the opposite relative change in the flux in said core, means for alternately energizing said windings at a frequency varying in accordance with the speed of a vehicle, a control device on the vehicle having a movable element selectively movable to a plurality of different positions, said element being operable in one of its positions to connect one portion of one of said windings in a circuit and being operable in another of its positions to connect a different portion of said one winding in said circuit, the windings and the core being proportioned so that throughout a portion of the range of frequencies of alternate energization of said windings the flow of current in a circuit including said one winding varies inversely with the frequency of the relative changes in the flux in said core, the range of frequencies in which said variation occurs varying with the portion of the said one winding connected in said circuit, and a mechanism responsive to the magnitude of the current flowing in the circuit including said one winding.

26. The combination with a vehicle having thereon a control device having a movable element selectively movable to a plurality of positions, of apparatus of the class described and comprising a magnetically permeable core, a pair of windings inductively associated with said core, one of said windings when energized producing one relative change in the flux in said core, the other of said windings when energized producing the opposite relative change in the flux in said core, means for energizing said windings and including means operative in one position of said control device movable element for interrupting energization of at least one of said windings at one frequency varying in accordance with the speed of the vehicle and operative in another position of said element to interrupt energization of at least one of said windings at a different frequency varying in accordance with the speed of the vehicle, the windings and the core being proportioned so that throughout a portion of the range of frequencies of periodic interruption of energization the flow of current in a circuit including one of said windings varies inversely with the frequency of the relative changes in the flux in said core, and a mechanism responsive to the magnitude of the current flowing in the circuit including said one winding.

27. The combination with a vehicle having thereon a control device having a movable element selectively movable to a plurality of positions, of apparatus of the class described and comprising a magnetically permeable core, a pair of windings inductively associated with said core, one of said windings when energized producing one relative change in the flux in said core, the other of said windings when energized producing the opposite relative change in the flux in said core, the windings and the core being proportioned so that when at least one of said windings is periodically energized at frequencies varying within a given range the flow of current in a circuit including one of said windings varies inversely with the frequency of the relative changes in the flux in said core and with the portion of said one winding included in said circuit, the range of frequencies in which said variation occurs varying with the portion of the said winding which is included in the circuit, means for energizing said windings and including means operable in one position of said control device movable element to interrupt energization of at least one of said windings at one frequency varying in accordance with the speed of the vehicle and operative in another position of said element to interrupt energization of at least one of said windings at a different frequency varying in accordance with the speed of the vehicle, said element being operative in one position to connect one portion of said one winding in said circuit and being operative in another position to connect a different portion of said one winding in said circuit, and a mechanism responsive to the magnitude of the current flowing in the circuit including said one winding.

28. In combination, braking means for a vehicle, a plurality of electroresponsive devices each capable of conditioning the braking means to provide a different degree of braking power, a first relay and a second relay, said relays jointly controlling the circuits to a plurality of said devices, the second relay controlling the circuit to another of said devices, the first relay controlling a circuit for energizing said second relay, a pair of magnetically permeable cores each having a pair of windings inductively associated therewith, the windings associated with each core being effective when energized to produce opposite relative changes in the flux in said core, means for energizing the windings associated with each of said cores and including means operative in accordance with the speed of the vehicle for interrupting energization of at least one of the windings associated with each of said cores, each of said cores and the windings associated therewith being proportioned so that throughout a portion of the range of frequencies of periodic interruption of energization the flow of current in one of the windings associated with each core varies inversely with the frequency of the relative changes in the flux in said core, means responsive to the magnitude of the current flowing in the circuit of said one winding associated with one core for energizing said first relay, and means responsive to the magnitude of the current flowing in the circuit of said one winding associated with the other core for energizing said second relay.

29. In apparatus of the class described, in combination, a relay having a contact movable between two positions, said relay having a pair of windings, one of said windings being normally operative to effect movement of said contact to one position only when energized with current of a predetermined value, the other of said windings being normally operative only when energized with current of said predetermined value to effect movement of said contact to its other position, a second relay having a winding and a contact which is moved from a normal to an operated position when said winding is energized, means controlled by the contact of the first relay for energizing the winding of the second relay, means controlled by the contact of the second relay and operable in the operated position thereof to condition the windings of the first relay to effect movement of the contact of such relay when they are supplied with current of a value less than said predetermined value, and means responsive to the speed of a vehicle for alternately supplying the windings of the first relay with current the magnitude of which varies inversely with the speed of the vehicle.

30. In apparatus of the class described, in combination, a first relay having a movable contact and a pair of windings, a second relay having a winding and a movable contact, a circuit controlled by the contact of the second relay and operative only when said contact is released to connect portions of the windings of the first relay in parallel, one of the windings of the first relay being operative when energized to effect movement of the relay contact to one position, the other of the windings of the first relay being operative when energized to effect movement of the relay contact to a different position, the windings of the first relay being operative when portions thereof are connected in parallel to effect movement of the relay contact only when energized with current of a predetermined value, said windings being operative when said portions are not connected in parallel to effect movement of the relay contact when energized with current of a value less than said predetermined value, means responsive to movement of the contact of the first relay for supplying current to the winding of the second relay to effect picking up of the contact of said second relay, and means for alternately energizing the windings of the first relay and including means operative in accordance with the speed of the vehicle for varying the magnitude of the current supplied to said windings.

31. In apparatus of the class described, in combination, a first relay having a movable element and a pair of windings, a second relay having a winding and a movable member movable from a released position to a picked up position, one of the windings of the first relay being operative when energized to effect movement of the relay element to one position, the other of the windings of the first relay being operative when energized to effect movement of the relay element to a different position, means controlled by the movable member of the second relay and operative in its released position to condition the windings of the first relay to be operative to effect movement of the element of such relay only when energized with current of one value, said means being operative when the movable member of the second relay is in its picked up position to condition the windings of the first relay to be operative to effect movement of the element of such relay when energized with current of a value less than said predetermined value, means responsive to movement of the movable element of the first relay for supplying current to the winding of the second relay to effect picking up of the movable member of such relay, and means for alternately energizing the windings of the first relay and including means operative in accordance with the speed of a vehicle for varying the magnitude of the current supplied to said windings.

32. In apparatus of the class described, in combination, a control device having a plurality of windings, a first relay and a second relay, a first conductor and a second conductor, means operative in accordance with the speed of a vehicle for alternately establishing a circuit from one terminal of a source to said conductors, a circuit which is complete only when the contacts of the first relay are released for connecting the second conductor to a terminal of the second relay, a circuit which is complete only when the contacts of the second relay are released for connecting the first conductor to a terminal of the first relay, a transformer having a plurality of primary windings and a plurality of secondary windings, a circuit which is complete only when the contacts of the second relay are released for connecting the first conductor to a terminal of a primary winding of said transformer, a circuit which is complete only when the contacts of the first relay are released for connecting the second conductor to a terminal of a primary winding of said transformer, a circuit complete only when the contacts of the first relay are released for connecting a terminal of one of said transformer secondary windings to a terminal of one of said control device windings, and a circuit complete only when the contacts of the second relay are released for connecting one terminal of one of said transformer secondary windings to a terminal of a winding of said control device.

33. In apparatus of the class described, in combination, a control device having a movable element having a normal position and movable therefrom to an operated position when the control device is supplied with energy, a first relay and a second relay, a first conductor and a second conductor, means operative in accordance with the speed of a vehicle for alternately establishing a circuit from one terminal of a source of current to said conductors, a circuit controlled by the first relay for connecting the second conductor to the winding of the second relay, a circuit controlled by the second relay for connecting the first conductor to the winding of the first relay, a transformer having a plurality of windings, a circuit controlled by the first relay for connecting the second conductor to a primary winding of said transformer, a circuit controlled by the second relay for connecting the first conductor to a primary winding of said transformer, a circuit controlled by the first relay for supplying current from a secondary winding of said transformer to said control device, and a circuit controlled by the second relay for supplying current from a secondary winding of said transformer to said control device.

34. In apparatus of the class described, in combination, a control device having a movable element having a normal position and movable therefrom to an operated position when the control device is supplied with energy, a first relay and a second relay, a first conductor and a second conductor, means operative in accordance with the speed of a vehicle for alternately establishing a circuit from one terminal of a source of current to said conductors, a circuit controlled by the first relay for connecting the second conductor to the winding of the second relay, a circuit controlled by the second relay for connecting the first conductor to the winding of the first relay, a transformer having a plurality of windings, a circuit controlled by the first relay for connecting the second conductor to a primary winding of said transformer, a circuit controlled by the second relay for connecting the first conductor to a primary winding of said transformer, a circuit controlled by the first relay for supplying current from a secondary winding of said transformer to said control device, a circuit controlled by the second relay for supplying current from a secondary winding of said transformer to said control device, a circuit controlled by the first relay for connecting the first conductor to said control device, and a circuit controlled by the second conductor for connecting the second conductor to said control device.

35. In apparatus of the class described, in combination, a control device having a movable element having a normal position and being movable therefrom to an operated position when the control device is supplied with energy, a first conductor and a second conductor, a first relay and a second relay, a transformer having a primary winding connected in series with the winding of the first relay and a primary winding connected in series with the winding of the second relay, a circuit controlled by the second relay for connecting the first conductor to the circuit of the winding of the first relay, a circuit controlled by the first relay for connecting the second conductor to the circuit of the winding of the second relay, a circuit controlled by the first relay for supplying current from a secondary winding of said transformer to said control device, a circuit controlled by the second relay for supplying current from a secondary winding of said transformer to said control device, and means operative in accordance with the speed of a vehicle for alternately connecting a terminal of a source of current to said conductors.

36. In apparatus of the class described, in combination, a control device having a movable element having a normal position and being movable therefrom to an operated position when the control device is supplied with energy, a first conductor and a second conductor, a first relay and a second relay, a transformer having a primary winding connected in series with the winding of the first relay and a primary winding connected in series with the winding of the second relay, a circuit controlled by the second relay for connecting the first conductor to the circuit of the winding of the first relay, a circuit controlled by the first relay for connecting the second conductor to the circuit of the winding of the second relay, a circuit controlled by the first relay for supplying current from a secondary winding of said transformer to said control device, a circuit controlled by the second relay for supplying current from a secondary winding of said transformer to said control device, means operative in accordance with the speed of a vehicle for alternately connecting a terminal of a source of current to said conductors, a circuit controlled by the first relay for connecting the first conductor to said control device, and a circuit controlled by the second relay for connecting the second conductor to said control device.

37. In combination with a vehicle having thereon a control mechanism including a movable member selectively movable to either of a plurality of positions, an electro-responsive control device having a movable member having a normal position and movable therefrom to an operated position when the control device is supplied with energy, a first relay and a second relay, a first conductor and a second conductor, means operative in accordance with the speed of a vehicle for alternately establishing a circuit from one terminal of a source of current to said conductors, a circuit controlled by the second relay for connecting the first conductor to the winding of the first relay, a circuit controlled by the first relay for connecting the second conductor to the winding of the second relay, a transformer having primary and secondary windings, a circuit controlled by the second relay for connecting the first conductor to a primary winding of said transformer, a circuit controlled by the first relay for connecting the second conductor to a primary winding of said transformer, a circuit controlled by the first relay for supplying current from a secondary winding of said transformer to said control device, and a circuit controlled by the second relay for supplying current from a secondary winding of said transformer to said control device, the movable member of said control mechanism being operable in one of its positions to complete the circuits for supplying current from the transformer to the control device and being operable in another position to interrupt said circuits.

38. In apparatus of the class described, in combination, a pair of magnetically permeable core elements each having inductively associated therewith a pair of windings, the windings associated with each core element being operative when energized to effect opposite relative changes in the flux in said core element, means for energizing said windings and including means for periodically interrupting energization of at least one of the windings associated with each core element, each of said core elements and the associated windings being proportioned so that throughout one range of frequencies of periodic interruption of energization the flow of current in one winding associated with each core element varies inversely with the frequency of the relative changes in the flux in said core, an electroresponsive indication mechanism, means responsive to the magnitude of the current flowing in said one winding associated with one core element for controlling the supply of current to said mechanism, an electroresponsive warning device, and means responsive to the magnitude of the current flowing in the said one winding associated with the other core element for controlling the supply of current to said warning device.

39. In apparatus of the class described, in combination, a pair of magnetically permeable core elements each having inductively associated therewith a pair of windings, the windings associated with each core element being operative when energized to effect opposite relative changes in the flux in said core element, means for energizing said windings and including means operative in accordance with the speed of a vehicle for periodically interrupting energization of at least one of the windings associated with each core element, each of said core elements and the windings associated therewith being proportioned so that throughout one range of frequencies of periodic interruption of energization the flow of current in one winding associated with each core element varies inversely with the frequency of the relative changes in the flux in said core element, a pair of electroresponsive indication devices, means responsive to the magnitude of the current flowing in the said one winding associated with one core element for controlling the circuit of one of said indication devices, said means being operative on a change in said current to the value present at a predetermined vehicle speed, and means responsive to the magnitude of the current flowing in the said one winding associated with the other core element for controlling the circuit of the other of the indication devices, said means being operative on a change in said current to the value present at a vehicle speed slightly higher than said predetermined speed.

40. In apparatus of the class described, in combination, a pair of magnetically permeable core elements each having inductively associated therewith a pair of windings, the windings associated with each core element being operative when energized to effect opposite relative changes in the flux in said core element, means for energizing said windings and including means operative in accordance with the speed of a vehicle for periodically interrupting energization of at least one of the windings associated with each core element, each of said core elements and the windings associated therewith being proportioned so that throughout one range of frequencies of periodic interruption of energization the flow of current in one winding associated with each core element varies inversely with the frequency of the relative changes in the flux in said core element, a first and a second contol circuit, means responsive to the magnitude of the current flowing in the said one winding associated with one core element for controlling the first control circuit, said means being operative on a change in said current to the value present at a predetermined vehicle speed, means responsive to the magnitude of the current flowing in the said one winding associated with the other core element for controlling the second control circuit, said means being operative on a change in said current to the value present at a vehicle speed slightly higher than said predetermined speed, an indication device controlled by said first control circuit, and a warning device and vehicle control mechanism controlled by said second control circuit, said mechanism being operative only after a predetermined time interval after operation of said means to control said second control circuit.

41. In apparatus of the class described, in combination, a pair of conductors, means for alternately completing circuits to said conductors, a series of relays having windings energized from said conductors, the relays controlling the circuits of the windings of each other in a manner such that the relays are first picked up in sequence and are thereafter released in sequence, a magnetically permeable core element having inductively associated therewith a pair of windings, said windings being operative when energized to effect opposite relative changes in the flux in said core, a first supply circuit for energizing one of said windings, a second supply circuit for energizing the other of said windings, a first and a second auxiliary circuit, a contact of one of said relays being operative when picked up to establish a circuit to one of said auxiliary circuits and operative when released to establish a circuit to the other of said auxiliary circuits, a contact of another of said relays being operative when picked up to connect the first auxiliary circuit to the first supply circuit and being operative when released to connect said first auxiliary circuit to the second supply circuit, said other relay having another contact which when picked up connects the second auxiliary circuit to the second supply circuit and which when released connects the second auxiliary circuit to the first supply circuit, the core element and the windings associated therewith being proportioned so that throughout one range of frequencies of alternate energization of said windings the flow of current in at least one of said windings varies inversely with the frequency of the relative changes in the flux in said core, and a mechanism responsive to the magnitude of the current flowing in at least one of said windings.

42. In apparatus of the class described, in combination, braking equipment operative to effect an application of the brakes in a normal degree, an electroresponsive device operative when energized to condition the brake equipment to effect brake applications only in a lesser degree, a relay operative when energized to establish a supply circuit through which current may be supplied to said electroresponsive device, means operable in accordance with the rate of rotation of one vehicle wheel for supplying current to said supply circuit, said means being operable to effectively energize said device only when said wheel is not rotating or is rotating at a rate slower than that which corresponds to a predetermined vehicle speed, and means responsive to the rate of rotation of a different vehicle wheel for controlling the circuit for energizing said relay, said means being operative to effectively energize said relay when and only when said different vehicle wheel is rotating at a rate which substantially exceeds that which corresponds to the predetermined vehicle speed.

43. A device of the class described comprising, in combination, a magnetically permeable core, means for establishing in said core a first flux of a given polarity, a winding inductively associated with said core, means for periodically energizing said winding with unidirectional current to establish a second periodic flux in said core which is opposed in direction to said first flux, the means for periodically energizing said winding being operable at varying rates to thereby vary the rate of recurrence of said second flux and in turn vary the magnitude of change of the resultant flux in said core, the core, the winding and the range of frequencies of periodic energization of said winding being arranged and proportioned so that throughout a portion of the range of frequencies of periodic energization of said winding said variation in the resultant flux in said core causes the current in said winding to vary in accordance with the rate at which said winding is periodically energized, and a control device governed in accordance with the average value of the current flowing in said winding.

44. In apparatus of the class described, in combination, an electroresponsive control device, a first and a second relay, a first and a second conductor, means operative in accordance with the speed of a vehicle for alternately establishing connection from one terminal of a source of current to said conductors, a circuit which is complete only when the contacts of the first relay are released for connecting the second conductor to a terminal of the winding of the second relay, a circuit which is complete only when the contacts of the second relay are released for connecting the first conductor to a terminal of the winding of the first relay, a circuit complete only when the contacts of the first relay are picked up for establishing connection from said first conductor to said electroresponsive control device, and a circuit complete only when the contacts of the second relay are picked up for establishing connection from said second conductor to said electroresponsive device.

45. In apparatus of the class described, in combination, an electroresponsive control device, a first and a second relay, a first and a second conductor, means operative in accordance with the speed of a vehicle for alternately establishing connection from one terminal of a source of current to said conductors, a circuit controlled by a contact of the first relay for establishing connection from the second conductor to the winding of the second relay, a circuit controlled by a contact of the second relay for establishing connection from the first conductor to the winding of the first relay, and means controlled by contacts of said first and second relay for energizing said electroresponsive device.

46. In combination with a vehicle having thereon a control device having a movable element selectively movable to a plurality of positions, apparatus of the class described and comprising a magnetically permeable core, means for establishing in said core a first flux of a given polarity, a winding inductively associated with said core, means operable in accordance with the speed of the vehicle for periodically energizing said winding with unidirectional current to establish a second periodic flux in said core which is opposed in direction to said first flux, the control device movable element being operative in one of its positions to connect one portion of said winding in a circuit and being operable in another of its positions to connect a different portion of said winding in said circuit, the winding and the core being proportioned so that throughout a portion of the range of frequencies of periodic energization of said winding the flow of current in the circuit including the said winding varies inversely with the frequency of periodic energization of said winding, the range of frequencies in which said variation in current flow occurs varying with the portion of the said winding which is connected in said circuit by said control device movable element, and a mechanism responsive to the magnitude of the current flowing in the circuit including said one winding.

ANDREW J. SORENSEN.